(12) United States Patent
Barancyk et al.

(10) Patent No.: US 6,635,341 B1
(45) Date of Patent: Oct. 21, 2003

(54) COATING COMPOSITIONS COMPRISING SILYL BLOCKED COMPONENTS, COATING, COATED SUBSTRATES AND METHODS RELATED THERETO

(75) Inventors: Steven V. Barancyk, Wexford, PA (US); John W. Burgman, Gibsonia, PA (US); James B. O'Dywer, Valencia, PA (US); Laura A. Kiefer-Liptak, Wexford, PA (US); Michael Allen Mayo, Pittsburgh, PA (US); Gregory J. McCollum, Gibsonia, PA (US); Shiryn Tyebjee, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 235 days.

(21) Appl. No.: 09/629,421

(22) Filed: Jul. 31, 2000

(51) Int. Cl.$^7$ .................................................. B32B 5/16
(52) U.S. Cl. ...................... 428/323; 428/327; 428/403; 428/404; 428/407; 428/413; 428/423.1; 428/446; 525/100; 525/101; 525/102; 525/103
(58) Field of Search .......................... 55/100, 101, 102, 55/103; 428/323, 327, 403, 404, 407, 413, 423.1, 446

(56) References Cited

U.S. PATENT DOCUMENTS

| | | |
|---|---|---|
| 1,873,945 A | 8/1932 | Kraenzlein et al. |
| 2,584,340 A | 2/1952 | Goodwin et al. |
| 2,587,295 A | 2/1952 | Doyle et al. |
| 2,860,074 A | 11/1958 | Hedlund et al. |
| 2,901,449 A | 8/1959 | Schwarz et al. |
| 2,978,437 A | 4/1961 | Christenson |
| 3,203,919 A | 8/1965 | Brachman |
| 3,317,460 A | 5/1967 | Clark |
| 3,398,174 A | 8/1968 | Barnes, Jr. |
| 3,450,791 A | 6/1969 | Sekmakas et al. |
| 3,479,328 A | 11/1969 | Nordstrom |
| 3,539,658 A | 11/1970 | Sekmakas et al. |
| 3,577,263 A | 5/1971 | Nordstrom |
| 3,577,265 A | 5/1971 | Nordstrom |
| 3,627,836 A | 12/1971 | Getson |
| 3,642,936 A | 2/1972 | Hodge et al. |
| 3,644,566 A | 2/1972 | Kincheloe et al. |
| 3,655,602 A | 4/1972 | Sekmakas |
| 3,668,183 A | 6/1972 | Hoy et al. |
| 3,799,854 A | 3/1974 | Jerabek et al. |
| 3,857,817 A | 12/1974 | Henshaw et al. |
| 3,919,315 A | 11/1975 | Wollweber et al. |
| 3,986,997 A | 10/1976 | Clark |
| 4,001,156 A | 1/1977 | Bosso et al. |
| 4,025,407 A | 5/1977 | Chang et al. |
| 4,025,456 A | 5/1977 | Litteral et al. |
| 4,027,073 A | 5/1977 | Clark |
| 4,046,729 A | 9/1977 | Scriven et al. |
| 4,089,763 A | 5/1978 | Dart et al. |
| 4,093,673 A | 6/1978 | Chang et al. |
| 4,104,240 A | 8/1978 | Buter |
| 4,147,679 A | 4/1979 | Scriven et al. |
| 4,177,315 A | 12/1979 | Ubersax |
| 4,211,823 A | 7/1980 | Suzuki et al. |
| 4,212,901 A | 7/1980 | van Neerbos et al. |
| 4,220,679 A | 9/1980 | Backhouse |
| 4,221,697 A | 9/1980 | Osborn et al. |

(List continued on next page.)

FOREIGN PATENT DOCUMENTS

| | | |
|---|---|---|
| DE | 1193504 | 5/1965 |
| DE | 1545040 | 7/1970 |
| DE | 2205570 | 12/1988 |
| DE | 44 32 260 | 6/1995 |
| DE | 196 12 746 | 10/1996 |

(List continued on next page.)

OTHER PUBLICATIONS

Grant and Hackh's Chemical Dictionary, p. 111 (McGraw–Hill 1987).*
PCT Search Report from the European Patent Office, issued Apr. 18, 2001.
Chemical Abstracts AN 1996:710179, Ohsawa et al, "One–Component thermosetting coating compositions", Ger. Offen., 44 pp., 1996, abstract of German Patent DE 196 12 746. No month.
Iler, Ralph K., "The Chemistry of Silica", Colloidal Silica–Concentrated Sols, 1979, pp. 412–414. No month.

(List continued on next page.)

Primary Examiner—Leszek Kiliman
(74) Attorney, Agent, or Firm—Deborah M. Altman

(57) ABSTRACT

Coating compositions formed from at least one hydroxyl functional non-vinyl material comprising at least one alcoholic hydroxyl group blocked with a hydrolyzable silyl group, and at least one curing agent are provided by the present invention. Another embodiment of the present invention is directed to a coating composition formed from components comprising at least one carbamate functional material comprising at least one carbamate group blocked with a hydrolyzable silyl group, and at least one curing agent. Another embodiment of the present invention is directed to a coating composition formed from components comprising at least one carboxyl functional material comprising at least one carboxyl group blocked with a hydrolyzable silyl group, and at least one curing agent. Another embodiment of the present invention is directed to a coating composition, formed from components comprising at least one amide functional material comprising at least one amide blocked with a hydrolyzable silyl group, and at least one curing agent. Other embodiments of the present invention are directed to substrates coated with the aforementioned cured compositions. Also provided are multi-component composite coatings which include a cured basecoat deposited from a pigmented coating composition and a cured topcoat deposited from a topcoating composition. The multi-component composite coatings of the invention provide highly scratch resistant color-plus-clearcoatings. Further embodiments of the present invention are directed to methods for improving scratch resistance of a substrate.

62 Claims, No Drawings

U.S. PATENT DOCUMENTS

| | | |
|---|---|---|
| 4,239,798 A | 12/1980 | Schroeter et al. |
| 4,254,185 A | 3/1981 | Buter |
| 4,271,062 A | 6/1981 | Boomgaard et al. |
| 4,278,574 A | 7/1981 | Dworak et al. |
| 4,279,800 A | 7/1981 | Boomgaard et al. |
| 4,308,060 A | 12/1981 | Talbot |
| 4,310,600 A | 1/1982 | Cross |
| 4,311,622 A | 1/1982 | Buter |
| 4,345,057 A | 8/1982 | Yamabe et al. |
| 4,348,462 A | 9/1982 | Chung |
| 4,368,294 A | 1/1983 | Deubzer et al. |
| 4,369,300 A | 1/1983 | Carter et al. |
| 4,395,461 A | 7/1983 | Ching |
| 4,403,003 A | 9/1983 | Blackhouse |
| 4,403,093 A | 9/1983 | Hartman et al. |
| 4,408,018 A | 10/1983 | Bartman et al. |
| 4,410,594 A | 10/1983 | Olson |
| 4,413,086 A | 11/1983 | Chang et al. |
| 4,418,182 A | 11/1983 | Chattha |
| 4,427,820 A | 1/1984 | Blackhouse et al. |
| 4,431,789 A | 2/1984 | Okazaki et al. |
| 4,456,647 A | 6/1984 | Schoenfelder et al. |
| 4,465,815 A | 8/1984 | Chattha |
| 4,477,536 A | 10/1984 | Wright et al. |
| 4,478,876 A | 10/1984 | Chung |
| 4,481,126 A | 11/1984 | Trinh et al. |
| 4,491,508 A | 1/1985 | Olson et al. |
| 4,499,150 A | 2/1985 | Dowbenko et al. |
| 4,499,151 A | 2/1985 | Dowbenko et al. |
| 4,512,677 A | 4/1985 | Trinh |
| 4,518,522 A | 5/1985 | Markusch et al. |
| 4,520,144 A | 5/1985 | Noren et al. |
| 4,522,958 A | 6/1985 | Das et al. |
| 4,526,910 A | 7/1985 | Das et al. |
| 4,563,372 A | 1/1986 | Kurauchi et al. |
| 4,569,966 A | 2/1986 | Piccirilli et al. |
| 4,592,816 A | 6/1986 | Emmons et al. |
| 4,598,111 A | 7/1986 | Wright et al. |
| 4,618,657 A | 10/1986 | Katchko et al. |
| 4,640,940 A | 2/1987 | Jacobine et al. |
| 4,652,470 A | 3/1987 | Das et al. |
| 4,663,377 A | 5/1987 | Hombach et al. |
| 4,665,116 A | 5/1987 | Kornhaber et al. |
| 4,673,718 A | 6/1987 | Ryntz et al. |
| 4,677,004 A | 6/1987 | Das et al. |
| 4,680,204 A | 7/1987 | Das et al. |
| 4,681,811 A | 7/1987 | Simpson et al. |
| 4,689,383 A | 8/1987 | Riffle et al. |
| 4,713,410 A | 12/1987 | Katchko et al. |
| 4,728,543 A | 3/1988 | Kurauchi et al. |
| 4,728,545 A | 3/1988 | Kurauchi et al. |
| 4,728,690 A | 3/1988 | Lammerting et al. |
| 4,732,790 A | 3/1988 | Blackburn et al. |
| 4,754,014 A | 6/1988 | Ryntz et al. |
| 4,764,569 A | 8/1988 | Umemoto et al. |
| 4,766,185 A | 8/1988 | Ryntz et al. |
| 4,798,746 A | 1/1989 | Claar et al. |
| 4,804,732 A | 2/1989 | Ryntz et al. |
| 4,808,649 A | 2/1989 | Gay et al. |
| 4,816,333 A | 3/1989 | Lange et al. |
| 4,822,828 A | 4/1989 | Swofford |
| 4,835,023 A | 5/1989 | Taniguchi et al. |
| 4,851,294 A | 7/1989 | Buter et al. |
| 4,870,140 A | 9/1989 | Ryntz et al. |
| 4,873,298 A | 10/1989 | Ryntz et al. |
| 4,892,906 A | 1/1990 | Pham et al. |
| 4,910,097 A | 3/1990 | Nomura et al. |
| 4,925,659 A | 5/1990 | Grollier et al. |
| 4,927,868 A | 5/1990 | Schimmel et al. |
| 5,025,054 A | 6/1991 | Yoshida et al. |
| 5,035,748 A | 7/1991 | Burow et al. |
| 5,059,707 A | 10/1991 | Motegi et al. |
| 5,066,698 A | 11/1991 | Hazan et al. |
| 5,066,720 A | 11/1991 | Ohsugi et al. |
| 5,071,904 A | 12/1991 | Martin et al. |
| 5,075,165 A | 12/1991 | Kishi et al. |
| 5,075,370 A | 12/1991 | Kubitza et al. |
| 5,084,541 A | 1/1992 | Jacobs, III et al. |
| 5,085,694 A | 2/1992 | Cifuentes |
| 5,086,087 A | 2/1992 | Misev |
| 5,098,947 A | 3/1992 | Metzger et al. |
| 5,098,983 A | 3/1992 | Mosbach et al. |
| 5,102,746 A | 4/1992 | Shindou et al. |
| 5,104,922 A | 4/1992 | Chang |
| 5,104,929 A | 4/1992 | Bilkadi |
| 5,110,891 A | 5/1992 | Cifuentes et al. |
| 5,112,403 A | 5/1992 | Okura et al. |
| 5,114,756 A | 5/1992 | Mirabeau et al. |
| 5,116,418 A | 5/1992 | Kaliski et al. |
| 5,141,555 A | 8/1992 | Elepano |
| 5,147,730 A | 9/1992 | Ogishi et al. |
| 5,154,759 A | 10/1992 | Cifuentes et al. |
| 5,162,420 A | 11/1992 | Chang et al. |
| 5,174,813 A | 12/1992 | Cifuentes et al. |
| 5,194,487 A | 3/1993 | Jacobs |
| 5,196,485 A | 3/1993 | McMonigal et al. |
| 5,212,216 A | 5/1993 | Hattori et al. |
| 5,212,273 A | 5/1993 | Das et al. |
| 5,213,846 A | 5/1993 | Tsuneta et al. |
| 5,235,018 A | 8/1993 | Potter et al. |
| 5,248,789 A | 9/1993 | Wolff |
| 5,256,452 A | 10/1993 | McMonigal et al. |
| 5,258,063 A | 11/1993 | Cifuentes et al. |
| 5,258,225 A | 11/1993 | Katsamberis |
| 5,258,424 A | 11/1993 | Yagi et al. |
| 5,260,350 A | 11/1993 | Wright |
| 5,260,469 A | 11/1993 | Swiatek |
| 5,268,256 A | 12/1993 | Goetz et al. |
| 5,286,835 A | 2/1994 | Green et al. |
| 5,304,400 A | 4/1994 | Dhein et al. |
| 5,308,494 A | 5/1994 | Brandon et al. |
| 5,314,947 A | 5/1994 | Sawaragi |
| 5,322,873 A | 6/1994 | Pohl et al. |
| 5,322,890 A | 6/1994 | Ando et al. |
| 5,328,975 A | 7/1994 | Hanson et al. |
| 5,346,958 A | 9/1994 | Yukawa et al. |
| 5,356,669 A | 10/1994 | Rehfuss et al. |
| 5,359,005 A | 10/1994 | Kanita et al. ............... 525/203 |
| 5,367,019 A | 11/1994 | Sawaragi |
| 5,378,735 A | 1/1995 | Hosokawa et al. |
| 5,387,642 A | 2/1995 | Blum et al. |
| 5,389,705 A | 2/1995 | Huemke et al. |
| 5,389,718 A | 2/1995 | Potter et al. |
| 5,393,823 A | 2/1995 | Konno et al. |
| 5,395,955 A | 3/1995 | Okawa et al. |
| 5,397,638 A | 3/1995 | Miki et al. |
| 5,426,131 A | 6/1995 | Katsamberis |
| 5,430,083 A | 7/1995 | Klier et al. |
| 5,432,233 A | 7/1995 | Miyazoe et al. |
| 5,438,083 A | 8/1995 | Takimoto et al. |
| 5,439,957 A | 8/1995 | Takimoto et al. |
| 5,444,104 A | 8/1995 | Waknine |
| 5,445,871 A | 8/1995 | Murase et al. |
| 5,461,102 A | 10/1995 | Masuda et al. |
| 5,468,461 A | 11/1995 | Hosoda et al. |
| 5,468,802 A | 11/1995 | Wilt et al. |
| 5,470,504 A | 11/1995 | Kiehn et al. |
| 5,571,297 A | 11/1996 | Swei et al. |
| 5,587,428 A | 12/1996 | Jones et al. |
| 5,589,129 A | 12/1996 | Kato et al. |
| 5,593,733 A | 1/1997 | Mayo |

| | | |
|---|---|---|
| 5,602,204 A | 2/1997 | Harimoto et al. |
| 5,614,640 A | 3/1997 | Okawa |
| 5,641,854 A | 6/1997 | Jones et al. |
| 5,663,240 A | 9/1997 | Simeone et al. |
| 5,663,244 A | 9/1997 | Barancyk et al. |
| 5,686,012 A | 11/1997 | Hayashi et al. |
| 5,693,723 A | 12/1997 | Green |
| 5,693,724 A | 12/1997 | Green |
| 5,709,950 A | 1/1998 | Burgman et al. |
| 5,719,234 A | 2/1998 | Yabuta et al. |
| 5,756,221 A | 5/1998 | Horibe et al. |
| 5,780,530 A | 7/1998 | Mizutani et al. |
| 5,786,435 A | 7/1998 | Marutani et al. ............ 526/273 |
| 5,798,409 A | 8/1998 | Ho |
| 5,800,910 A | 9/1998 | Harke et al. |
| 5,814,410 A | 9/1998 | Singer et al. |
| 5,840,806 A | 11/1998 | Komazaki et al. |
| 5,853,809 A | 12/1998 | Campbell et al. |
| 5,876,806 A | 3/1999 | Ogawa |
| 5,886,082 A | 3/1999 | Numa et al. |
| 5,914,162 A | 6/1999 | Bilkadi |
| 5,922,475 A | 7/1999 | Barancyk et al. |
| 5,939,491 A | 8/1999 | Wilt et al. |
| 5,942,556 A | 8/1999 | Friedlander et al. |
| 5,976,701 A | 11/1999 | Barancyk et al. |
| 5,998,504 A | 12/1999 | Groth et al. |
| 5,998,543 A | 12/1999 | Collins et al. |
| 6,005,045 A | 12/1999 | Klanica |
| 6,013,724 A | 1/2000 | Mizutani et al. |
| 6,013,733 A | 1/2000 | Singer et al. |
| 6,022,919 A | 2/2000 | Komoto et al. |
| 6,045,870 A | 4/2000 | Noura et al. |
| 6,048,934 A | 4/2000 | Wilt et al. |
| 6,063,438 A | 5/2000 | Ogawa |
| 6,080,816 A | 6/2000 | Gregorovich et al. |
| 6,207,235 B1 | 3/2001 | Ohsawa et al. .......... 427/372.2 |

FOREIGN PATENT DOCUMENTS

| | | |
|---|---|---|
| DE | 197 09 467 | 3/1997 |
| EP | 0010555 | 5/1980 |
| EP | 0088193 | 9/1983 |
| EP | 0139187 | 5/1985 |
| EP | 0277816 | 8/1988 |
| EP | 0356963 | 3/1990 |
| EP | 0372124 | 6/1990 |
| EP | 0571187 | 11/1993 |
| EP | 0 584 978 | 3/1994 |
| EP | 0586048 | 3/1994 |
| EP | 0607710 | 7/1994 |
| EP | 0665252 | 8/1995 |
| EP | 0735118 | 10/1996 |
| EP | 0767232 | 4/1997 |
| EP | 0 774 499 | 5/1997 |
| EP | 0819719 | 1/1998 |
| EP | 0832947 | 4/1998 |
| EP | 0897962 | 2/1999 |
| EP | 0 900 832 | 3/1999 |
| EP | 0928800 | 7/1999 |
| EP | 0940422 | 9/1999 |
| EP | 0995778 | 4/2000 |
| GB | 1080549 | 8/1967 |
| GB | 1293331 | 10/1972 |
| GB | 1409741 | 10/1975 |
| GB | 2140018 | 11/1984 |
| GB | 2174400 | 11/1986 |
| JP | 54-1335 | 1/1979 |
| JP | 55-17073 | 5/1980 |
| JP | 56-157461 | 12/1981 |
| JP | 58-58123 | 12/1983 |
| JP | 58-217515 | 12/1983 |
| JP | 59-092948 | 5/1984 |
| JP | 60-168770 | 9/1985 |
| JP | 60-250069 | 12/1985 |
| JP | 61-141684 | 6/1986 |
| JP | 62-252480 | 11/1987 |
| JP | 64-004663 | 1/1989 |
| JP | 1-141952 | 6/1989 |
| JP | 3258866 | 11/1991 |
| JP | 03296567 | 12/1991 |
| JP | 5043696 | 2/1993 |
| JP | 5-51533 | 3/1993 |
| JP | 5065416 | 3/1993 |
| JP | 06100799 | 4/1994 |
| JP | 7070509 | 3/1995 |
| JP | 7-62214 | 7/1995 |
| JP | 9-165450 | 6/1997 |
| JP | 09227688 | 9/1997 |
| JP | 10017670 | 1/1998 |
| WO | WO 95/28452 | 10/1995 |
| WO | WO 96/01864 | 1/1996 |
| WO | WO 97/13741 | 4/1997 |
| WO | WO 97/26304 | 7/1997 |
| WO | WO 97/29854 | 8/1997 |
| WO | WO 97/44402 | 11/1997 |
| WO | WO 98/38251 | 9/1998 |
| WO | WO 98/40170 | 9/1998 |
| WO | WO-99/06487 | 2/1999 |
| WO | WO 99/58589 | 11/1999 |
| WO | WO 00/39183 | 7/2000 |

OTHER PUBLICATIONS

Verboom et al., "N, N'–Bis[trismethylsilyl]–urea: A Useful Silylating Agent for Alcohols and Carboxylic Acids", Laboratory of Organic Chemistry, Twente University of Technology, Enschede, The Netherlands, Communications, pp. 807–809,Oct. 1981.

"Surface Coatings—vol. 1: Raw Materials and Their Usage," $2^{nd}$ Ed., Tafe Educational Books, New South Wales University Press Limited, New South Wales, Australia 1983 No month.

Chattha et al., "High Solids Coatings from New Oligomers", Journal of Coatings Technology, vol. 55, No. 700, pp. 39–46, May 1983.

Degussa, No. 6, Technical Bulletin Pigments, Hydrophobic Aerosil® Manufacture, Properties, and Applications, $4^{th}$ Edition, Aug. 1986.

Williams et al., "Polyester Oligomers of Narrowed Molecular Weight Distribution", Wafer–Borne & Higher–Solids Coatings Symposium, pp. 478–512, Feb. 3–5, 1988, New Orleans, LA, USA.

"Siloxanes With Aliphatic Isocyanate Groups, A Tetrafunctional Cross–Linking Agent", Guangbin Zhou and Richard Fragnito, Johannes Smid, Polymer Bulletin 22, pp. 85–88 (1989), Springer–Verlag. No month.

Odian, G., "Principles of Polymerization, 3rd Edition", John Wiley & Sons; Inc. ISBN: 0471610208, pp. 19–24, Published Oct. 18, 1991.

Greene, T. W. et al., "Protective Groups in Organic Synthesis", Second Edition, John Wiley & Sons, Inc., pp. 68–86; & 261–263. No date.

"Regioselective Rhodium–Containing Catalysts for Ring–Opening Polymerizations and Hydrosilylations", J.V. Crivello and M. Fan, Journal of Polymer Science: Part A: Polymer Chemistry, vol. 30, pp. 1–11 (1992), John Wiley & Sons, Inc. No month.

"Synthesis of Novel Organic Oligomers Containing Si–H Bonds", T. Iwahara, M. Jusakabe, M. Chiba and K. Yonezawa, Journal of Polymer Science: Part A: Polymer Chemistry, vol. 31, pp. 2617–2631 (1993), John Wiley & Sons, Inc.

Schmidt, C., et al., "Inorganic–organic Hybrid Coatings For Metal And Glass Surfaces", PMSE, Spring 1994, pp. 347–348. No date.

Etranian, A. et al., "Les Silices Greffees Ameliorent Les Revetements", Peintures & Encres, Informations Chimie, n 371– Sep. 1995, pp. 85–88.

Espiard et al, "Poly(ethyl acrylate) latexes Encapsulating Nanoparticles of Silica: 3. Morphology and Mechanical Properties of Reinforced Films", Polymer, vol. 36, No. 23, pp. 4397–4403, Elsevier Science Ltd., 1995. No month.

Jones, F., "Toward Solventless Liquid Coatings", Journal of Coatings Technology, vol. 68, No. 852, pp. 25–36, Jan. 1996.

"Highlink® OG Silica Organosols," Clariant, Societe Francais Hoechst, BL Chimie Fine, AE/MS.22/96. No date.

Varerkar M.P., "Formulating High Solids Coatings: The Solution to VOC Problem", Paintindia, Sep. 1996, pp. 19–30.

Misra, M., et al., "Hybrid Inorganic–Organic UV–Curable Abrasion–Resistant Coatings", Surface Coatings International, (12) 1998, pp. 594–595. No month.

Chandra et al., "Telechelic Oligomers for High Solids Coatings", Paintindia, Feb. 1997, pp. 35–44.

Jones, F., "New Technology Holds Key", Paint & Coatings Industry, May 1997, pp. 62–64.

Chemical Abstracts 128:62925a, Noboru et al., "Coating Process Using Siloxy–Containing Vinyl Polymer Clear Coatings", Jpn. Kokai Tokkyo Joho JP 09, 314,040, Sep. 12, 1997 (abstract).

Azuma et al, "Acrylic Oligomer for High Solid Automotive Top Coating System Having Excellent Acid Resistance", Progress In Organic Coatings, vol. 32, Sep.–Dec. 1997, pp. 1–7.

Gettwert, G., et al., "One–Component Silicate Binder Systems for Coatings", Surface Coatings International, (12) 1998, pp. 596–603. No month.

Wu, Shobing, et al., "Effect of Siloxane Functionalized Caprolactone Polyols on Photocurable Epoxy Coatings", Journal of Coatings Technology, vol. 70, No. 887, Dec. 1998, pp. 53–62.

Perry, R. J., "Applications for Crss–linked Siloxane Particles", Chemtech, Feb. 1999, pp. 39–44.

Frings, S., et al., "Morphology of Hybrid Coatings Based on Polyester, Melamine Resin, and Silica and the Relation with Hardness and Scratch Resistance", Journal of Coatings Technology, vol. 72, No. 901, Feb. 2000, pp. 83–89.

Straehle, Dr. Wolfgang, Head of the Corporate Division, Research and Purchasing, and the Operating Division, Industrial Coating, BASF Coatings AG, Münster, Germany, "Scratchproof Clearcoat: High Gloss for the Long Term", www.pcimag.com, posted Jul. 25, 2000.

Organo Silicasol, Nissan Chemical Industries, Ltd., Nissan Chemical America Corporation webpage, http://www.snowtex.com/organo_types.html. No date.

Wicks, Zeno W., et al., "Organic Coatings: Science And Technology," second edition, Chapter 23, pp. 433–439 (Wiley–Interscience, c1999). No month.

Smetankina, N.P., et al., "Investigation of the Interrelationship Between the Compositions, Production processes, and Properties of Polyurethanes With Reticular Structures. XV. Introduction of Organosilicon Carbofunctional Glycols Into Polyurethane Lacquer Compounds", Institute of High–Molecular Compound Chemistry of the Academy of Sciences (AS) of the Ukrainian Soviet Socialist Republic (UkrSSR) (with translation). No date.

Kotomkin, V. Ya, et al., "Resistance of Polysiloxane Urethanes to the Action of Solvents and Corrosive Media", UDS 618.(664+64):619.34 (with translation). No date.

Frings, S., et al., "Preparation and Characterization of Organic–Inorganic Hybrid Coatings Based on Crosslinked Polyester Systems and Silica, Formed Via the Sol–Gel Process", Presented at the International Waterborne, High–Solids, and Powder Coatings Symposium, Feb. 10–12, 1999, New Orleans, L.A. USA, pp. 35–43.

09/629,420, Anderson et al., "Flexible Coating Compositions Having Improved Scratch Resistance, Coated Substrates and Methods Related Thereto," filed Jul. 31, 2000.

09/629,422, Anderson et al., "Scratch Resistant Dual Cure Coatings, Coated Substrates and Methods Related Thereto," filed Jul. 31, 2000.

09/629,423, Anderson et al., "Cured Coatings Having Improved Scratch–Resistance, Coated Substrates and Methods Related Thereto," filed Jul. 31, 2000.

09/629,443, Anderson et al., "Coating Compositions Having Improved Scratch Resistance, Coated Substrates and Methods Related Thereto," filed Jul. 31, 2000.

09/629,444, Anderson et al., "Coating Compositions Having Improved Scratch Resistance, Coated Substrates, and Methods Related Thereto," field Jul. 31, 2000.

* cited by examiner

COATING COMPOSITIONS COMPRISING SILYL BLOCKED COMPONENTS, COATING, COATED SUBSTRATES AND METHODS RELATED THERETO

FIELD OF THE INVENTION

Certain embodiments of the present invention generally are directed to coating compositions formed from at least one hydroxyl functional non-vinyl material comprising at least one alcoholic hydroxyl group blocked with a hydrolyzable silyl group, and at least one curing agent. Other embodiments of the present invention are directed to coating compositions formed from at least one hydroxyl functional material comprising at least one alcoholic hydroxyl group blocked with a hydrolyzable silyl group, and at least one curing agent, in which the hydroxyl functional material has a polydispersity of less than 2. Further embodiments are directed to coating compositions formed from at least one hydroxyl functional non-vinyl material comprising at least one alcoholic hydroxyl group blocked with a hydrolyzable silyl group, and at least one curing agent, in which the hydroxyl functional material has less than 5 hydroxyl functional groups. Still other embodiments are directed to coating compositions formed from at least one hydroxyl functional non-vinyl material comprising at least one alcoholic hydroxyl group blocked with a hydrolyzable silyl group, and at least one curing agent present in an amount of at least 10 weight percent on a basis of total resin solids of the components of the coating composition. Further embodiments of the present invention are directed to coating compositions formed from components comprising at least one carbamate functional material comprising at least one carbamate group blocked with a hydrolyzable silyl group, and at least one curing agent. Still further embodiments are directed to coating compositions formed from components comprising at least one carboxyl functional non-vinyl material comprising at least one carboxyl group blocked with a hydrolyzable silyl group, and at least one curing agent. Other embodiments are directed to coating compositions formed from components comprising at least one amide functional material comprising at least one amide group blocked with a hydrolyzable silyl group, and at least one curing agent.

Embodiments of the present invention also are directed to cured coatings formed from any of the aforementioned coating compositions. Other embodiments of the present invention are directed to substrates coated with any of the aforementioned coating compositions. Further embodiments of the present invention are directed to methods for improving scratch resistance of a substrate. It will be apparent to one of ordinary skill in the art that specific embodiments of the present invention may be directed to some or all of these aspects of the present invention as well as other desirable aspects.

BACKGROUND OF THE INVENTION

Over the past decade, there has been a concerted effort to reduce atmospheric pollution caused by volatile solvents which are emitted during the painting process. However, it is often difficult to achieve high quality, smooth coating finishes, such as are required in the industrial and automotive industry, without using organic solvents which contribute greatly to flow and leveling of a coating. In addition to achieving near-flawless appearance, such coatings must be durable and abrasion resistant, yet economical and easy to apply.

The use of conventional thermally curable thermosetting resins for coating compositions can be undesirable because of the necessity for thinning the resins with solvents to provide easy application to substrates. The use of solvents is undesirable for cost and environmental reasons because the solvents must be removed from the coating composition during cure.

I. Azuma et al., "Acrylic Oligomer for High Solid Automotive Top Coating System Having Excellent Acid Resistance", *Progress in Organic Coatings* 32 (1997) 1–7, disclose acrylic oligomers containing siloxy groups synthesized using trimethylsiloxyethyl methacrylate, which have lower polarity and lower viscosity than acrylic oligomers comprising unblocked hydroxyl groups and are useful for formulating high solids automotive top coatings.

U.S. Pat. No. 6,045,870 discloses an organic solvent-based heat-curable coating composition comprising: (A) a carboxyl-containing vinyl polymer or carboxyl-containing polyester compound having an acid value of 50 to 500 mg KOH/g wherein 20 mol % or more of the carboxyl groups are silylated; (B) at least one epoxide selected from (B-1) an epoxy-, hydroxyl- and hydrolyzable alkoxysilyl-containing vinyl polymer, (B-2) the vinyl polymer (B-1) wherein 20 mol % or more of the hydroxyl groups are silylated hydroxyl groups, and (B-3) an epoxy compound having a number average molecular weight less than 1,000; (C) a crosslinked particulate polymer, and optionally (D) a reactive organopolysiloxane, the composition having a solid content of 65 weight % or more and having good acid and scratch resistance, low temperature curability, storage stability and recoat adhesion.

Color-plus-clearcoating systems involving the application of a colored or pigmented basecoat to a substrate followed by application of a transparent or clearcoat over the basecoat have become increasingly popular as original finishes for a number of consumer products including, for example automotive vehicles. The color-plus-clearcoating systems have outstanding appearance properties such as gloss and distinctness of image, due in large part to the clearcoat. Such color-plus-clearcoating systems have become popular for use with automotive vehicles, aerospace applications, floor coverings such as ceramic tiles and wood flooring, packaging coatings and the like.

Topcoat film-forming compositions, particularly those used to form the transparent clearcoat in color-plus-clearcoating systems for automotive and industrial applications, are subject to defects that occur during the assembly process as well as damage from numerous environmental elements. Such defects during the assembly process include paint defects in the application or curing of the basecoat or the clearcoat. Damaging environmental elements include acidic precipitation, exposure to ultraviolet radiation from sunlight, high relative humidity and high temperatures, defects due to contact with objects causing scratching of the coated surface, and defects due to impact with small, hard objects resulting in chipping of the coating surface.

Typically, a harder more highly crosslinked film may exhibit improved scratch resistance, but it is less flexible and much more susceptible to chipping and/or thermal cracking due to embrittlement of the film resulting from a high crosslink density. A softer, less crosslinked film, while not prone to chipping or thermal cracking, is susceptible to scratching, waterspotting, and acid etch due to a low crosslink density of the cured film.

Further, elastomeric automotive parts and accessories, for example elastomeric bumpers and hoods, are typically coated "off site" and shipped to automobile assembly plants. The coating compositions applied to such elastomeric substrates are typically formulated to be very flexible so the coating can bend or flex with the substrate without cracking. To achieve the requisite flexibility, coating compositions for use on elastomeric substrates often are formulated to produce coatings with lower crosslink densities or to include flexibilizing adjuvants which act to lower the overall film glass transition temperature (Tg). While acceptable flexibility properties can be achieved with these formulating techniques, they also can result in softer films that are susceptible to scratching. Consequently, great expense and care must be taken to package the coated parts to prevent scratching of the coated surfaces during shipping to automobile assembly plants.

Despite recent improvements in color-plus-clearcoating systems, there remains a need in the automotive coatings art for topcoats having low volatile organic content ("VOC") and which are capable of being formulated into high solids coating compositions. Other desirable attributes of the coating include good recoat adhesion and good scratch resistance without embrittlement of the film. Moreover, it would be advantageous to provide topcoats for elastomeric substrates utilizable in the industrial and automotive industries which are both flexible and resistant to scratching.

SUMMARY OF THE INVENTION

In one embodiment, the present invention is directed to a coating composition formed from components comprising (a) at least one hydroxyl functional non-vinyl material comprising at least one alcoholic hydroxyl group blocked with a hydrolyzable silyl group, and (b) at least one curing agent reactive with the at least one hydroxyl functional non-vinyl material (a).

In other embodiments, the present invention is directed to coating compositions formed from components comprising (a) at least one hydroxyl functional material comprising at least one hydroxyl group blocked with a hydrolyzable silyl group, the hydroxyl functional material having a polydispersity of less than 2, of less than 1.5, or of less than 1.2, and (b) at least one curing agent reactive with the at least one hydroxyl functional material (a).

In another embodiment, the present invention is directed to a coating composition formed from components comprising (a) at least one hydroxyl functional material comprising at least one hydroxyl group blocked with a hydrolyzable silyl group, the hydroxyl functional material having less than 5 hydroxyl functional groups, and (b) at least one curing agent reactive with the at least one hydroxyl functional material (a).

In another embodiment, the present invention is directed to a coating composition formed from components comprising: (a) at least one hydroxyl functional material comprising at least one hydroxyl group blocked with a hydrolyzable silyl group, and (b) at least 10 weight percent on a basis of total resin solids of the components which form the coating composition of at least one curing agent reactive with the at least one hydroxyl functional material (a).

In another embodiment, the present invention is directed to a coating composition formed from components comprising: (a) at least one carbamate functional material comprising at least one carbamate group blocked with a hydrolyzable silyl group, and (b) at least one curing agent reactive with the at least one carbamate functional material (a).

In another embodiment, the present invention is directed to a coating composition formed from components comprising (a) at least one carboxyl functional non-vinyl material comprising at least one carboxyl group blocked with a hydrolyzable silyl group, and (b) at least one curing agent reactive with the at least one carboxyl functional non-vinyl material (a).

In another embodiment, the present invention is directed to a coating composition formed from components comprising (a) at least one amide functional material comprising at least one amide group blocked with a hydrolyzable silyl group, and (b) at least one curing agent reactive with at least one amide functional material (a).

Additionally, a coated substrate is disclosed to be within the scope of the present invention which comprises a substrate and a cured composition coated over at least a portion of the substrate, the cured composition being formed from any of the foregoing coating compositions according to the present invention. The present invention also provides a method of coating a substrate which comprises forming over at least a portion of the substrate a cured composition, the cured composition being any of the foregoing compositions according to the present invention. Coated automotive substrates also are disclosed to be within the present invention which comprise an automotive substrate which is coated, at least in part, by any of the foregoing compositions according to the present invention. The present invention also provides methods of making coated automotive substrates comprising obtaining an automotive substrate and forming over at least a portion of the automotive substrate any of the foregoing compositions according to the present invention.

Also provided are multi-component composite coating compositions which comprise a basecoat deposited from a pigmented coating composition, and any one of the foregoing compositions according to the present invention formed as a topcoat over the basecoat. The present invention also provides methods for making multi-component composite coating compositions comprising: (a) applying a pigmented composition to a substrate to form a basecoat; and (b) applying any one of the foregoing coating compositions as a topcoating composition over at least a portion of the basecoat, and (c) curing the topcoating composition to form any of the foregoing cured compositions according to the present invention.

Additionally provided are monocoat coating compositions which comprise a pigment added to any one of the foregoing compositions according to the present invention.

Methods of improving the scratch resistance of a polymeric substrate or polymeric coating which comprise forming on the polymeric substrate or polymeric coating any of the foregoing coating compositions according to the present invention also are provided in another embodiment of the present invention. The present invention also provides methods for retaining the gloss of a polymeric substrate or polymeric coating over time which comprises forming over at least a portion of the polymeric substrate or polymeric coating any of the foregoing coating compositions according to the present invention. Also provided are methods for revitalizing the gloss of a polymeric substrate or polymeric coating comprising forming over at least a portion of the polymeric substrate or polymeric coating any of the foregoing coating compositions according to the present invention.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

DETAILED DESCRIPTION OF THE PREFERRED EMBODIMENTS

In one embodiment, the present invention is directed to coating compositions formed from components comprising at least one hydroxyl functional non-vinyl material comprising at least one alcoholic hydroxyl group blocked with a hydrolyzable silyl group, and at least one curing agent reactive with the alcoholic hydroxyl group of the at least one hydroxyl functional non-vinyl material (a). As used herein, "material" can be a compound, monomer, or polymer. Additionally, as used herein, the term "polymer" in meant to encompass oligomer, and includes without limitation both homopolymers and copolymers.

Hydrolysis of the silyl group regenerates the reactive functional group on the material which is then available for further reaction with the at least one curing agent. During formation of the coating composition, blocking of the at least one hydroxyl group with the hydrolyzable silyl group (s) can lower the viscosity of the coating composition to permit higher solids, lower VOC coating compositions to be prepared. In one embodiment, the VOC of coating compositions prepared according to the present invention are less than 4 lbs/gallon, and can be less than 3.6 lbs/gallon. The VOC of the coating compositions can be determined, for example, by ASTM Method 24, which is incorporated herein by reference.

In one embodiment, the hydrolyzable silyl groups can have the following structure (IX):

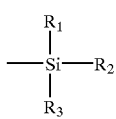

(IX)

wherein each $R_1$, $R_2$ and $R_3$, which may be identical or different, represents an alkyl group having from 1 to 18 carbon atoms, a phenyl group or an allyl group.

Non-limiting examples of suitable compounds which can be reacted with the alcoholic hydroxyl group to form the silyl group comprise hexamethyidisilazane, trimethylchlorosilane, trimethylsilyldiethylamine, t-butyl dimethylsilyl chloride, diphenyl methylsilyl chloride, hexamethyl disilylazide, hexamethyl disiloxane, trimethylsilyl triflate, hexamethyldisilyl acetamide, N,N'-bis [trimethylsilyl]-urea, hexamethyldisiloxane, ketene methyl trialkylsilyl acetals, triethylsilyl perchlorate, allylsilanes and mixtures of any of the foregoing.

Further examples of suitable compounds for silylation reactions, and suitable reaction conditions and reagents for trimethylsilylation reactions are discussed in the Example below and in T. Greene et al., *Protective Groups in Organic Synthesis*, (2d. ed. 1991) at pages 68–86 and 261–263, which are incorporated herein by reference.

In one embodiment, at least 1 mole percent of the alcoholic hydroxyl groups of the at least one hydroxyl functional non-vinyl material are blocked with hydrolyzable silyl groups. In another embodiment, at least 25 mole percent of the alcoholic hydroxyl groups of the at least one hydroxyl functional non-vinyl material are blocked with hydrolyzable silyl groups, while in yet another embodiment, at least 33 mole percent of the alcoholic hydroxyl groups of the at least one hydroxyl functional non-vinyl material are blocked with hydrolyzable silyl groups. In another embodiment, substantially all of the alcoholic hydroxyl groups of the at least one hydroxyl functional non-vinyl material are blocked with hydrolyzable silyl groups. As used herein, "substantially all of the alcoholic hydroxyl groups" means greater than 90%, and can mean greater than 95% of the alcoholic hydroxyl groups. The percentage of blocked alcoholic hydroxyl groups may include any percentage within the range of recited values, inclusive of the recited values.

In one embodiment, the at least one hydroxyl functional non-vinyl material can have a hydroxyl equivalent weight, prior to silylation, of at least 31 mg KOH per gram of the at least one hydroxyl functional non-vinyl material. In other embodiments, the at least one hydroxyl functional non-vinyl material generally have a hydroxyl equivalent weight, prior to silylation, of less than 2000 mg KOH per gram, can have a hydroxyl equivalent weight, prior to silylation, of less than 1000 mg KOH per gram, and typically have a hydroxyl equivalent weight of less than 400 mg KOH of at least one hydroxyl functional non-vinyl material. The hydroxyl equivalent weight may range between any combination of these values inclusive of the recited values.

In one embodiment, the at least one hydroxyl functional non-vinyl material has less than 5 alcoholic hydroxyl functional groups, in another embodiment, the material has less than or equal to 4 alcoholic hydroxyl functional groups, and in yet another embodiment, 3 alcoholic hydroxyl groups. As used herein, "alcoholic hydroxyl group" means a hydroxyl group which is attached to a carbon which is not part of a carbonyl group, i.e., is not part of a carboxyl group.

The at least one hydroxyl functional non-vinyl material backbone can be a compound which comprises at least one linkage selected from an ester linkage, a urethane linkage, a urea linkage, an amide linkage, a siloxane linkage, and an ether linkage, or a polymer comprising at least one such linkage, for example polyester, polyurethane, polyether, polyurea, polyamide, polysiloxane, and copolymers thereof. The at least one hydroxyl functional material is a non-vinyl material. As used herein, a "non-vinyl material" refers to any material which is not formed by free radical polymerization of monomers containing vinyl functional groups. A used herein, "vinyl functional group" refers to a group having the formula $CH_2=C<$. In one embodiment, the at least one hydroxyl functional non-vinyl material is a hydroxyl functional polyester.

In one embodiment, the at least hydroxyl functional non-vinyl material is formed from components comprising (a) at least one half-ester formed from components comprising (i) at least one polyol and (ii) at least one anhydride, and (b) at least one epoxy functional material or at least one aliphatic diol.

Suitable compounds and polymers comprising ester groups and at least one alcoholic hydroxyl group include half-esters formed from reacting at least one polyol with at least one anhydride such as 1,2-anhydrides. The half-esters are typically used because they are of relatively low molecular weight and are quite reactive with epoxy functionality.

The half-ester may be obtained by reaction between a polyol and a 1,2-anhydride under conditions sufficient to ring open the anhydride forming the half-ester with substantially no polyesterification occurring. Such reaction products are of relatively low molecular weight with narrow molecular weight distributions and low viscosity. By "substantially no polyesterification occurring" means that the carboxyl groups formed by the reaction of the anhydride are not further esterified by the polyol in a recurring manner. This means that generally less than 10, and typically less than 5 percent by weight of high molecular weight polyester is formed.

The 1,2-anhydride and polyol generally are mixed together and the reaction is conducted in the presence of an inert atmosphere such as nitrogen and a solvent such as a ketone or aromatic hydrocarbon to dissolve the solid ingredients and/or lower the viscosity of the reaction mixture.

For the desired ring opening reaction and half-ester formation, a 1,2-dicarboxylic anhydride can be used. Reaction of a polyol with a carboxylic acid instead of an anhydride would require esterification by condensation and elimination water would have to be removed by distillation. Under these conditions, this would promote undesired polyesterification. Also, the reaction temperature is generally low, i.e., less than 135° C. and can range from 70° C. to 135° C. The time of reaction can vary somewhat depending upon the temperature of reaction, and generally ranges from 10 minutes to 24 hours.

The equivalent ratio of the at least one anhydride to the hydroxyl on the at least one polyol may be at least 0.8:1 (the anhydride being considered monofunctional) to obtain maximum conversion to the desired half-ester. Ratios less than 0.8:1 can be used but such ratios result in increased formation of lower functionality half-esters.

Among the polyols which can be used are simple polyols, that is, those containing from 2 to 20 carbon atoms, as well as polymeric polyols such as polyester polyols, polyurethane polyols, and acrylic polyols.

Among the simple polyols are diols, triols, tetrols and mixtures thereof. Examples of the polyols include those containing from 2 to 10 carbon atoms such as aliphatic polyols. Specific examples include but are not limited to the following compositions: di-trimethylol propane (bis(2,2-dimethylol)dibutylether), pentaerythritol, 1,2,3,4-butanetetrol, sorbitol, trimethylolpropane, trimethylolethane, 1,2,6-hexanetriol, glycerine, trishydroxyethyl isocyanurate, dimethylol propionic acid, 1,2,4-butanetriol, TMP/epsilon-caprolactone triols, ethylene glycol, 1,2-propanediol, 1,3-propanediol, 1,4-butanediol, 1,5-pentanediol, 1,6-hexanediol, 2-ethyl-1,3-hexanediol, neopentyl glycol, diethylene glycol, dipropylene glycol, 1,4-cyclohexanedimethanol, and 2,2,4-trimethylpentane-1,3-diol. In one embodiment, the at least one polyol is trimethylolpropane.

With regard to oligomeric polyols, suitable polyols are polyols made from reaction of diacids with diols, triols and/or tetrols, such as trimethylol propane/cyclohexane diacid and trimethylol propane/adipic acid.

With regard to polymeric polyols, the polyester polyols are prepared by esterification of an organic polycarboxylic acid or anhydride thereof with organic polyols and/or an epoxide. Usually, the polycarboxylic acids and polyols are aliphatic or aromatic dibasic acids or anhydrides and diols.

The polyols which are usually employed in making the polyester include trimethylol propane, di-trimethylol propane, alkylene glycols such as ethylene glycol, neopentyl glycol and other glycols such as hydrogenated bisphenol A, cyclohexanediol, cyclohexanedimethanol, the reaction products of lactones and diols, for example, the reaction product of epsilon-caprolactone and ethylene glycol, hydroxyalkylated bisphenols, polyester glycols for example poly (oxytetramethylene)glycol, and the like.

Useful anhydrides include aliphatic, cycloaliphatic, olefinic, cycloolefinic and aromatic anhydrides. Substituted aliphatic and aromatic anhydrides also are useful provided the substituents do not adversely affect the reactivity of the anhydride or the properties of the resultant polyester. Examples of substituents include chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride (preferred), tetrachlorophthalic anhydride, endomethylene tetrahydrophthalic anhydride, chlorendic anhydride, itaconic anhydride, citraconic anhydride, and maleic anhydride.

Besides the polyester polyols formed from polybasic acids and polyols, polylactone-type polyesters also can be employed. These products are formed from the reaction of a lactone such as epsilon-caprolactone and a polyol such as ethylene glycol, diethylene glycol and trimethylolpropane.

Besides polyester polyols, polyurethane polyols such as polyester-urethane polyols which are formed from reacting an organic polyisocyanate with a polyester polyol such as those described above can be used. The organic polyisocyanate is reacted with a polyol so that the OH/NCO equivalent ratio is greater than 1:1 so that the resultant product contains free hydroxyl groups. The organic polyisocyanate which is used in preparing the polyurethane polyols can be an aliphatic or aromatic polyisocyanate or a mixture. Diisocyanates are generally used, although higher polyisocyanates such as triisocyanates can be also used, but they do result in higher viscosities.

Examples of suitable diisocyanates are 4,4'-diphenylmethane diisocyanate, 1,4-tetramethylene diisocyanate, isophorone diisocyanate and 4,4'-methylenebis(cyclohexyl isocyanate). Examples of suitable higher functionality polyisocyanates are polymethylene polyphenol isocyanates.

At least a portion or all of the acid functional groups can be reacted with at least one epoxy functional material and/or at least one aliphatic diol to provide alcoholic hydroxyl groups for silylation.

Useful epoxy functional materials include epoxy functional monomers such as glycidyl methacrylate, ethylene oxide, butylene oxide, propylene oxide (preferred), cyclohexene oxide, glycidyl ethers such as phenyl glycidyl ether, n-butyl glycidyl ether, cresyl glycidyl ether, isopropyl glycidyl ether, glycidyl esters such as glycidyl versatate, for example CARDURA E available from Shell Chemical Co., and mixtures of any of the foregoing. Other useful epoxy functional materials include polymers comprising at least two epoxide or oxirane groups per molecule. These materials often are referred to as di- or polyepoxides.

Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials include polyepoxides obtained by reacting an epihalohydrin (such as epichlorohydrin or epibromohydrin) with a di- or polyhydric alcohol in the presence of an alkali. Suitable polyhydric alcohols include polyphenols such as resorcinol, catechol, hydroquinone, bis(4-hydroxyphenyl)-2,2-propane, i.e., bisphenol A, bis(4-hydroxyphenyl)-1,1-isobutane, 4,4-dihydroxybenzophenone, bis(4-hydroxyphenol)-1,1-ethane, bis(2-hydroxyphenyl)-methane and 1,5-hydroxynaphthalene.

Examples of useful polyepoxides include diglycidyl ethers of bisphenol A, such as EPON® 828 epoxy resin which is commercially available from Shell Chemical Company. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers.

The equivalent ratio of epoxy groups to acid groups on the ester generally ranges from 0.1:1 to 2:1, can range from 0.5:1 to 1:1, and typically ranges from 0.8:1 to 1:1.

Useful aliphatic diols include diols containing a primary hydroxyl such as 1,2-propanediol, 1,3-propanediol, 1,2-butanediol, 1,3-butanediol, 1,2-pentanediol, 1,4-pentanediol, 1,2-hexanediol, 1,5-hexanediol, 2-ethyl-1,3-hexanediol, diethylene glycol, dipropylene glycol, 1,4-cyclohexanedimethanol, 2,2,4-trimethyl-1,3-pentanediol, and 3,3-dimethyl-1,2-butanediol.

In one embodiment, the present invention is directed to coating compositions as previously described, wherein the at least one hydroxyl functional non-vinyl material comprises at least one compound having the following structure (X):

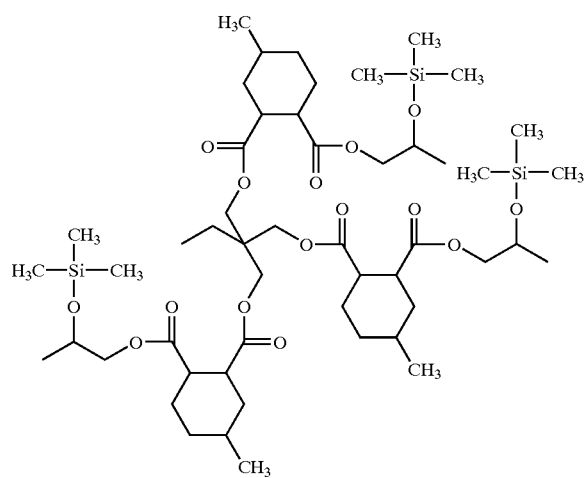

(X)

For example, the silylated compound can be the reaction product of trimethylolpropane, methylhexahydrophthalic anhydride, propylene oxide, and hexamethyl disylizid reacted at a ratio of 1:3:3:3.

Other useful hydroxyl functional non-vinyl materials include polyurethane polymers containing terminal hydroxyl groups. The polyurethane polyols which can be used are those prepared by reacting polyols including polymeric polyols with polyisocyanates. Non-limiting examples of suitable hydroxy functional polyurethanes include the reaction product of DESMODUR 3300, available from Bayer USA, with an excess of a suitable glycol, such as ethylene glycol or propylene glycol.

Polyureas containing terminal hydroxyl groups which also can be used can be those prepared by reacting polyamines with polyisocyanates. Non-limiting examples of suitable hydroxy functional polyureas include the reaction product of an excess of DESMODUR 3300, available from Bayer USA, with ethylene diamine, followed by a reaction of the resultant product with an excess of a suitable glycol, such as ethylene glycol or propylene glycol.

Nonlimiting examples of suitable polyether polyols include polyalkylene ether polyols such as those having the following structural formulas (VII) or (VIII):

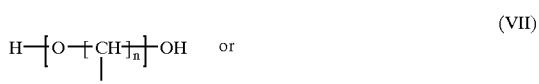

(VII)

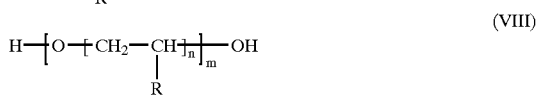

(VIII)

wherein the substituent group R represents hydrogen or a lower alkyl group of 1 to 5 carbon atoms including mixed substituents, n has a value ranging from 2 to 6, and m has a value ranging from 8 to 100 or higher. Nonlimiting examples of polyalkylene ether polyols include poly(oxytetramethylene) glycols, poly(oxytetraethylene) glycols, poly(oxy-1,2-propylene) glycols, and poly(oxy-1,2-butylene) glycols.

Also useful can be polyether polyols formed from oxyalkylation of various polyols, for example but not limited to, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One oxyalkylation method that can be used is reaction of a polyol with an alkylene oxide, including but not limited to, propylene or ethylene oxide, in the presence of an acidic or basic catalyst. Specific, nonlimiting examples of polyethers include those sold under the names TERATHANE and TERACOL, available from E.I. duPont de Nemours and Co., Inc.

Suitable hydroxyl functional polyamides can be produced by reacting a diamine with an excess of a dicarboxylic acid, followed by reacting the resulting acid functional polyamide with excess glycol.

In one embodiment, the at least one hydroxyl functional non-vinyl material has a polydispersity of less than 2, while in another embodiment, the material has a polydispersity of less than 1.5, and in yet another embodiment, a polydispersity of less than 1.2. Polydispersity is the ratio of the weight average molecular weight to the number average molecular weight of the hydroxyl functional non-vinyl material. G. Odian, *Principles of Polymerization*, (3d Ed. 1991) pp. 19–24, which is incorporated herein by reference. Weight average molecular weight and number average molecular weight are determined by gel permeation chromatography using polystyrene as a standard.

In an alternative embodiment, silyl groups can be used to block carbamate functional groups of carbamate functional materials. Carbamate functional groups can be introduced into the at least one hydroxyl functional non-vinyl material discussed above by reacting a polyisocyanate with a polyester having hydroxyl functionality and containing pendant carbamate groups. Alternatively, the carbamate functional groups can be incorporated into the at least one hydroxyl functional non-vinyl material by reacting the at least one hydroxyl functional non-vinyl material with a low molecular weight carbamate functional material via a "transcarbamoylation" process. The low molecular weight carbamate functional material, which can be derived from an alcohol or glycol ether, can react with free hydroxyl groups of a polyol, that is, material comprising an average of two or more hydroxyl groups per molecule, yielding a carbamate functional material and the original alcohol or glycol ether. For example, the polyurethane can be prepared by reacting a polyisocyanate with a polyester polyol and a hydroxyalkyl carbamate or isocyanic acid as separate reactants. Nonlimiting examples of suitable polyisocyanates include aromatic isocyanates, (such as 4,4'-diphenylmethane diisocyanate, 1,3-phenylene diisocyanate, and toluene diisocyanate), and aliphatic polyisocyanates (such as 1,4-tetramethylene diisocyanate, and 1,6-hexamethylene diisocyanate). Cycloaliphatic diisocyanates, such as, for example 1,4-cyclohexyl diisocyanate and isophorone diisocyanate can be employed.

In one embodiment, the present invention is directed to a coating composition formed from components comprising: (a) at least one carbamate functional material comprising at least one carbamate group blocked with a hydrolyzable silyl group, and (b) at least one curing agent reactive with the carbamate group of (a).

In an alternative embodiment, silyl groups can be used to block carboxyl functional groups of carboxyl functional materials. In one embodiment, the present invention is directed to a coating composition formed from components comprising (a) at least one carboxyl functional non-vinyl material comprising at least one carboxyl group blocked with a hydrolyzable silyl group, and (b) at least one curing agent reactive with the carboxyl group of (a).

In an alternative embodiment, silyl groups can be used to block amide functional groups of amide functional materials. In one embodiment, the present invention is directed to a coating composition formed from components comprising (a) at least one amide functional non-vinyl material comprising at least one amide group blocked with a hydrolyzable silyl group, and (b) at least one curing agent reactive with the amide group of (a).

In one embodiment, the present invention is directed to compositions as previously described wherein the silyl-blocked material, when added to the other components which form the composition, is present in the composition in an amount ranging from 0.1 to 90 weight percent based on total weight of the resin solids of the components which form the composition. As used herein "based on total weight of the resin solids" of the composition means that the amount of the component added during the formation of the composition is based upon the total weight of the solids (non-volatiles) of any film-forming component, any polysiloxane, any curing agent present during the formation of the coating composition, and any silyl-blocked material present, but not including the particles, any solvent, or any additive solids such as hindered amine stabilizers, UV light absorbers, catalysts, flow modifiers, and pigments including extender pigments and fillers.

In another embodiment, the present invention is directed to compositions as previously described wherein the at least one hydroxyl functional non-vinyl material having at least one alcoholic hydroxyl group blocked with a hydrolyzable silyl group, when added to the other components which form the composition, is present in the composition in an amount of at least 0.1 weight percent based on total weight of the resin solids of the components which form the composition.

In another embodiment, the present invention is directed to compositions as previously described wherein the at least one hydroxyl functional non-vinyl material having at least one alcoholic hydroxyl group blocked with a hydrolyzable silyl group, when added to the other components which form the composition, is present in the composition in an amount greater than 1 weight percent based on total weight of the resin solids of the components which form the composition.

In another embodiment, the present invention is directed to compositions as previously described wherein the at least one hydroxyl functional non-vinyl material having at least one alcoholic hydroxyl group blocked with a hydrolyzable silyl group, when added to the other components which form the composition, is present in the composition in an amount ranging from 15 weight percent to 85 weight percent based on total weight of the resin solids of the components which form the composition.

In another embodiment, the present invention is directed to compositions as previously described wherein the at least one hydroxyl functional non-vinyl material having at least one alcoholic hydroxyl group blocked with a hydrolyzable silyl group, when added to the other components which form the composition, is present in the composition in an amount of less than 90 weight percent based on total weight of the resin solids of the components which form the composition.

In another embodiment, the present invention is directed to compositions as previously described wherein the at least one hydroxyl functional non-vinyl material having at least one alcoholic hydroxyl group blocked with a hydrolyzable silyl group, when added to the other components which form the composition, is present in the composition in an amount of less than 60 weight percent based on total weight of the resin solids of the components which form the composition.

In another embodiment, the present invention is directed to compositions as previously described wherein the at least one hydroxyl functional non-vinyl material having at least one alcoholic hydroxyl group blocked with a hydrolyzable silyl group, when added to the other components which form the composition, is present in the composition in an amount of less than 30 weight percent based on total weight of the resin solids of the components which form the composition.

In another embodiment, the present invention is directed to compositions as previously described wherein the at least one hydroxyl functional non-vinyl material having at least one alcoholic hydroxyl group blocked with a hydrolyzable silyl group, when added to the other components which form the composition, is present in the composition in an amount of less than 10 weight percent based on total weight of the resin solids of the components which form the composition. The weight percent of silyl blocked material can range between any combination of these values inclusive of the recited ranges.

The coating compositions of the present invention comprise at least one curing agent. In one embodiment, the curing agent is selected from aminoplast resins, polyisocyanates, blocked polyisocyanates, triazine derivatives of isocyanates, anhydrides, polyepoxides, and mixtures of the foregoing.

As used herein, the term "cure" as used in connection with a composition, e.g., "a cured composition," shall mean that at least a portion of the crosslinkable components which form the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density values indicate a higher degree of crosslinking in the coating.

In one embodiment, the curing agent is an aminoplast. Aminoplast resins, which comprise phenoplasts, as curing agents for hydroxyl and carbamate functional group-containing materials are well known in the art. Suitable aminoplasts, such as, for example those discussed above, are known to those of ordinary skill in the art. Aminoplasts can be obtained from the condensation reaction of formaldehyde with an amine or amide. Nonlimiting examples of amines or amides include melamine, urea, or benzoguanamine. Condensates with other amines or amides can be used, for example aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, in certain instances monomeric and at least partially etherified with one or more alcohols containing from one to four carbon atoms. Nonlimiting examples of suitable aminoplast resins are commercially available, for example from Cytec Industries, Inc. under the trademark CYMEL®, and from Solutia, Inc. under the trademark RESIMENE®.

In another embodiment, the present invention is directed to coating compositions as previously described wherein the aminoplast curing agent, when added to the other components which form the coating composition, is generally present in an amount ranging from 2 weight percent to 65 weight percent based on total weight of the resin solids of the components from which the coating composition is formed.

Other curing agents suitable for use include, but are not limited to, polyisocyanate curing agents. As used herein, the term "polyisocyanate" is intended to include blocked (or capped) polyisocyanates as well as unblocked polyisocyanates. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. When used, the polyisocyanate curing agent is typically present, when added to the other components in the coating composition, in an amount ranging from 5 to 65 weight percent, can be present in an amount ranging from 10 to 45 weight percent, and often are present in an amount ranging from 15 to 40 percent by weight based on the total weight of the resin solids of the components which form the coating composition.

Other useful curing agents comprise triazine derived isocyanates such as, for example the tricarbamoyl triazine compounds described in detail in U.S. Pat. No. 5,084,541, which is incorporated by reference herein. When used, the triazine derived isocyanates can be present, when added to the other components in the coating composition, in an amount ranging up to 20 weight percent, and can be present in an amount ranging from 1 to 20 weight percent, based on the total weight of the resin solids of the components which form the coating composition.

Anhydrides as curing agents for hydroxyl functional group-containing materials also are well known in the art and can be used in the present invention. Nonlimiting examples of anhydrides suitable for use as curing agents in the coating compositions of the invention include those comprising at least two carboxylic acid anhydride groups per molecule which are derived from a mixture of monomers comprising an ethylenically unsaturated carboxylic acid anhydride and at least one vinyl co-monomer, for example styrene, alpha-methyl styrene, vinyl toluene, and the like. Nonlimiting examples of suitable ethylenically unsaturated carboxylic acid anhydrides include maleic anhydride, citraconic anhydride, and itaconic anhydride. Alternatively, the anhydride can be an anhydride adduct of a diene polymer such as maleinized polybutadiene or a maleinized copolymer of butadiene, for example a butadiene/styrene copolymer. These and other suitable anhydride curing agents are described in U.S. Pat. No. 4,798,746 at column 10, lines 16–50, and in U.S. Pat. No. 4,732,790 at column 3, lines 41–57, both of which are incorporated herein by reference.

When desired, appropriate mixtures of curing agents may be used. It should be mentioned that coating compositions can be formulated as a one-component coating composition where a curing agent such as an aminoplast resin and/or a triazine compound such as those described above is admixed with other coating composition components. The one-component coating composition can be storage stable as formulated. Alternatively, coating compositions can be formulated as a two-component coating composition where a polyisocyanate curing agent such as those described above can be added to a pre-formed admixture of the other coating composition components just prior to application. The pre-formed admixture can comprise curing agents such as aminoplast resins and/or triazine compounds such as those described above.

Generally, the curing agent, when added to other components that form the coating composition, is present in the coating composition in an amount ranging from 5 to 95 weight percent based on total weight of the resin solids of the components from which the coating composition is formed. In one embodiment, the curing agent, when added to other components that form the coating composition, is present in the coating composition in an amount ranging from 15 to 50 weight percent based on total weight of the resin solids of the components from which the coating composition is formed.

In another embodiment, the curing agent, when added to other components that form the coating composition, is present in the coating composition in an amount greater than 15 weight percent based on total weight of the resin solids of the components from which the coating composition is formed.

The components from which the coating composition are formed further can comprise at least one polysiloxane, different from component (a), comprising at least one reactive functional group. In one embodiment, at least one of functional groups of the at least one polysiloxane can be blocked with a silyl group such as are described above.

In one embodiment, the at least one polysiloxane different from component (a) comprises at least one of the following structural units (I)

$R^1_n R^2_m SiO_{(4-n-m)/2}$ (I)

wherein each substituent group $R^1$, which may be identical or different, represents a group selected from H, OH, a monovalent hydrocarbon group, and a monovalent siloxane group, each substituent group $R^2$, which may be identical or different, and which may be identical or different from $R^1$, represents a group comprising at least one reactive functional group.

It should be understood that the "at least one polysiloxane having at least one structural unit (I)" above is a polymer that contains at least two Si atoms per molecule. Again, as used herein, the term "polymer" in meant to encompass oligomer, and includes without limitation both homopolymers and copolymers. It should also be understood that the at least one polysiloxane can include linear, branched, dendritic or cyclic polysiloxanes.

Also, as used herein, the term "reactive" refers to a functional group that forms a covalent bond with another functional group under conditions sufficient to cure the composition.

Each of m and n depicted in the at least one structural unit (I) above fulfill the requirements of 0<n<4, 0<m<4 and 2≦(m+n)<4. When (m+n) is 3, the value represented by n can be 2 and the value represented by m is 1. Likewise, when (m+n) is 2, the value represented by each of n and m is 1.

As used herein, a "monovalent hydrocarbon group" means a monovalent group having a backbone repeat unit based exclusively on carbon. As used herein, "monovalent" refers to a substituent group that, as a substituent group, forms only one single, covalent bond. For example a monovalent group on the at least one polysiloxane will form one single covalent bond to a silicon atom in the backbone of the at least one polysiloxane polymer. As used herein, "hydrocarbon groups" are intended to encompass both branched or unbranched hydrocarbon groups.

Thus, when referring to a "monovalent hydrocarbon group," the hydrocarbon group can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of lower alkyl groups include, for example methyl, ethyl, propyl, and butyl groups. As used herein, "lower alkyl" refers to alkyl groups having from 1 to 6 carbon atoms. One or more of the hydrogen atoms of the hydrocarbon can be substituted with heteroatoms. As used herein, "heteroatoms" means elements other than carbon, for example oxygen, nitrogen, and halogen atoms.

As used herein, "siloxane" means a group comprising a backbone comprising two or more —SiO— groups. The siloxane groups represented by $R^1$ and R (discussed below) can be branched or unbranched, and linear or cyclic. The siloxane groups can be substituted with pendant organic substituent groups, for example alkyl, aryl, and alkaryl groups. The organic substituent groups can be substituted with heteroatoms, for example oxygen, nitrogen, and halogen atoms, reactive functional groups, for example those reactive functional groups discussed above with reference to $R^2$, and mixtures of any of the foregoing.

In another embodiment, each substituent group $R^2$, which may be identical or different, represents a group comprising at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group, wherein m and n fulfill the requirements of 0<n<4, 0<m<4 and 2≦(m+n)<4.

In one embodiment, the present invention is directed to a coating composition as previously described, wherein the at least one polysiloxane comprises at least two reactive functional groups.

In another embodiment, the present invention is directed to a coating composition as previously described, wherein at least one $R^2$ group represents a group comprising at least one reactive functional group selected from a hydroxyl group and a carbamate group. In yet another embodiment, the present invention is directed to a coating composition as previously described, wherein at least one $R^2$ group represents a group comprising at least two reactive functional groups selected from a hydroxyl group and a carbamate group. In another embodiment, the present invention is directed to a coating composition as previously described, wherein at least one $R^2$ group represents a group comprising an oxyalkylene group and at least two hydroxyl groups.

In one embodiment, the present invention is directed to a coating composition as previously described, wherein the at least one polysiloxane has the following structure (II) or (III):

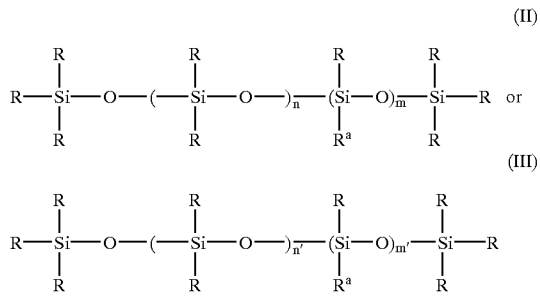

wherein: m has a value of at least 1; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and —R"comprises the following structure (IV):

$$—R^3—X \quad (IV)$$

wherein —$R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

As used herein, "alkylene" refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively, as well as isoprene and myrcene.

As used herein, "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as —$(CH_2)_3OCH_2C(CH_2OH)_2(CH_2CH_2—)$.

As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-α, α-dimethylbenzyl isocyanate, such as —$(CH_2)_2C_6H_4$— and —$CH_2CH(CH_3)C_6H_3(C(CH_3)_2$ (NCO). As used herein, "alkenylene" refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, for example, 2,4,7,9-tetramethyl-5-decyne-4,7-diol which is commercially available from Air Products and Chemicals, Inc. of Allentown, Pa. as SURFYNOL 104.

Formulae (II) and (III) are diagrammatic, and are not intended to imply that the parenthetical portions are necessarily blocks, although blocks may be used where desired. In some cases the polysiloxane may comprise a variety of siloxane units. This is increasingly true as the number of siloxane units employed increases, and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

In one embodiment, the present invention is directed to a coating composition prepared from components as previously described comprising the polysiloxane as previously described in which the substituent group $R^3$ represents an oxyalkylene group. In another embodiment, $R^3$ represents an oxyalkylene group, and X represents a group which comprises at least two reactive functional groups.

In another embodiment, the present invention is directed to any coating composition prepared from components as previously described comprising at least one polysiloxane having the structure (II) or (III) described above, wherein (n+m) ranges from 2 to 9. In yet another embodiment, the components can comprise at least one polysiloxane having the structure (II) or (III) described above, (n+m) ranges from 2 to 3. In another embodiment, the components can comprise at least one polysiloxane having the structure (II) or (III) described above, (n'+m') ranges from 2 to 9. In another embodiment, the components can comprise at least one polysiloxane having the structure (II) or (III) described above, (n'+m') ranges from 2 to 3.

In one embodiment, the present invention is directed to any coating composition as previously described in which the components comprise at least one polysiloxane in which X represents a group comprising at least one reactive functional group selected from a hydroxyl group and a carbamate group. In another embodiment, the present invention is directed to polysiloxane as a component as previously described wherein X represents a group which comprises at least two hydroxyl groups. In yet another embodiment, the present invention is directed to polysiloxane as a component as previously described wherein X represents a group which comprises at least one group selected from H, a monohydroxy-substituted organic group, and a group having the following structure (V):

$$R^4—(CH_2—OH)_p \quad (V)$$

wherein the substituent group $R^4$ represents

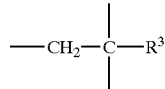

when p is 2 and the substituent group $R^3$ represents a $C_1$ to $C_4$ alkylene group, or
the substituent group $R^4$ represents

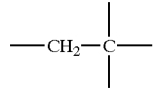

when p is 3,
wherein at least a portion of X represents a group having the structure (V). In another embodiment, the present invention is directed to any cured composition as previously described wherein m is 2 and p is 2.

In an embodiment of the present invention, the at least one polysiloxane is nonreactive with the particles.

In one embodiment, the present invention is directed to any coating 20 composition as previously described comprising at least one polysiloxane having the structure (II) or (III), wherein, if no curing agent is present, and if the at least one polysiloxane is a partial condensate of a silanol, then less than 70% by weight of the partial condensate is the partial condensate of $CH_3Si(OH)_3$. These components used in these various embodiments can be selected from the coating components discussed above, and additional components also can be selected from those recited above.

In another embodiment, the present invention is directed to any coating composition as previously described, wherein the components from which the composition is formed comprise at least one polysiloxane which is the reaction product of at least the following reactants: (i) at least one polysiloxane of the formula (VI):

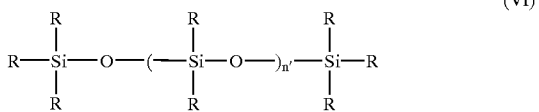

(VI)

wherein each substituent group R, which may be identical or different, represents a group selected from H, OH, a monovalent hydrocarbon group, a monovalent siloxane group, and mixtures of any of the foregoing; at least one of the groups represented by R is H, and n' ranges from 0 to 100, also can range from 0 to 10, and can further range from 0 to 5 such that the percent of SiH content of the polysiloxane ranges from 2 to 50 percent, and can range from 5 to 25 percent; and (ii) at least one molecule which comprises at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group, and at least one unsaturated bond capable of undergoing a hydrosilylation reaction. In one embodiment, the at least one functional group is selected from primary hydroxyl groups.

It should be appreciated that the various R groups can be the same or different, and, in certain embodiments, the R groups will be entirely monovalent hydrocarbon groups or will be a mixture of different groups such as monovalent hydrocarbon groups and hydroxyl groups.

In another embodiment, this reaction product is ungelled. As used herein, "ungelled" refers to a reaction product that is substantially free of crosslinking and has an intrinsic viscosity when dissolved in a suitable solvent, as determined, for example in accordance with ASTM-D1795 or ASTM-D4243. The intrinsic viscosity of the reaction product is an indication of its molecular weight. A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

It also should be noted that the level of unsaturation contained in reactant (ii) above, can be selected to obtain an ungelled reaction product. In other words, when a polysiloxane containing silicon hydride (i) having a higher average value of Si—H functionality is used, reactant (ii) can have a lower level of unsaturation. For example the polysiloxane containing silicon hydride (i) can be a low molecular weight material where n' ranges from 0 to 5 and the average value of Si—H functionality is two or less. In this case, reactant (ii) can contain two or more unsaturated bonds capable of undergoing hydrosilylation reaction without the occurrence of gelation.

Nonlimiting examples of polysiloxanes containing silicon hydride (i) include 1,1,3,3-tetramethyl disiloxane where n' is 0 and the average Si—H functionality is two; and polymethyl polysiloxane containing silicon hydride, where n' ranges from 4 to 5 and the average Si—H functionality is approximately two, such as is commercially available from BASF Corporation as MASILWAX BASE®.

Materials for use as reactant (ii) above can include hydroxyl functional group-containing allyl ethers such as those selected from trimethylolpropane monoallyl ether, pentaerythritol monoallyl ether, trimethylolpropane diallyl ether, polyoxyalkylene alcohols such as polyethoxylated alcohol, polypropoxylated alcohol, and polybutoxylated alcohol, undecylenic acid-epoxy adducts, allyl glycidyl ether-carboxylic acid adducts, and mixtures of any of the foregoing. Mixtures of hydroxyl functional polyallyl ethers with hydroxyl functional monoallyl ethers or allyl alcohols are suitable as well. In certain instances, reactant (ii) can contain at least one unsaturated bond in a terminal position. Reaction conditions and the ratio of reactants (i) and (ii) are selected so as to form the desired functional group.

The hydroxyl functional group-containing polysiloxane can be prepared by reacting a polysiloxane containing hydroxyl functional groups with an anhydride to form the half-ester acid group under reaction conditions that favor only the reaction of the anhydride and the hydroxyl functional groups, and avoid further esterification from occurring. Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing at least one secondary hydroxyl group. Nonlimiting examples of suitable monoepoxides are phenyl glycidyl ether, n-butyl glycidyl ether, cresyl glycidyl ether, isopropyl glycidyl ether, glycidyl versatate, for example CARDURA E available from Shell Chemical Co., and mixtures of any of the foregoing.

In another embodiment, the present invention is directed to coating compositions as previously described wherein the components from which the coating compositions are formed comprise at least one polysiloxane which is a carbamate functional group-containing polysiloxane which comprises the reaction product of at least the following reactants:

(i) at least one polysiloxane containing silicon hydride of structure (VI) above where R and n' are as described above for that structure;

(ii) at least one hydroxyl functional group-containing material comprising one or more unsaturated bonds capable of undergoing hydrosilylation reaction as described above; and (iii) at least one low molecular weight carbamate functional material, comprising the reaction product of an alcohol or glycol ether and a urea.

Examples of such "low molecular weight carbamate functional material" include, but are not limited to, alkyl carbamates such as methyl carbamate and hexyl carbamates, glycol ether carbamates described in U.S. Pat. Nos. 5,922,475 and 5,976,701, which are incorporated herein by reference.

The carbamate functional groups can be incorporated into at least one polysiloxane by into the at least one polysiloxane with the low molecular weight carbamate functional material via a "transcarbamoylation" process. The low molecular weight carbamate functional material, which can be derived from an alcohol or glycol ether, can react with free hydroxyl groups of a polyol, that is, material comprising an average of two or more hydroxyl groups per molecule, yielding a carbamate functional material and the original alcohol or glycol ether. Reaction conditions and the ratio of reactants (i), (ii) and (iii) are selected so as to form the desired groups.

Examples of such "low molecular weight carbamate functional material" include, but are not limited to, alkyl carbamates such as methyl carbamate and hexyl carbamates, and glycol ether carbamates such as those described in U.S. Pat. Nos. 5,922,475 and 5,976,701, which are incorporated herein by reference.

The low molecular weight carbamate functional material can be prepared by reacting the alcohol or glycol ether with urea in the presence of a catalyst such as butyl stannoic acid. Nonlimiting examples of suitable alcohols include lower molecular weight aliphatic, cycloaliphatic and aromatic alcohols, for example methanol, ethanol, propanol, butanol, cyclohexanol, 2-ethylhexanol, and 3-methylbutanol. Nonlimiting examples of suitable glycol ethers include ethylene glycol methyl ether, and propylene glycol methyl ether. The incorporation of carbamate functional groups into the at least one hydroxyl functional non-vinyl material also can be achieved by reacting isocyanic acid with free hydroxyl groups of the at least one hydroxyl functional non-vinyl material.

As aforementioned, in addition to or in lieu of hydroxyl and/or carbamate functional groups, at least one polysiloxane can contain one or more other reactive functional groups such as carboxyl groups, isocyanate groups, blocked isocyanate groups, carboxylate groups, primary amine groups, secondary amine groups, tertiary amine groups, amide groups, urea groups, urethane groups, acrylate groups, vinyl groups, epoxy groups, and mixtures of any of the foregoing.

When the at least one polysiloxane contains carboxyl functional groups, into the at least one polysiloxane can be prepared by reacting the at least one polysiloxane as described above with a polycarboxylic acid or anhydride. Nonlimiting examples of polycarboxylic acids suitable for use include adipic acid, succinic acid, and dodecanedioic acid. Nonlimiting examples of suitable anhydrides include those described above. Reaction conditions and the ratio of reactants are selected so as to form the desired functional groups.

In the case where the at least one polysiloxane contains one or more isocyanate functional groups, the at least one polysiloxane can be prepared by reacting at least one polysiloxane as described above with a polyisocyanate, such as a diisocyanate. Nonlimiting examples of suitable polyisocyanates include aliphatic polyisocyanates, such as, for example aliphatic diisocyanates, for example 1,4-tetramethylene diisocyanate and 1,6-hexamethylene diisocyanate; cycloaliphatic polyisocyanates, for example 1,4-cyclohexyl diisocyanate, isophorone diisocyanate, and α,α-xylylene diisocyanate; and aromatic polyisocyanates, for example 4,4'-diphenylmethane diisocyanate, 1,3-phenylene diisocyanate, and tolylene diisocyanate. These and other suitable polyisocyanates are described in more detail in U.S. Pat. No. 4,046,729, at column 5, line 26 to column 6, line 28, incorporated herein by reference. Reaction conditions and the ratio of reactants are selected so as to form the desired functional groups.

The substituent group X in structure (IV) can comprise a polymeric urethane or urea-containing material which is terminated with isocyanate, hydroxyl, primary or secondary amine functional groups, or mixtures of any of the foregoing. When the substituent group X comprises such functional groups, the at least one polysiloxane can be the reaction product of the at least one polysiloxane as described above, one or more polyisocyanates and, optionally, one or more compounds comprising at least two active hydrogen atoms per molecule selected from hydroxyl groups, primary amine groups, and secondary amine groups.

Nonlimiting examples of suitable polyisocyanates are those described above. Nonlimiting examples of compounds comprising at least two active hydrogen atoms per molecule include polyols and polyamines containing primary and/or secondary amine groups.

Nonlimiting examples of suitable polyols include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example glycols such as ethylene glycol, 1,6-hexanediol, Bisphenol A, and the like, or higher polyols such as trimethylolpropane, pentaerythritol and the like. Polyester polyols also can be used. These and other suitable polyols are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both incorporated herein by reference.

Nonlimiting examples of suitable polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-methane diamine, isophorone diamine, propane-2,2-cyclohexyl amine, and the like. Suitable aromatic diamines include phenylene diamines and the toluene diamines, for example o-phenylene diamine and p-tolylene diamine. These and other suitable polyamines are described in detail in U.S. Pat. No. 4,046,729 at column 6, line 61 to column 7, line 26, incorporated herein by reference.

In one embodiment, the substituent group X of the structure (IV) can comprise a polymeric ester-containing group which is terminated with hydroxyl or carboxylic acid functional groups. When X is such a group, the at least one polysiloxane can be the reaction product of one or more at least one polysiloxanes as described above, one or more materials comprising at least one carboxylic acid functional group, and one or more organic polyols. Nonlimiting suitable examples of materials comprising at least one carboxylic acid functional group include carboxylic acid group-containing polymers well-known in the art, for example carboxylic acid group-containing acrylic polymers, polyester polymers, and polyurethane polymers, such as those described in U.S. Pat. No. 4,681,811. Nonlimiting examples of suitable organic polyols include those described above.

To form the at least one polysiloxane containing epoxy groups, the at least one polysiloxane as described above can be further reacted with a polyepoxide. The polyepoxide can be an aliphatic or cycloaliphatic polyepoxide or mixtures of any of the foregoing. Nonlimiting examples of polyepoxides suitable for use include epoxy functional acrylic copolymers prepared from at least one ethylenically unsaturated monomer comprising at least one epoxy group, for example glycidyl (meth)acrylate and allyl glycidyl ether, and one or more ethylenically unsaturated monomers which have no epoxy functionality. The preparation of such epoxy functional acrylic copolymers is described in detail in U.S. Pat. No. 4,681,811 at column 4, line 52 to column 5, line 50, incorporated herein by reference. Reaction conditions and the ratio of reactants are selected so as to form the desired functional groups.

Generally, the at least one polysiloxane, when added to other components that form the coating composition, when present in the coating composition is present in an amount ranging from 1 to 90 weight percent based on total weight of the resin solids of the components from which the coating composition is formed. The weight percent of polysiloxane can range between any combination of these values inclusive of the recited ranges.

In one embodiment, the components from which the coating composition is formed further can comprise a plurality of particles, wherein each component is different. As used herein, the phrase "each component is different" refers to components which do not have the same chemical structure as other components in the composition. The particles can be formed from materials selected from polymeric and nonpolymeric inorganic materials, polymeric and nonpolymeric organic materials, composite materials, and mixtures of any of the foregoing. As used herein, "formed from" denotes open, e.g., "comprising," claim language. As such, it is intended that a composition "formed from" a list of recited components be a composition comprising at least these recited components, and can further comprise other, nonrecited components, during the composition's formation.

As used herein, the term "polymeric inorganic material" means a polymeric material having a backbone repeat unit based on an element or elements other than carbon. For more information see James Mark et al., *Inorganic Polymers*, Prentice Hall Polymer Science and Engineering Series, (1992) at page 5, which is specifically incorporated by reference herein. Moreover, as used herein, the term "polymeric organic materials" means synthetic polymeric materials, semisynthetic polymeric materials and natural polymeric materials, all of which have a backbone repeat unit based on carbon.

An "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., *Hawley's Condensed Chemical Dictionary*, (12th Ed. 1993) at pages 761–762, and M. Silberberg, Chemistry *The Molecular Nature of Matter and Change*(1996) at page 586, which are specifically incorporated by reference herein.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example a particle can be formed from a primary material that is coated, clad or encapsulated with one or more secondary materials to form a composite particle that has a softer surface. In yet another alternative embodiment, particles formed from composite materials can be formed from a primary material that is coated, clad or encapsulated with a different form of the primary material. For more information on particles useful in the present invention, see G. Wypych, *Handbook of Fillers*, 2nd Ed. (1999) at pages 15–202, which are specifically incorporated by reference herein.

The particles suitable for use in the coating compositions of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example boron nitride; specific, nonlimiting examples of metal oxides are, for example zinc oxide; nonlimiting examples of suitable metal sulfides are, for example molybdenum disulfide, tantalum disulfide, tungsten disulfide, and zinc sulfide; nonlimiting suitable examples of metal silicates are, for example aluminum silicates and magnesium silicates such as vermiculite.

The particles can comprise, for example a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. It should be understood that when the cured composition of the invention is employed as a transparent topcoat, for example as a clearcoat in a multi-component composite coating composition, particles should not seriously interfere with the optical properties of the cured composition. As used herein, "transparent" means that the cured coating has a BYK Haze index of less than 50 as measured using a BYK/Haze Gloss instrument.

Nonpolymeric, inorganic materials useful in forming the particles of the present invention comprise inorganic materials selected from graphite, metals, oxides, carbides, nitrides, borides, sulfides, silicates, carbonates, sulfates, and hydroxides. A nonlimiting example of a useful inorganic oxide is zinc oxide. Nonlimiting examples of suitable inorganic sulfides include molybdenum disulfide, tantalum disulfide, tungsten disulfide, and zinc sulfide. Nonlimiting examples of useful inorganic silicates include aluminum silicates and magnesium silicates, such as vermiculite. Nonlimiting examples of suitable metals include molybdenum, platinum, palladium, nickel, aluminum, copper, gold, iron, silver, alloys, and mixtures of any of the foregoing.

In one embodiment, the present invention is directed to cured compositions as previously described wherein the particles are selected from fumed silica, amorphous silica, colloidal silica, alumina, colloidal alumina, titanium dioxide, cesium oxide, yttrium oxide, colloidal yttria, zirconia, colloidal zirconia, and mixtures of any of the foregoing. In another embodiment, the present invention is directed to cured compositions as previously described wherein the particles include colloidal silica. As disclosed above, these materials can be surface treated or untreated.

The coating composition can comprise precursors suitable for forming silica particles in situ by a sol-gel process. The coating composition according to the present invention can comprise alkoxy silanes which can be hydrolyzed to form silica particles in situ. For example tetraethylortho silicate can be hydrolyzed with an acid such as hydrochloric acid and condensed to form silica particles. Other useful particles include surface-modified silicas such as are described in U.S. Pat. No. 5,853,809 at column 6, line 51 to column 8, line 43, which is incorporated herein by reference.

In one embodiment of the present invention, the particles have a hardness value greater than the hardness value of materials that can abrade a polymeric coating or a polymeric substrate. Examples of materials that can abrade the polymeric coating or polymeric substrate include, but are not limited to, dirt, sand, rocks, glass, carwash brushes, and the like. The hardness values of the particles and the materials that can abrade the polymeric coating or polymeric substrate can be determined by any conventional hardness measurement method, such as Vickers or Brinell hardness, but is preferably determined according to the original Mohs' hardness scale which indicates the relative scratch resistance of the surface of a material on a scale of one to ten. The Mohs' hardness values of several nonlimiting examples of particles formed from inorganic materials suitable for use in the present invention are given in Table A below.

TABLE A

| Particle material | Mohs' hardness (original scale) |
| --- | --- |
| Boron nitride | $2^1$ |
| Graphite | $0.5–1^2$ |
| Molybdenum disulfide | $1^3$ |
| Talc | $1–1.5^4$ |
| Mica | $2.8–3.2^5$ |
| Kaolinite | $2.0–2.5^6$ |
| Gypsum | $1.6–2^7$ |
| Calcite (calcium carbonate) | $3^8$ |
| Calcium fluoride | $4^9$ |
| zinc oxide | $4.5^{10}$ |
| Aluminum | $2.5^{11}$ |
| Copper | $2.5–3^{12}$ |
| Iron | $4–5^{13}$ |
| Gold | $2.5–3^{14}$ |
| Nickel | $5^{15}$ |
| Palladium | $4.8^{16}$ |
| Platinum | $4.3^{17}$ |
| Silver | $2.5–4^{18}$ |
| Zinc sulfide | $3.5–4^{19}$ |

[1] K. Ludema, Friction, Wear, Lubrication, (1996) at page 27, which is hereby incorporated by reference.
[2] R. Weast (Ed.), Handbook of Chemistry and Physics, CRC Press (1975) at page F-22.
[3] R. Lewis, Sr., Hawley's Condensed Chemical Dictionary, (12th Ed. 1993) at page 793, which is hereby incorporated by reference.
[4] Hawley's Condensed Chemical Dictionary, (12th Ed. 1993) at page 1113, which is hereby incorporated by reference.
[5] Hawley's Condensed Chemical Dictionary, (12th Ed. 1993) at page 784, which is hereby incorporated by reference.
[6] Handbook of Chemistry and Physics at page F-22.
[7] Handbook of Chemistry and Physics at page F-22.
[8] Friction, Wear, Lubrication at page 27.
[9] Friction, Wear, Lubrication at page 27.
[10] Friction, Wear, Lubrication at page 27.
[11] Friction, Wear, Lubrication at page 27.
[12] Handbook of Chemistry and Physics at page F-22.
[13] Handbook of Chemistry and Physics at page F-22.
[14] Handbook of Chemistry and Physics at page F-22.
[15] Handbook of Chemistry and Physics at page F-22.
[16] Handbook of Chemistry and Physics at page F-22.
[17] Handbook of Chemistry and Physics at page F-22.
[18] Handbook of Chemistry and Physics at page F-22.
[19] R. Weast (Ed.), Handbook of Chemistry and Physics, CRC Press (71st Ed. 1990) at page 4–158.

In one embodiment, the Mohs' hardness value of the particles is greater than 4. In certain embodiments, the Mohs' hardness value of the particles, such as silica, is greater than 6.

As mentioned above, the Mohs' hardness scale relates to the resistance of a material to scratching. The present invention therefore further contemplates particles that have a hardness at their surface that is different from the hardness of the internal portions of the particle beneath its surface. More specifically, and as discussed above, the surface of the particle can be modified in any manner well known in the art, including, but not limited to, chemically changing the particle's surface characteristics using techniques known in the art such that the surface hardness of the particle is greater the hardness of the materials that can abrade the polymeric coating or polymeric substrate while the hardness of the particle beneath the surface is less than the hardness of the materials that can abrade the polymeric coating or polymeric substrate.

As another alternative, a particle can be formed from a primary material that is coated, clad or encapsulated with one or more secondary materials to form a composite material that has a harder surface. Alternatively, a particle can be formed from a primary material that is coated, clad or encapsulated with a differing form of the primary material to form a composite material that has a harder surface.

In one example, and without limiting the present invention, an inorganic particle formed from an inorganic material such as silicon carbide or aluminum nitride can be provided with a silica, carbonate or nanoclay coating to form a useful composite particle. In another nonlimiting example, a silane coupling agent with alkyl side chains can interact with the surface of an inorganic particle formed from an inorganic oxide to provide a useful composite particle having a "softer" surface. Other examples include cladding, encapsulating or coating particles formed from nonpolymeric or polymeric materials with differing nonpolymeric or polymeric materials. A specific nonlimiting example of such composite particles is DUALITE™, which is a synthetic polymeric particle coated with calcium carbonate that is commercially available from Pierce and Stevens Corporation of Buffalo, N.Y.

The particles can be formed from synthetic, organic polymeric materials. Nonlimiting examples of suitable organic polymeric materials include, but are not limited to, thermoset materials and thermoplastic materials. As used herein, a "thermoplastic" material is a material that softens when exposed to heat and returns to its original condition when cooled to room temperature. Nonlimiting examples of suitable thermoplastic materials include thermoplastic polyesters such as polyethylene terephthalate, polybutylene terephthalate, and polyethylene naphthalate, polycarbonates, polyolefins such as polyethylene, polypropylene, and polyisobutene, acrylic polymers such as copolymers of styrene and an acrylic acid monomer, and polymers containing methacrylate, polyamides, thermoplastic polyurethanes, vinyl polymers, and mixtures of any of the foregoing.

Nonlimiting examples of suitable thermoset materials include thermoset polyesters, vinyl esters, epoxy materials, phenolics, aminoplasts, thermoset polyurethanes, and mixtures of any of the foregoing. A specific, nonlimiting example of a synthetic polymeric particle formed from an epoxy material is an epoxy microgel particle. As used herein, a "thermoset" material is a material that material solidifies or "sets" irreversibly when heated. A thermoset material has formed a crosslinked network. As used herein, a polymeric material is "crosslinked" if it at least partially forms a polymeric network. One skilled in the art will understand that the presence and degree of crosslinking (crosslink density) can be determined by a variety of methods, such as dynamic mechanical thermal analysis (DMTA) using a TA Instruments DMA 2980 DMTA analyzer conducted under nitrogen such as is described above. This method determines the glass transition temperature and crosslink density of free films of coatings or polymers. These physical properties of a cured material are related to the structure of the crosslinked network.

The particles also can be hollow particles formed from materials selected from polymeric and nonpolymeric inorganic materials, polymeric and nonpolymeric organic materials, composite materials, and mixtures of any of the foregoing. Nonlimiting examples of suitable materials from which the hollow particles can be formed are described above. In one embodiment, the hollow particles are hollow glass spheres.

The particles according to the present invention that are applied to the polymeric substrate or polymeric coating, for example but not limited to, the electrodeposited coating, the primer coating, or the topcoat, can be present in a dispersion, suspension or emulsion in a carrier. Nonlimiting examples of suitable carriers include, but are not limited to, water, solvents, surfactants, or a mixture of any of the foregoing. Nonlimiting examples of suitable solvents include, but are not limited to, mineral oil, alcohols such as methanol or butanol, ketones such as methyl amyl ketone, aromatic hydrocarbons such as xylene, glycol ethers such as ethylene glycol monobutyl ether, esters, aliphatics, and mixtures of any of the foregoing.

Prior to incorporation, one class of particles which can be used according to the present invention includes sols, such as an organosol, of the particles. These sols can be of a wide variety of small-particle, colloidal silicas having an average particle size in ranges such as identified above.

The colloidal silicas can be surface modified during or after the particles are initially formed. These surface modified silicas may contain on their surface chemically bonded carbon-containing moieties, as well as such groups as anhydrous $SiO_2$ groups and SiOH groups, various ionic groups physically associated or chemically bonded within the surface of the silica, adsorbed organic groups, or combinations of any of the foregoing, depending on the characteristics of the particular silica desired. Such surface modified silicas are described in detail in U.S. Pat. No. 4,680,204, which is incorporated herein by reference.

Such materials can be prepared by a variety of techniques in various forms, nonlimiting examples comprise organosols and mixed sols. As used herein the term "mixed sols" is intended to include those dispersions of colloidal silica in which the dispersing medium comprises both an organic liquid and water. Such small particle colloidal silicas are readily available, are essentially colorless and have refractive indices which permit their inclusion in compositions that, without additional pigments or components known in the art to color and/or decrease the transparency of such compositions, result in colorless, transparent coatings.

Suitable nonlimiting examples of particles include colloidal silicas, such as those commercially available from Nissan Chemical Company under the trademark ORGANO-SILICASOLS™ such as ORGANOSILICASOL™ MT-ST, and from Clariant Corporation as HIGHLINK™; colloidal aluminas, such as those commercially available from Nalco Chemical under the trademark NALCO 8676®; and colloidal zirconias, such as those commercially available from Nissan Chemical Company under the trademark HIT-32M®.

The particles can be incorporated into the compositions of the invention in the form of a stable dispersion. When the particles are in a colloidal form, the dispersions can be prepared by dispersing the particles in a carrier under agitation and solvent that is present can be removed under vacuum at ambient temperatures. In certain embodiments, the carrier can be other than a solvent, such as the surface active agents described in detail below, including, but not limited to a polysiloxane containing reactive functional groups.

Alternatively, the dispersions can be prepared as described in U.S. Pat. Nos. 4,522,958 or 4,526,910, which are incorporated by reference herein. The particles can be "cold-blended" with the at least one hydroxyl functional non-vinyl material prior to incorporation into the inventive compositions. Alternatively, the particles can be post-added to an admixture of any remaining composition components (including, but not limited to the at least one hydroxyl functional non-vinyl material) and dispersed therein using dispersing techniques well-known in the art.

When the particles are in other than colloidal form, for example but not limited to, agglomerate form, the dispersions can be prepared by dispersing the agglomerate in the carrier, for example but not limited to, the at least one hydroxyl functional non-vinyl material, to stably disperse the particles therein. Dispersion techniques such as grinding, milling, microfluidizing, or any other pigment dispersing techniques well known in the art of coatings formulation can be used. Alternatively, the particles can be dispersed by any other dispersion techniques known in the art. If desired, the particles in other than colloidal form can be post-added to an admixture of other composition components and dispersed therein using any dispersing techniques known in the art.

In one embodiment, the present invention is directed to compositions which comprise a plurality of particles, wherein a first portion of the particles is present in a surface region of the cured composition in a concentration which is higher than a concentration of a second portion of particles which is present in a bulk region of the cured composition.

As used herein "surface region" of the cured composition means the region which is generally parallel to the exposed air-surface of the coated substrate and which has thickness generally extending perpendicularly from the surface of the cured coating to a depth ranging from at least 20 nanometers to 150 nanometers beneath the exposed surface. In certain embodiments, this thickness of the surface region ranges from at least 20 nanometers to 100 nanometers, and can range from at least 20 nanometers to 50 nanometers. As used herein, "bulk region" of the cured composition means the region which extends beneath the surface region and which is generally parallel to the surface of the coated substrate. The bulk region has a thickness extending from its interface with the surface region through the cured coating to the substrate or coating layer beneath the cured composition.

In embodiments of the present invention in which the particles have an average particle size greater than 50 nanometers, the thickness of the surface region generally extends perpendicularly from the surface of the cured coating to a depth equal to three times the average particle size of the particles, and this surface can extend to a depth equal to two times the average particle size of the particles.

The concentration of particles in the cured composition can be characterized in a variety of ways. For example the average number density of particles (i.e., the average number or population of particles per unit volume) dispersed in the surface region is greater than the average number density dispersed in the bulk region. Alternatively, the average volume fraction (i.e., volume occupied by particles/total volume) or average weight percent per unit volume, i.e., ((the weight of particles within a unit volume of cured coating)/(total weight of the unit volume of cured coating))× 100% of the particles dispersed in the surface region is greater than the average volume fraction or average weight percent of particles dispersed within the bulk region.

The concentration of particles (as characterized above) present in the surface region of the cured coating can be determined, if desired, by a variety of surface analysis techniques well known in the art, such as Transmission Electron Microscopy ("TEM"), Surface Scanning Electron Microscopy ("X-SEM"), Atomic Force Microscopy ("AFM"), and X-ray Photoelectron Spectroscopy.

For example the concentration of particles present in the surface region of the cured coating may be determined by cross-sectional transmission electron microscopy techniques. A useful transmission electron microscopy method is described generally as follows. A coating composition is applied to a substrate and cured under conditions appropriate to the composition and substrate. Samples of the cured coating are then removed or delaminated from the substrate and embedded in a cured epoxy resin using techniques as are well known in the art. The embedded samples then can be microtomed at room temperature using techniques well known in the art, such as by forming a block face. The sections can be cut using a 45° diamond knife edge mounted in a holder with a "boat cavity" to hold water. During the cutting process, sections float to the surface of the water in the boat cavity. Once a few cuts reach an interference color of bright to dark gold (i.e., approximately 100 to 150 nanometers thickness), individual samples typically are collected onto a formvar-carbon coated grid and dried at ambient temperature on a glass slide. The samples are then placed in a suitable transmission electron microscope, such as a Philips CM12 TEM, and examined at various magnifications, such as at 105,000×magnification, for documentation of particle concentration at the surface region, via electron micrography. The concentration of particles in a surface region of a cured coating can be ascertained upon visual inspection of the electron micrograph.

It should be understood that the particles can be present in the surface region such that a portion of the particles at least partially protrudes above the cured coating surface, essentially unprotected by an organic coating layer. Alternatively, the particles can be present in the surface region such that this organic coating layer lies between the particles and the exposed air-surface interface of the surface region.

In one embodiment, the present invention is directed to cured compositions as previously described wherein the particles have an average particle size less than 100 microns prior to incorporation into the coating composition, and can have an average particle size less than 50 microns prior to incorporation into the coating composition. In another embodiment, the present invention is directed to cured compositions as previously described wherein the particles have an average particle size ranging from 1 to less than 1000 nanometers prior to incorporation into the coating composition. In another embodiment, the present invention is directed to cured compositions as previously described wherein the particles have an average particle size ranging from 1 to 100 nanometers prior to incorporation into the coating composition.

In another embodiment, the present invention is directed to cured compositions as previously described wherein the particles have an average particle size ranging from 5 to 50 nanometers prior to incorporation into the composition. In another embodiment, the present invention is directed to cured compositions as previously described wherein the particles have an average particle size ranging from 5 to 25 nanometers prior to incorporation into the composition. The particle size may range between any combination of these values inclusive of the recited values.

In an embodiment where the average particle size of the particles is greater than one micron, the average particle size can be measured according to known laser scattering techniques. For example the average particle size of such particles is measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

In an embodiment of the present invention wherein the size of the particles is less than or equal to one micron, the average particle size can be determined by visually examining an electron micrograph of a transmission electron microscopy ("TEM") image, measuring the diameter of the particles in the image, and calculating the average particle size based on the magnification of the TEM image. One of ordinary skill in the art will understand how to prepare such a TEM image, and a description of one such method is disclosed in the examples set forth below. In one nonlimiting embodiment of the present invention, a TEM image with 105,000×magnification is produced, and a conversion factor is obtained by dividing the magnification by 1000. Upon visual inspection, the diameter of the particles is measured in millimeters, and the measurement is converted to nanometers using the conversion factor. The diameter of the particle refers to the smallest diameter sphere that will completely enclose the particle.

The shape (or morphology) of the particles can vary depending upon the specific embodiment of the present invention and its intended application. For example generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), *Handbook of Fillers and Plastics* (1987) at pages 9–10, which are specifically incorporated by reference herein.

It will be recognized by one skilled in the art that mixtures of one or more particles having different average particle sizes can be incorporated into the compositions in accordance with the present invention to impart the desired properties and characteristics to the compositions. For example particles of varying particle sizes can be used in the compositions according to the present invention.

In one embodiment, the present invention is directed to compositions as previously described wherein the particles, when added to the other components which form the composition, are present in the composition in an amount ranging from 0.01 to 75 weight percent based on total weight of the resin solids of the components which form the composition. In another embodiment, the present invention is directed to compositions as previously described wherein the particles, when added to the other components which form the composition, are generally present in the composition in an amount of at least 0.1 weight percent, can be present in the composition in an amount of at least 0.5 weight percent, and also can be present in the composition in an amount greater than 5 weight percent based on total weight of the resin solids of the components which form the composition.

In yet another embodiment, the present invention is directed to cured compositions as previously described wherein, the particles, when added to the other components which form the composition, are present in the composition in an amount less than 75 weight percent based on total weight of the resin solids of the components which form the composition. In a further embodiment, the present invention is directed to compositions as previously described wherein the particles, when added to the other components which form the composition, are present in the composition in an amount less than 50 weight percent based on total weight of the resin solids of the components which form the composition. In another embodiment, the present invention is directed to compositions as previously described wherein the particles, when added to the other components which form the composition, are present in the composition in an amount less than 20 weight percent based on total weight of the resin solids of the components which form the composition. In another embodiment, the present invention is directed to compositions as previously described wherein the particles, when added to the other components which form the composition, are present in the composition in an amount less than 10 weight percent based on total weight of the resin solids of the components which form the composition. The weight percent of particles can range between any combination of these values inclusive of the recited ranges Additionally, in another embodiment, the present invention is directed to compositions wherein at least one surface active agent can be present during the formation of the compositions as previously described. The at least one surface active agent can be selected from anionic, nonionic, and cationic surface active agents.

As used herein, by "surface active agent" is meant any material which tends to lower the solid surface tension or surface energy of the cured composition or coating. That is, the cured composition or coating formed from a composition comprising a surface active agent has a lower solid surface tension or surface energy than a cured coating formed from the analogous composition which does not contain the surface active agent.

For purposes of the present invention, solid surface tension can be measured according to the Owens-Wendt method using a Rame'-Hart Contact Angle Goniometer with distilled water and methylene iodide as reagents. Generally, a 0.02 cc drop of one reagent is placed upon the cured coating surface and the contact angle and its complement are measured using a standard microscope equipped with the goniometer. The contact angle and its complement are measured for each of three drops. The process is then repeated using the other reagent. An average value is calculated for the six measurements for each of the reagents. The solid surface tension is then calculated using the Owens-Wendt equation:

$$\{\gamma l(1+\cos\Phi)\}/2=(\gamma l^d \gamma_s^d)^{1/2}+(\gamma l^p \gamma_s^p)^{1/2}$$

where $\gamma l$ is the surface tension of the liquid (methylene iodide=50.8, distilled water=72.8) and $\gamma^d$ and $\gamma^p$ are the dispersion and polar components (methylene iodide $\gamma^d$=49.5, $\gamma^P$=1.3; distilled watery $\gamma^d$=21.8, $\gamma^P$=51.0); the values for $\Phi$ measured and the cos $\Phi$ determined. Two equations are then setup, one for methylene iodide and one for water. The only unknowns are $\gamma_s^d$ and $\gamma_s^P$. The two equations are then solved for the two unknowns. The two components combined represent the total solid surface tension.

The at least one surface active agent can be selected from amphiphilic, reactive functional group-containing polysiloxanes, amphiphilic fluoropolymers, and mixtures of any of the foregoing. With reference to water-soluble or water-dispersible amphiphilic materials, the term "amphiphilic" means a polymer having a generally hydrophilic polar end and a water-insoluble generally hydrophobic end. Nonlimiting examples of suitable functional group-containing polysiloxanes for use as surface active agents include those polysiloxanes described below. Nonlimiting examples of suitable amphiphilic fluoropolymers include fluoroethylene-alkyl vinyl ether alternating copolymers (such as those described in U.S. Pat. No. 4,345,057) available from Asahi Glass Company under the tradename LUMIFLON; fluorosurfactants, such as the fluoroaliphatic polymeric esters commercially available from 3M of St. Paul, Minn. under the tradename FLUORAD; functionalized perfluorinated materials, such as 1H, 1H-perfluoro-nonanol commercially available from FluoroChem USA; and perfluorinated (meth)acrylate resins, such as 1H, 1H, 2H-perfluro-octyl methacrylate available from FluoroChem USA.

Nonlimiting examples of other surface active agents suitable for use in the cured composition or coating of the present invention can include anionic, nonionic and cationic surface active agents. Nonlimiting examples of suitable anionic surface active agents include sulfates or sulfonates. Specific nonlimiting examples include higher alkyl mononuclear aromatic sulfonates such as the higher alkyl benzene sulfonates containing from 10 to 16 carbon atoms in the alkyl group and a straight- or branched-chain, e.g., the sodium salts of decyl, undecyl, dodecyl, tridecyl, tetradecyl, pentadecyl or hexadecyl benzene sulfonate and the higher alkyl toluene, xylene and phenol sulfonates; alkyl naphthalene sulfonate, and sodium dinonyl naphthalene sulfonate. Other nonlimiting examples of suitable anionic surface active agents include olefin sulfonates, including long chain alkenylene sulfonates, long chain hydroxyalkane sulfonates, and mixtures of any of the foregoing. Nonlimiting examples of other sulfate or sulfonate detergents are paraffin sulfonates such as the reaction products of alpha olefins and bisulfites (e.g., sodium bisulfite). Also comprised are sulfates of higher alcohols, such as sodium lauryl sulfate, sodium tallow alcohol sulfate, or sulfates of mono-or di-glycerides of fatty acids (e.g., stearic monoglyceride monosulfate), alkyl poly(ethoxy)ether sulfates including, but not limited to, the sulfates of the condensation products of ethylene oxide and lauryl alcohol (usually having 1–5 ethenoxy groups per molecule); lauryl or other higher alkyl glyceryl ether sulfonates; aromatic poly(ethenoxy)ether sulfates including, but not limited to, the sulfates of the condensation products of ethylene oxide and nonyl phenol (usually having 1–20 oxyethylene groups per molecule).

Further nonlimiting examples include salts of sulfated aliphatic alcohol, alkyl ether sulfate and/or alkyl aryl ethoxy sulfate available from Rhone-Poulenc under the general tradename ABEX. Phosphate mono-or di-ester type anionic surface active agents also can be used. These anionic surface active agents are well known in the art and are commercially available under the general trademark GAFAC from GAF Corporation and under the general trademark TRITON from Rohm & Haas Company.

Nonlimiting examples of nonionic surface active agents suitable for use in the cured composition or coating of the present invention include those containing ether linkages and which are represented by the following general formula: RO(R'O)$_n$H; wherein the substituent group R represents a hydrocarbon group containing 6 to 60 carbon atoms, the substituent group R' represents an alkylene group containing 2 or 3 carbon atoms, and mixtures of any of the foregoing, and n is an integer ranging from 2 to 100.

Such nonionic surface active agents can be prepared by treating fatty alcohols or alkyl-substituted phenols with an excess of ethylene or propylene oxide. The alkyl carbon chain may contain from 14 to 40 carbon atoms and may be derived from a long chain fatty alcohol such as oleyl alcohol or stearyl alcohol. Nonionic polyoxyethylene surface active agents of the type represented by the formula above are commercially available under the general trade designation SURFYNOL from Air Products Chemicals, Inc.; PLURONIC or TETRONIC from BASF Corporation; TERGITOL from Union Carbide; and SURFONIC from Huntsman Corporation. Other nonlimiting examples of suitable nonionic surface active agents include block copolymers of ethylene oxide and propylene oxide based on a glycol such as ethylene glycol or propylene glycol including, but not limited to, those available from BASF Corporation under the general trade designation PLURONIC.

As indicated above, cationic surface active agents also can be used. Nonlimiting examples of cationic surface active agents suitable for use in the cured compositions or coatings of the present invention include acid salts of alkyl amines such as ARMAC HT, an acetic acid salt of n-alkyl amine available from Akzo Nobel Chemicals; imidazoline derivatives such as CALGENE C-100 available from Calgene Chemicals Inc.; ethoxylated amines or amides such as DETHOX Amine C-5, a cocoamine ethoxylate available from Deforest Enterprises; ethoxylated fatty amines such as ETHOX TAM available from Ethox Chemicals, Inc.; and glyceryl esters such as LEXEMUL AR, a glyceryl stearate/stearaidoethyl diethylamine available from Inolex Chemical Co.

Other examples of suitable surface active agents can include polyacrylates. Nonlimiting examples of suitable polyacrylates include homopolymers and copolymers of acrylate monomers, for example polybutylacrylate and copolymers derived from acrylate monomers (such as ethyl (meth)acrylate, 2-ethylhexylacrylate, butyl (meth)acrylate and isobutyl acrylate), and hydroxy ethyl(meth)acrylate and (meth)acrylic acid monomers. In one embodiment, the polyacrylate can have amino and hydroxy functionality. Suitable amino and hydroxyl functional acrylates are disclosed in Example 26 below and in U.S. Pat. No. 6,013,733, which is incorporated herein by reference. Another example of a useful amino and hydroxyl functional copolymer is a copolymer of hydroxy ethyl acrylate, 2-ethylhexylacrylate, isobutyl acrylate and dimethylamino ethylmethacrylate. In another embodiment, the polyacrylate can have acid functionality, which can be provided, for example, by including acid functional monomers such as (meth)acrylic acid in the components used to prepare the polyacrylate. In another embodiment, the polyacrylate can have acid functionality and hydroxyl functionality, which can be provided, for example, by including acid functional monomers such as (meth)acrylic acid and hydroxyl functional monomers such as hydroxy ethyl (meth)acrylate in the components used to prepare the polyacrylate.

In one embodiment, the components from which the coating composition is formed further can comprise at least one material which is curable by ionizing radiation and/or actinic radiation. In another embodiment, the at least one hydroxyl functional non-vinyl material or polysiloxane discussed above can contain radiation curable groups.

As used herein, "ionizing radiation" means high energy radiation and/or the secondary energies resulting from conversion of this electron or other particle energy to neutron or gamma radiation, said energies being at least 30,000 electron volts and can range from 50,000 to 300,000 electron volts. While various types of ionizing irradiation are suitable for this purpose, such as X-ray, gamma and beta rays, the radiation produced by accelerated high energy electrons or electron beam devices is preferred. The amount of ionizing radiation in rads for curing compositions according to the present invention can vary based upon such a factors as the components of the coating formulation, the thickness of the coating upon the substrate, the temperature of the coating composition and the like. Generally, a 1 mil (25 micrometer) thick wet film of a coating composition according to the present invention can be cured in the presence of oxygen through its thickness to a tack-free state upon exposure to from 0.5 to 5 megarads of ionizing radiation.

"Actinic radiation" is light with wavelengths of electromagnetic radiation ranging from the ultraviolet ("UV") light range, through the visible light range, and into the infrared range. Actinic radiation which can be used to cure coating compositions of the present invention generally has wavelengths of electromagnetic radiation generally ranging from 150 to 2,000 nanometers (nm), can range from 180 to 1,000 nm, and typically ranges from 200 to 500 nm. In one embodiment, ultraviolet radiation having a wavelength ranging from 10 to 390 nm can be used. Examples of suitable ultraviolet light sources include mercury arcs, carbon arcs, low, medium or high pressure mercury lamps, swirl-flow plasma arcs and ultraviolet light emitting diodes. Preferred ultraviolet light-emitting lamps are medium pressure mercury vapor lamps having outputs ranging from 200 to 600 watts per inch (79 to 237 watts per centimeter) across the length of the lamp tube. Generally, a 1 mil (25 micrometer) thick wet film of a coating composition according to the present invention can be cured through its thickness to a tack-free state upon exposure to actinic radiation by passing the film at a rate of 20 to 1000 feet per minute (6 to 300 meters per minute) under four medium pressure mercury vapor lamps of exposure at 200 to 1000 millijoules per square centimeter of the wet film.

The at least one radiation curable reactive functional group can be selected from vinyl groups, epoxy groups, maleimide groups, fumarate groups and combinations of the foregoing. Suitable first materials having vinyl functionality include those comprising unsaturated ester groups, vinyl ether groups, and vinyl esters as discussed below.

Suitable materials comprising unsaturated ester groups include materials comprising acrylate groups, methacrylate groups and/or ethacrylate groups. In one embodiment, the unsaturated ester group is an acrylate group. Useful materials comprising unsaturated ester groups include esters and amides of acrylic or methacrylic acid or comonomers of such an ester with another copolymerizable monomer. Suitable esters include methyl (meth)acrylate, ethyl (meth)acrylate, isopropyl (meth)acrylate, n-butyl(meth)acrylate, isobutyl (meth)acrylate, 2-ethylhexyl (meth)acrylate, 2-hydroxyethyl (meth)acrylate, glycidyl (meth)acrylate, ethylene glycol di(meth)acrylate, diethylene glycol (meth)acrylate, tetraethylene glycol di(meth)acrylate, glycerol di(meth)acrylate, glycerol tri(meth)acrylate, 1,3-propylene glycol di(meth)acrylate, dipropylene glycol di(meth)acrylate, 1,4-butanediol di(meth)acrylate, 1,2,4-butanetriol tri(meth)acrylate, 1,6-hexanediol di(meth)acrylate, 1,4-cyclohexanediol di(meth)acrylate, 1,4-benzenediol di(meth)acrylate, pentaerythritol tetra(meth)acrylate, 1,5-pentanediol di(meth)acrylate, trimethylolpropane di(meth)acrylate, trimethylolpropane tri(meth)acrylate, 2,2-dimethyl-3-hydroxypropyl-2,2-dimethyl-3-hydroxypropionate, isobornyl (meth)acrylate, tetrahydrofurfuryl (meth)acrylate, (meth)acrylates derived from aromatic glycidyl ethers such as bisphenol A diglycidyl ethers and aliphatic diglycidyl ethers, acrylic or methacrylic amides such as (meth)

acrylamide, diacetone (meth)acrylamide, N-(betahydroxyethyl) (meth)acrylamide, N,N-bis (betahydroxyethyl) (meth)acrylamide, methylene bis(meth) acrylamide, 1,6-hexamethylene bis(meth)acrylamide, diethylenetriamine tris(meth)acrylamide, bis(gamma-(meth) acrylamidepropoxy) ethane, beta-(meth)acrylamide ethylacrylate and mixtures of the foregoing.

Other useful materials comprising unsaturated ester groups include hydroxy functional unsaturated polycarboxylates and polycaprolactones. Suitable hydroxy functional unsaturated polycarboxylates can be formed from ethylenically unsaturated carboxylic acids and polyhydric alcohols. Useful ethylenically unsaturated carboxylic acids have an acid functionality of at least two and/or their corresponding anhydrides. Non-limiting examples of ethylenically unsaturated carboxylic acids and anhydrides include maleic acid, maleic anhydride, fumaric acid, itaconic acid and mixtures of the foregoing. The unsaturated carboxylic acids can be blended with saturated carboxylic acids, such as phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 2,2-dimethylglutaric acid, 3,3-dimethylglutaric acid, anhydrides of the foregoing, where they exist, and mixtures of any of the foregoing.

Useful polyhydric alcohols for preparing the hydroxy functional unsaturated polycarboxylate include diethylene glycol, ethylene glycol, propylene glycol, dipropylene glycol, butylene glycol, glycerol, trimethylolpropane, pentaerythritol, sorbitol, 1,6-hexanediol, 1,4-cyclohexanediol, 1,4-cyclohexanedimethanol, 1,2-bis (hydroxyethyl)cyclohexane, 2,2-dimethyl-3-hydroxypropyl-2,2-dimethyl-3-hydroxypropionate, neopentyl glycol, 2-methyl-1,3-propane diol and mixtures of the foregoing. Monofunctional alcohols, such as $C_1$–$C_{15}$ monoalcohols, can be blended with the polyhydric alcohols, as desired.

The number average molecular weight of the unsaturated ester material can range from 500 to 50,000, as measured using gel permeation chromatography using a polystyrene standard. The unsaturated ester material can be prepared by any method well known to those skilled in the art, such as by mixing the components and heating at temperatures ranging from 150° C. to 250° C. for 1 to 10 hours and removing water formed during the esterification reaction. Conventional esterification catalysts, such as paratoluenesulfonic acid, butylstannoic acid, dibutyltin oxide, stannous fluoride and stannous octoate can be used to increase the rate of reaction.

Vinyl ether functional materials suitable for use in the present invention include vinyl ethers prepared from di-, tri- or tetrafunctional polyols, acetylene and a basic catalyst under pressure in a manner well know to those skilled in the art. Also, vinyl terminated polyesters such as those disclosed in U.S. Pat. No. 5,286,835, which is incorporated herein by reference, can be used. Non-limiting examples of useful vinyl ether functional materials include tripropylene glycol, divinyl ether, diethylene glycol divinyl ether, 1,4-butanediol divinyl ether, tetraethylene glycol divinyl ether, triethylene glycol divinyl ether, trimethylolpropane trivinyl ether, polytetrahydrofuran divinyl ether, vinyl ether terminated polyesters and mixtures of any of the foregoing. Also useful are unsaturated ester materials having vinyl ether functionality and urethane vinyl ether materials, such as are disclosed in U.S. Pat. No. 5,942,556, which is incorporated herein by reference.

Other useful materials comprising epoxy functional groups include epoxy functional monomers such as glycidyl methacrylate and polymers comprising at least two epoxide or oxirane groups per molecule such as are discussed above.

In another embodiment in which the coating is cured by actinic radiation or the combination of actinic radiation and thermal energy, the components from which the coating composition are formed further can comprise at least one photoinitiator or photosensitizer which provides free radicals or cations to initiate the polymerization process. Useful photoinitiators have an adsorption in the range of 150 to 2,000 nm. Non-limiting examples of useful photoinitiators include benzoin, benzophenone, hydroxy benzophenone, anthraquinone, thioxanthone, substituted benzoins such as butyl isomers of benzoin ethers, $\alpha,\alpha$-diethoxyacetophenone, $\alpha,\alpha$-dimethoxy-$\alpha$-phenylacetophenone, 2-hydroxy-2-methyl-1-phenyl propane 1-one, 2,4,6-trimethyl benzoyl diphenyl phosphine oxide and mixtures of the foregoing. In one embodiment, the photoinitiator is a 50:50 blend of 2-hydroxy-2-methyl-1-phenyl propan-1-one, 2,4,6-trimethyl benzoyl diphenyl phosphine oxide such as DAROCURE 4265 which is commercially available from Ciba-Geigy Corporation.

The coating compositions of the present invention can be solvent-based coating compositions, water-based coating compositions, in solid particulate form, that is, a powder coating composition, or in the form of a powder slurry or aqueous dispersion. The components of the present invention used to form the cured compositions of the present invention can be dissolved or dispersed in an organic solvent. Nonlimiting examples of suitable organic solvents include alcohols, such as butanol; ketones, such as methyl amyl ketone; aromatic hydrocarbons, such as xylene; and glycol ethers, such as, ethylene glycol monobutyl ether; esters; other solvents; and mixtures of any of the foregoing.

In solvent based compositions, the organic solvent is generally present in amounts ranging from 5 to 80 percent by weight based on total weight of the resin solids of the components which form the composition, and can be present in an amount ranging from 30 to 50 percent by weight. The compositions as described above can have a total solids content ranging from 40 to 75 percent by weight based on total weight of the resin solids of the components which form the composition, and can have a total solids content ranging from 50 to 70 percent by weight. Alternatively, the inventive compositions can be in solid particulate form suitable for use as a powder coating, or suitable for dispersion in a liquid medium such as water for use as a powder slurry.

In a further embodiment, a catalyst can be present during the coating composition's formation. Nonlimiting examples of suitable catalysts include acidic materials, for example acid phosphates, such as phenyl acid phosphate, and substituted or unsubstituted sulfonic acids such as dodecylbenzene sulfonic acid or para-toluene sulfonic acid and other catalysts such as amine and tin catalysts. The catalyst can be present, when added to the other components which form the coating composition, in an amount ranging from 0.1 to 5.0 percent by weight based on the total weight of the resin solids of the components which form the coating composition.

In another embodiment, additional components can be present during the formation of the coating compositions as previously described. These additional components include, but are not limited to, flexibilizers, plasticizers, surface active agents as defined herein (such as, for example polysiloxanes), thixotropic agents, anti-gassing agents, organic cosolvents, flow controllers, anti-oxidants, UV light absorbers, coloring agents or tints, and similar additives conventional in the art, as well as mixtures of any of the foregoing can be included in the coating composition. These additional ingredients can present, when added to the other components which form the coating composition, in an amount up to 40 percent by weight based on the total weight of the resin solids of the components which form the coating composition.

In a further embodiment of the present invention, the surface region of the cured composition is essentially free of silicone fluid. As used herein, "essentially free" means less than 10% by weight, and can be less than 5% by weight, based on the total weight of the resin solids which form the cured composition. In a further embodiment, the cured composition is free of silicone fluid.

The amount of the coating composition applied to the substrate can vary based upon such factors as the type of substrate and intended use of the substrate, i.e., the environment in which the substrate is to be placed and the nature of the contacting materials.

In yet another embodiment, the present invention is directed to a coated substrate comprising a substrate and a coating composition coated over at least a portion of the substrate, wherein the coating composition is selected from any of the foregoing coating compositions. In still another embodiment, the present is directed to a method of coating a substrate which comprises applying a coating composition over at least a portion of the substrate, wherein the coating composition is selected from any of the foregoing coating compositions.

In another embodiment, the present invention is directed to a method of coating a substrate further comprising a step of curing the coating composition after application to the substrate. The components used to form the coating compositions in these embodiments can be selected from the components discussed above, and additional components also can be selected from those recited above.

As used herein, a composition "over at least a portion of a substrate" refers to a composition directly applied to at least a portion of the substrate, as well as a composition applied to any coating material which was previously applied to at least a portion of the substrate.

The coating compositions of the present invention can be applied over virtually any substrate including wood, metals, glass, cloth, plastic, foam, polymeric substrates such as elastomeric substrates, and the like. In one embodiment, the present invention is directed to a coated substrate as previously described wherein the coated substrate is a flexible substrate. In another embodiment, the present invention is directed to a coated substrate as previously described wherein the coated substrate is a rigid substrate.

In a further embodiment, the present invention is directed to coated substrates as previously described wherein the coated substrate is a ceramic substrate. In still another embodiment, the present invention is directed to coated substrates as previously described wherein the coated substrate is a polymeric substrate. In another embodiment, the present invention is directed to a coated metallic substrate comprising a metallic substrate and a cured composition coated over at least a portion of the metallic substrate, wherein the cured composition is selected from any of the foregoing compositions. The components used to form the cured compositions in these embodiments can be selected from the components discussed above, and additional components also can be selected from those recited above.

A further embodiment of the present invention is directed to a coated automobile substrate comprising an automobile substrate and a cured composition coated over at least a portion of the automobile substrate, wherein the cured composition is selected from any of the foregoing compositions. In yet another embodiment, the present invention is directed to a method of making a coated automobile substrate comprising providing an automobile substrate and applying over at least a portion of the automotive substrate a coating composition selected from any of the foregoing compositions. Again, the components used to form the cured compositions in these embodiments can be selected from the components discussed above, and additional components also can be selected from those recited above.

Suitable flexible elastomeric substrates can include any of the thermoplastic or thermoset synthetic materials well known in the art. Nonlimiting examples of suitable flexible elastomeric substrate materials include polyethylene, polypropylene, thermoplastic polyolefin ("TPO"), reaction injected molded polyurethane ("RIM"), and thermoplastic polyurethane ("TPU").

Nonlimiting examples of thermoset materials useful as substrates in connection with the present invention include polyesters, epoxides, phenolics, polyurethanes such as "RIM" thermoset materials, and mixtures of any of the foregoing. Nonlimiting examples of suitable thermoplastic materials include thermoplastic polyolefins such as polyethylene, polypropylene, polyamides such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing.

Nonlimiting examples of suitable metal substrates include ferrous metals (e.g., iron, steel, and alloys thereof), nonferrous metals (e.g., aluminum, zinc, magnesium, and alloys thereof), and mixtures of any of the foregoing. In the particular use of automobile components, the substrate can be formed from cold rolled steel, electrogalvanized steel such as hot dip electrogalvanized steel, electrogalvanized iron-zinc steel, aluminum, and magnesium.

When the substrates are used as components to fabricate automotive vehicles (including, but not limited to, automobiles, trucks and tractors) they can have any shape, and can be selected from the metallic and flexible substrates described above. Typical shapes of automotive body components can include bodies (frames), hoods, doors, fenders, mirror housings, bumpers, and trim for automotive vehicles.

In a further embodiment, the present invention is directed to coated automotive substrates as previously described wherein the coated automotive substrate is a hood. In another embodiment, the present invention is directed to coated automotive substrates as previously described wherein the coated automotive substrate is a door. In another embodiment, the present invention is directed to coated automotive substrates as previously described wherein the coated automotive substrate is a fender. In another embodiment, the present invention is directed to coated automotive substrates as previously described wherein the coated automotive substrate is a quarterpanel. The components used to form the cured compositions used to coat the automotive substrates in these embodiments can be selected from the components discussed above.

In embodiments of the present invention directed to automotive applications, the cured compositions can be, for example, the electrodeposition coating, the primer coating, the basecoat, and/or the topcoat. Suitable topcoats include monocoats and basecoat/clearcoat composites. Monocoats are formed from one or more layers of a colored coating composition. Basecoat/clearcoat composites comprise one or more layers of a colored basecoat composition, and one or more layers of a clearcoating composition, wherein the basecoat composition has at least one component which is different from the clearcoat composition. In the embodiments of the present invention directed to automotive applications, the clearcoat can be transparent after application.

In another embodiment, the present invention is directed to multi-component composite cured compositions comprising a basecoat deposited from a pigmented coating composition, and a topcoating composition applied over the basecoat, wherein the topcoating composition is selected from any of the compositions previously described.

In one embodiment, the present invention is directed to a multi-component composite cured composition as previously described, wherein the topcoating composition is transparent after curing and is selected from any of the cured compositions previously described. The components used to form the topcoating composition in these embodiments can be selected from the coating components discussed above, and additional components also can be selected from those recited above.

The basecoat and transparent topcoat (i.e., clearcoat) compositions used in the multi-component composite cured compositions of the present invention in certain instances can be formulated into liquid high solids compositions, that is, compositions containing 40 percent, or greater than 50 percent by weight resin solids. The solids content can be determined by heating a sample of the cured composition to 105° C. to 110° C. for 1–2 hours to drive off the volatile material, and subsequently measuring relative weight loss. As aforementioned, although the cured compositions can be formed from liquid coating compositions, they also can be formed from coating compositions formulated as powder coating compositions.

The coating composition of the basecoat in the color-plus-clear system can be any of the compositions useful in coatings applications, particularly automotive applications. The coating composition of the basecoat can be formed from components comprising a resinous binder and a pigment to act as the colorant. Nonlimiting examples of resinous binders are acrylic polymers, polyesters, alkyds, and polyurethanes.

The resinous binders for the basecoat can be organic solvent-based materials such as those described in U.S. Pat. No. 4,220,679, note column 2, line 24 continuing through column 4, line 40, which portions is incorporated by reference. Also, water-based coating compositions such as those described in U.S. Pat. Nos. 4,403,003, 4,147,679 and 5,071,904 can be used as the binder in the basecoat composition. These U.S. patents are incorporated herein by reference.

The basecoat composition can comprise one or more pigments as colorants. Nonlimiting examples of suitable metallic pigments include aluminum flake, copper bronze flake, and metal oxide coated mica.

Besides the metallic pigments, the basecoat compositions can contain nonmetallic color pigments conventionally used in surface coatings such as, for example inorganic pigments such as titanium dioxide, iron oxide, chromium oxide, lead chromate, and carbon black; and organic pigments such as phthalocyanine blue and phthalocyanine green.

Optional ingredients in the basecoat composition can comprise those which are well known in the art of formulating surface coatings and can comprise surface active agents, flow control agents, thixotropic agents, fillers, anti-gassing agents, organic co-solvents, catalysts, and other customary auxiliaries. Nonlimiting examples of these materials and suitable amounts are described in U.S. Pat. Nos. 4,220,679; 4,403,003; 4,147,769; and 5,071,904, which are incorporated herein by reference.

The basecoat compositions can be applied to the substrate by any conventional coating technique such as brushing, spraying, dipping, or flowing. Spray techniques and equipment for air spraying, airless spray, and electrostatic spraying in either manual or automatic methods, known in the art can be used.

During application of the basecoat to the substrate, the film thickness of the basecoat formed on the substrate can range from 0.1 to 5 mils. In another embodiment, the film thickness of the basecoat formed on the substrate can range 0.1 to 1 mils, and can be 0.4 mils.

After forming a film of the basecoat on the substrate, the basecoat can be cured or alternatively given a drying step in which solvent is driven out of the basecoat film by heating or an air drying period before application of the clearcoat. Suitable drying conditions may depend on the particular basecoat composition, and on the ambient humidity if the composition is water-borne, but a drying time from 1 to 15 minutes at a temperature of 75° to 200° F. can be adequate.

The transparent or clear topcoat composition can be applied to the basecoat by any conventional coating technique, including, but not limited to, compressed air spraying, electrostatic spraying, and either manual or automatic methods. The transparent topcoat can be applied to a cured or to a dried basecoat before the basecoat has been cured. In the latter instance, the two coatings can then be heated to cure both coating layers simultaneously. The clearcoating thickness (dry film thickness) can be 1 to 6 mils.

The coating composition is cured by the combination of ionizing or actinic radiation and thermal energy as described in detail above. Typical radiation energy curing conditions are discussed in detail above. Typical thermal energy curing conditions can range from 50° F. to 475° F. (10° C. to 246° F.) for 1 to 30 minutes.

A second topcoat coating composition can be applied to the first topcoat to form a "clear-on-clear" topcoat. The first topcoat coating composition can be applied over the basecoat as described above. The second topcoat coating composition can be applied to a cured or to a dried first topcoat before the basecoat and first topcoat have been cured. The basecoat, the first topcoat, and the second topcoat can then be heated to cure the three coatings simultaneously.

It should be understood that the second transparent topcoat and the first transparent topcoat coating compositions can be the same or different provided that, when applied wet-on-wet, one topcoat does not substantially interfere with the curing of the other for example by inhibiting solvent/water evaporation from a lower layer. Moreover, the first topcoat, the second topcoat or both can be the cured composition of the present invention. The first transparent topcoat composition can be virtually any transparent topcoating composition known to those skilled in the art. The first transparent topcoat composition can be water-borne or solventborne, or, alternatively, in solid particulate form, i.e., a powder coating.

Nonlimiting examples of suitable first topcoating compositions include crosslinkable coating compositions comprising at least one thermosettable coating material and at least one curing agent. Suitable waterborne clearcoats are disclosed in U.S. Pat. No. 5,098,947, which patent is incorporated herein by reference, and are based on water-soluble acrylic resins. Useful solvent borne clearcoats are disclosed in U.S. Pat. Nos. 5,196,485 and 5,814,410, which patents are incorporated herein by reference, and include polyepoxides and polyacid curing agents. Suitable powder clearcoats are described in U.S. Pat. No. 5,663,240, which is incorporated herein by reference, and include epoxy functional acrylic copolymers and polycarboxylic acid curing agents.

Typically, after forming the first topcoat over the basecoat, the first topcoat is given a drying step in which solvent is driven out of the film by heating or, alternatively, an air drying period or curing step, before the application of the second topcoat. Suitable drying conditions will depend on the particular first topcoat composition, and on the ambient humidity if the composition is water-borne, but, in general, a drying time from 1 to 15 minutes at a temperature of 75° to 200° F. will be adequate.

The second topcoat coating composition of the present invention can be applied as described above for the first topcoat by any conventional coating application technique. Curing conditions can be those described above for the topcoat. The second topcoating dry film thickness can range from 0.1 to 3 mils (7.5 micrometers to 75 micrometers).

It should be mentioned that the coating compositions can be advantageously formulated as a "monocoat," that is a coating which forms essentially one coating layer when applied to a substrate. The monocoat coating composition can be pigmented. Nonlimiting examples of suitable pigments include those mentioned above. When employed as a monocoat, the coating compositions of the present invention can be applied (by any of the conventional application techniques discussed above) in two or more successive coats, and, in certain instances can be applied with only an ambient flash period between coats. The multi-coats when cured can form essentially one coating layer.

In another embodiment, the present invention is directed to a method for making a multi-component composite comprising (a) applying a pigmented composition to a substrate to form a basecoat; and (b) applying a topcoating composition over at least a portion of the basecoat to form a topcoat thereon, wherein the topcoating composition is selected from any of the compositions described above. The components used to form the topcoating composition in his embodiment can be selected from the coating components discussed above, and additional components also can be selected from those recited above.

The coatings formed from the cured compositions according to the present invention can have outstanding appearance properties and initial scratch (mar) resistance properties, as well as post-weathering or "retained" scratch (mar) resistance, which can be evaluated by measuring the gloss of coated substrates before and after abrading of the coated substrates.

The initial 20° gloss of a coated substrate according to the present invention can be measured with a 20° NOVO-GLOSS 20 statistical glossmeter, available from Gardner Instrument Company, Inc. The coated substrate can be subjected to scratch testing by linearly scratching the coating or substrate with a weighted abrasive paper for ten double rubs using an Atlas MTCC Scratch Tester, Model CM-5, available from Atlas Electrical Devices Company of Chicago, Ill. The abrasive paper is 3M 281 Q WETORDRY™ PRODUCTION™ 9 micron polishing paper sheets, which are commercially available from 3M Company of St. Paul, Minn. Panels are then rinsed with tap water and carefully patted dry with a paper towel. The 20° gloss is measured on the scratched area of each test panel. The number reported is the percent of the initial gloss retained after scratch testing, i.e., 100%×scratched gloss/ initial gloss. This test method is fully disclosed in the examples that follow.

In one embodiment, the present invention is directed to cured compositions having an initial 20° gloss (as measured using a 20° NOVO-GLOSS 20 statistical glossmeter, available from Gardner Instrument Company described above) of greater than 40, the compositions being any of the foregoing compositions according to the present invention. In another embodiment, the present invention is directed to cured compositions having an initial 20° gloss (as measured using a 20° NOVO-GLOSS 20 statistical glossmeter, available from Gardner Instrument Company described above) of greater than 50, or of greater than 70, the compositions being any of the foregoing compositions according to the present invention.

Moreover, in another embodiment, the present invention is directed to cured compositions having a post-weathering or "retained" scratch resistance value such that after scratch testing, greater than 30 percent of initial 20° gloss is retained. Moreover, the cured compositions of the present invention can have a post-weathering scratch resistance (as measured using the scratch test method described above after the unscratched test panels were subjected to simulated weathering by QUV exposure to UVA-340 bulbs in a weathering cabinet available from Q Panel Company) such that greater than 40 percent of initial 20° gloss is retained is retained after weathering. In another embodiment, the present invention is directed to cured compositions having a retained scratch resistance value such that after scratch testing greater than 60 percent of initial 20° is retained.

In one embodiment, the present invention is directed to methods of improving the scratch resistance of a substrate comprising applying to the substrate any of the inventive compositions described for the substrate. In another embodiment, the present invention is directed to a method of improving the dirt repellency of a substrate comprising applying to the comprising any of the inventive compositions described for the substrate.

In another embodiment, the present invention is directed to a method for retaining the gloss of a substrate over time comprising applying to the substrate comprising any of the inventive compositions described for the substrate. In another embodiment, the present invention is directed to a method for revitalizing the gloss of a substrate comprising applying to the substrate any of the inventive compositions described for the substrate.

In another embodiment, the cured compositions of the present invention also can be useful as decorative or protective coatings for pigmented plastic (elastomeric) substrates, such as those described above, or mold-in-color ("MIC") plastic substrates. In these applications, the compositions can be applied directly to the plastic substrate or included in the molding matrix. Optionally, an adhesion promoter can first be applied directly to the plastic or elastomeric substrate and the composition applied as a topcoat thereover. The compositions of the present invention also can be advantageously formulated as pigmented coating compositions for use as primer coatings, as basecoats in multi-component composite coatings, and as monocoat topcoats including pigments or colorants. The components used to form the compositions in these embodiments can be selected from the coating components discussed above, and additional components also can be selected from those recited above.

In yet another embodiment of the present invention, a cured composition is provided which comprises particles dispersed in a cured composition comprising one or more thermoplastic materials. As previously described, the concentration of particles is greater in the surface region than in the bulk region. The cured composition can be derived from a thermoplastic resinous coating composition. Nonlimiting examples of suitable thermoplastic materials include high molecular weight (i.e., Mw greater than 20,000, greater than 40,000, or greater than 60,000), acrylic polymers, polyolefin polymers, polyamide polymers, and polyester polymers suitable for use in lacquer dry systems. One nonlimiting example of a class of thermoplastic materials from which the cured composition can be derived is fluoropolymer-acrylic copolymers such as those prepared from polyvinylidene fluoride, for example KYNAR 500 (available from Ausimont USA, Inc.) and thermoplastic acrylic copolymers, such as ACRYLOID B44 (65% methyl methacrylate and 35% ethyl acrylate), available from Dock Resin, Inc.

The coating compositions of the present invention can provide good recoat or repair adhesion, as shown in the examples below.

Illustrating the invention is the following examples which, however, are not to be considered as limiting the invention to their details. Unless otherwise indicated, all parts and percentages in the following examples, as well as throughout the specification, are by weight.

EXAMPLE 1

Silylated compounds for use in the coating compositions disclosed below were prepared as follows:

Silylated Compound A

This example illustrates the preparation of a silylated compound that is a half-acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 1202.9 grams trimethylolpropane (commercially available from Bayer USA), 14.4 grams of triphenyl phosphine (commercially available from Aldrich®), 12.1 grams of triisooctyl phosphite (commercially available from GE Specialty Chemicals), and 800.0 grams of n-butyl acetate (commercially available from Union Carbide Chemicals and Plastics Co., Inc.).

The reactor was heated to 115° C. and 4436.7 grams of methylhexahydrophthalic anhydride (commercially available from Milliken Chemical) were added over 90 minutes, and then held 4 hours at 115° C. 1533.4 grams of propylene oxide (commercially available from Fisher Scientific Company) was charged to the reactor over 1 hour. The reaction was held 4 hours until the acid value was less 5.38 mg KOH/gram. Residual propylene oxide was removed by vacuum distilling at 60 to 80 mm Hg at 96° C. max. The resultant product had a total solids content of 95.25%.

This product was silylated by the following procedure: 637.6 grams (95.25% solids) of the previously described material were charged to a reaction flask equipped with an overhead stirrer, nitrogen inlet, thermocouple, addition funnel, and condenser. The temperature was increased to 110° C. for one hour with nitrogen sparge to ensure that the system was dry. The temperature was then decreased to 85° C. under nitrogen blanket, at which time 180.9 grams hexamethyldisilazane (commercially available from Aldrich®) were added drop-wise over a 30 minute period. The reaction was allowed to continue one additional hour, at which time a nitrogen sparge was introduced. The reaction was considered complete when the size of the IR peak corresponding to the hydroxyl moiety was negligible. The solution was allowed to continue stirring under nitrogen sparge at 85° C. until the ammonia (by-product) was removed. Theoretical resin solids content was 96.3%.

Silylated Compound B

This example illustrates the preparation of a silylated compound that is a half-acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 550.0 grams trimethylolpropane (commercially available from Bayer USA), 6.8 grams of triphenyl phosphine (commercially available from Aldrich®), 5.57 grams of triisooctyl phosphite (commercially available from GE Specialty Chemicals), and 205.7 grams of n-butyl acetate (commercially available from Union Carbide Chemicals and Plastics Co., Inc.). The reaction was heated to 115° C. 2030 grams of methylhexylhydrophthalic anhydride (commercially available from Milliken Chemical) was added over 90 minutes. The reaction was held 4 hours at 115° C. The reactor was cooled to 100° C. and 769.9 grams of propylene oxide (commercially available from Fisher Scientific Company) was added over 1 hour. The reaction was held 5 hours at 100° C. until the acid value was 3.1 mg KOH/gram. Residual propylene oxide was removed by vacuum distilling at 60 to 80 mm Hg at 70° C. The resultant product had a total solids content of 95.08%. The product was thinned to 80.0% solids with butyl acetate.

This product was silylated by the following procedure: 3449.3 grams (80.0% solids) of the previously described material were charged to a reaction flask equipped with an overhead stirrer, nitrogen inlet, thermocouple, addition funnel, and condenser. The temperature was increased to 110° C. for one hour with nitrogen sparge to ensure that the system was dry. The temperature was then decreased to 85° C. under nitrogen blanket, at which time 821.9 grams hexamethyidisilazane (commercially available from Aldrich,) were added drop-wise over a one hour period. The reaction was allowed to continue 15 additional hours, at which time a nitrogen sparge was introduced. The reaction was considered complete when the size of the IR peak corresponding to the hydroxyl moiety was negligible. The solution was allowed to continue stirring under nitrogen sparge at 85° C. until the ammonia (by-product) was removed. Theoretical resin solids content was 96.3%.

A silica dispersion, polysiloxane polyol and composition pre-mixtures for use in the coating compositions disclosed below were prepared as follows:

Silica Dispersion

The colloidal silica dispersion was prepared as follows. A suitable reaction vessel equipped for vacuum distillation was flushed with $N_2$. To the reaction flask was added 3150 g of the polysiloxane polyol described above, 1350 g of ORGANOSILICASOLT™ MT-ST colloidal silica which is commercially available from Nissan Chemicals and 1440 g of methyl amyl ketone. The mean particle size of the silica particles was 10–20 nanometers, as disclosed at http//www.snowtex.com/organo_types.html (Jun. 2, 2000), which is incorporated by reference herein. The resulting mixture was vacuum distilled at 25° C. for a period of 8 hours.

Polysiloxane Polyol

The polysiloxane polyol was a product of the hydrosilylation of a reactive silicone fluid with an approximate degree of polymerization of 3 to 7, i.e., (Si—O)$_3$ to (Si—O)$_7$. The polysiloxane polyol was prepared from a proportionately scaled-up batch of the following mixture of ingredients in the ratios indicated:

| Ingredients | Equivalent Weight | Equivalents | Parts By Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | | |
| Chloroplatinic acid | | 10 ppm | |
| Toluene | | | 0.23 |
| Isopropanol | | | 0.07 |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids was added at ambient conditions and the temperature was gradually increased to 75° C. under a nitrogen blanket. At that temperature, 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Composition Pre-Mixtures

The following pre-mixtures of selected components of the coating compositions discussed below were prepared by sequentially mixing each of the components with agitation.

| | Pre-Mix 1: | |
|---|---|---|
| Ingredient | Parts by weight (grams) | Solid weights (grams) |
| Methyl n-amyl ketone | 18.0 | — |
| Butyl Cellosolve ® acetate[1] | 18.0 | |
| Butyl Carbitol ® acetate[2] | 4.0 | — |
| TINUVIN 384[3] | 1.58 | 1.50 |
| TINUVIN 400[4] | 1.76 | 1.50 |
| TINUVIN 292[5] | 0.40 | 0.40 |
| Silica Dispersion from above | 13.2 | 10.0 |
| RESIMENE 757[6] | 27.1 | 26.3 |
| LUWIPAL 018[7] | 11.9 | 8.7 |

[1]2-Butoxyethyl acetate solvent is commercially available from Union Carbide Corp.
[2]2-(2-Butoxyethoxy) ethyl acetate is commercially available from Union Carbide Corp.
[3]Substituted benzotriazole UV light stabilizer commercially available from Ciba Specialty Chemicals Corp.
[4]Substituted triazine UV tight stabilizer commercially available from Ciba Specialty Chemicals Corp.
[5]Sterically hindered amine light stabilizer commercially available from Ciba Specialty Chemicals Corp.
[6]Methylated and butylated melamine-formaldehyde resin available from Solutia Inc.
[7]High imino, butylated melamine formaldehyde resin commercially available from BASF Corp.

| | Pre-Mix 2: | |
|---|---|---|
| Ingredient | Parts by weight (grams) | Solid weights (grams) |
| Carbamoylated acrylic[1] | 79.4 | 50.0 |
| Carbamoylated polyester[2] | 69.4 | 50.0 |

[1](58% butyl methacrylate/40% hydroxypropyl acrylate/2% methyl styrene dimer) 64% solids in a solvent blend of (50% DOWANOL PM/50% propanoic acid, 3-ethoxy ethyl ester) 75% carbamoylated with methyl carbamate.
[2](10.6% trimethylol propane/22.7% 2,2,4-trimethyl-1,3-pentanediol/17.5% neopentyl glycol/49.2% hexahydrophthalic anhydride) 69% solids in a solvent blend of (44% DOWANOL PM/56% DOWANOL PM Acetate) 75% carbamoylated with methyl carbamate.

| | Pre-Mix 3: | |
|---|---|---|
| Ingredient | Parts by weight (grams) | Solid weights (grams) |
| Methyl n-amyl ketone | 5.4 | — |
| Butyl Cellosolve ® acetate[1] | 10.8 | — |
| Butyl Carbitol ® acetate[2] | 1.8 | — |
| TINUVIN ® 928[3] | 3.00 | 3.00 |
| TINUVIN ® 292[4] | 0.40 | 0.40 |
| TINUVIN ® 123[5] | 0.60 | 0.60 |
| CYMEL ® 1130[6] | 29.9 | 29.9 |
| RESIMENE ® 741[7] | 11.3 | 9.9 |

[1]2-Butoxyethyl acetate solvent is commercially available from Union Carbide Corp.
[2]2-(2-Butoxyehtoxy) ethyl acetate is commercially available from Union Carbide Corp.
[3]2-(2H-Benzotriazol-2yl)-6-(1-methyl-1-phenylethyl-4-(1,1,3,3-tetramethylbutyl) phenol UV absorber available from Ciba Specialty Chemicals Corp.
[4]Sterically hindered amine light stabilizer commercially available from Ciba Specialty Chemicals Corp.
[5]Bis-(1-octyloxy-2,2,6,6-tetramethyl-4-piperidinyl) sebacate hindered aminoether light stabilizer available from Ciba Specialty Chemicals Corp.
[6]Methylated and butylated melamine-formaldehyde resin available from Cytec Industries, Inc.
[7]Methylated melamine-formaldehyde resin available from Solutia Inc.

| Pre-Mix 4: | | |
|---|---|---|
| Ingredient | Parts by weight (grams) | Solid weights (grams) |
| Methyl n-amyl ketone | 7.5 | — |
| Butyl Cellosolve ® acetate[1] | 15.0 | — |
| Butyl Carbitol ® acetate[2] | 2.50 | — |
| TINUVIN ® 928[3] | 3.00 | 3.00 |
| TINUVIN ® 292[4] | 0.40 | 0.40 |
| TINUVIN ® 123[5] | 0.60 | 0.60 |
| Silica Dispersion from above | 26.4 | 20.0 |
| Polysiloxane polyol from above | 1.00 | 1.00 |
| CYMEL ® 1130[6] | 29.9 | 29.9 |
| RESIMENE ® 741[7] | 11.3 | 9.9 |

[1]2-Butoxyethyl acetate solvent is commercially available from Union Carbide Corp.
[2]2-(2-Butoxyethoxy) ethyl acetate is commercially available from Union Carbide Corp.
[3]2-(2H-Benzotriazol-2yl)-6-(1-methyl-1-phenylethyl)-4-(1,1,3,3-tetramethylbutyl) phenol UV absorber available from Ciba Specialty Chemicals Corp.
[4]Sterically hindered amine light stabilizer commercially available from Ciba Specialty Chemicals Corp.
[5]Bis-(1-octyloxy-2,2,6,6-tetramethyl-4-piperidinyl) sebacate hindered aminoether light stabilizer available from Ciba Specialty Chemicals Corp.
[6]Methylated and butylated melamine-formaldehyde resin available from Cytec Industries, Inc.
[7]Methylated melamine-formaldehyde resin available from Solutia Inc.

The pre-mixtures of ingredients from Pre-Mixes 1, 2, 3 and 4 were used in Coating Compositions 1–12. The components for forming Coating Compositions 1–12 are listed below in Tables 1–3. The amounts listed are the total parts by weight in grams and the amount within parenthesis are percentages by weight based on weight of resin solids. Each component was mixed sequentially with agitation.

TABLE 1

| | COATING COMPOSITION | | | | |
|---|---|---|---|---|---|
| Ingredient | 1 | 2 | 3 | 4 | 5 |
| Pre-mix 1 | 95.9 (48.4) | 95.9 (48.4) | — | — | — |
| Pre-mix 2 | 86.3 (58.0) | 57.4 (38.6) | — | — | — |
| Pre-mix 3 | — | — | 63.2 (43.8) | 63.2 (43.8) | 63.2 (43.8) |
| Silica Dispersion from above | — | — | — | 13.2 (10.0) | 26.4 (20.0) |
| Polysiloxane polyol from above | — | — | — | 8.0 (8.0) | 1.0 (1.0) |
| Silylated Compound A | — | 20.1 (19.4) | 62.5 (60.2) | 46.9 (45.2) | 46.9 (45.2) |
| Multiflow[1] | — | — | 0.60 (0.30) | — | — |
| Polybutyl acrylate[2] | 0.50 (0.30) | 0.50 (0.30) | 0.67 (0.40) | 0.67 (0.40) | 0.67 (0.40) |
| Blocked acid catalyst[3] | 2.50 (1.00) | 2.50 (1.00) | — | — | — |
| Acid catalyst[4] | — | — | 1.43 (1.00) | 1.43 (1.00) | 1.43 (1.00) |
| Reduction Information: | | | | | |
| Methyl n-amyl ketone | 3.49 | — | 3.60 | 2.89 | 2.10 |
| Butyl Cellosolve ® acetate[5] | 3.49 | — | 7.2 | 5.8 | 4.20 |
| Butyl Carbitol ® acetate[6] | 0.76 | — | 1.2 | 0.96 | 0.7 |

TABLE 1-continued

| | COATING COMPOSITION | | | | |
|---|---|---|---|---|---|
| Ingredient | 1 | 2 | 3 | 4 | 5 |
| Spray viscosity[7] (sec) | 28 | 28 | 37 | 38 | 38 |
| Paint temperature (° F.) | 73 | 73 | 72 | 72 | 72 |
| 230° F. (110° C.) % Solids[8] | 52 | 58 | 64 | 66 | 68 |

[1]50% solution of MODAFLOW ®, available from Solutia Inc., supplied in xylene. MODAFLOW ® is a polymer made of 75% by weight 2-ethyl hexyl acrylate, 25% by weight ethyl acrylate with a number average molecular weight of 7934.
[2]A flow control agent having a Mw of 6700 and a Mn of 2600 made in xylene at 60% solids available from DuPont.
[3]Dodecyl benzene sulfonic acid solution, blocked with diisopropanol amine to 91% total neutralization, 40 percent acid solids in ethanol.
[4]Dodecyl benzene sulfonic acid solution (70% solids in isopropanol) available from Chemcentral.
[5]2-Butoxyethyl acetate solvent is commercially available from Union Carbide Corp.
[6]2-(2-Butoxyethoxy) ethyl acetate is commercially available from Union Carbide Corp.
[7]Viscosity measured in seconds with a #4 FORD efflux cup at ambient temperature.
[8]% Solids of a coating is determined by taking a specific quantity of the coating and adding it into a tarred aluminum dish and recording the coating weight. Three milliliters of xylene is added into the aluminum dish to dissolve and/or disperse the coating. The coating is then heated in an oven for sixty minutes at 230° F. (110° C.). After removal from the oven, the aluminum dish is cooled, re-weighed, and the non-volatile content (weight percent solids) is calculated using the following equation: % Solids = (F − T) ÷ (I − T) * 100. Where: F = Final weight of remaining coating and aluminum dish in grams, I = Initial weight of coating and aluminum dish in grams, T = Tare weight of the aluminum dish in grams, and 100 is the conversion factor to percentage.

TABLE 2

| | COATING COMPOSITION | | | |
|---|---|---|---|---|
| Ingredient | 6 | 7 | 8 | 9 |
| Pre-mix 1 | 95.9 (48.4) | 95.9 (48.4) | 95.9 (48.4) | 95.9 (48.4) |
| Pre-mix 2 | 86.3 (58.0) | 57.4 (38.6) | 57.4 (38.6) | 71.9 (48.3) |
| Silylated Compound A | — | 20.1 (19.4) | — | — |
| Silylated Compound B | — | — | 23.1 (19.4) | 11.5 (9.7) |
| Polybutyl acrylate[1] | 0.50 (0.30) | 0.50 (0.30) | 0.50 (0.30) | 0.50 (0.30) |
| Blocked acid catalyst[2] | 2.50 (1.00) | 2.50 (1.00) | 2.50 (1.00) | 2.50 (1.00) |
| Reduction Information: | | | | |
| Methyl n-amyl ketone | 3.51 | — | — | 1.80 |
| Butyl Cellosolve ® acetate[3] | 3.51 | — | — | 1.80 |
| Butyl Carbitol ® acetate[4] | 0.78 | — | — | 0.40 |
| Spray viscosity[5] (sec) | 28 | 29 | 28 | 28 |

TABLE 2-continued

|  | COATING COMPOSITION | | | |
|---|---|---|---|---|
| Ingredient | 6 | 7 | 8 | 9 |
| Paint temperature (° F.) | 73 | 73 | 74 | 74 |
| 230° F. (110° C.) % Solids[6] | 53 | 58 | 57 | 56 |

[1]A flow control agent having a Mw of 6700 and a Mn of 2600 made in xylene at 60% solids available from DuPont.
[2]Dodecyl benzene sulfonic acid solution, blocked with diisopropanol amine to 91% total neutralization, 40 percent acid solids in ethanol.
[3]2-Butoxyethyl acetate solvent is commercially available from Union Carbide Corp.
[4]2-(2-Butoxyethoxy) ethyl acetate is commercially available from Union Carbide Corp.
[5]Viscosity measured in seconds with a #4 FORD efflux cup at ambient temperature.
[6]% Solids of a coating is determined by taking a specific quantity of the coating and adding it into a tarred aluminum dish and recording the coating weight. Three milliliters of xylene is added into the aluminum dish to dissolve and/or disperse the coating. The coating is then heated in an oven for sixty minutes at 230° F. (110° C.). After removal from the oven, the aluminum dish is cooled, re-weighed, and the non-volatile content (weight percent solids) is calculated using the following equation: % Solids = (F − T) ÷ (I − T) * 100. Where: F = Final weight of remaining coating and aluminum dish in grams, I = Initial weight of coating and aluminum dish in grams, T = Tare weight of the aluminum dish in grams, and 100 is the conversion factor to percentage.

TABLE 3

|  | COATING COMPOSITION | | |
|---|---|---|---|
| Ingredient | 10 | 11 | 12 |
| Pre-mix 4 | 97.6 (64.8) | 97.6 (64.8) | 97.6 (64.8) |
| Pre-mix 2 | — | 33.6 (22.6) | 16.8 (11.3) |
| Silylated Compound B | 53.8 (45.2) | 26.9 (22.6) | 40.4 (33.9) |
| Polybutyl acrylate[1] | 0.67 (0.40) | 0.67 (0.40) | 0.67 (0.40) |
| Acid catalyst[2] | 1.43 (1.00) | 1.43 (1.00) | 1.43 (1.00) |
| Reduction Information: |  |  |  |
| Methyl n-amyl ketone | 0.62 | 2.7 | 1.48 |
| Butyl Cellosolve ® acetate[3] | 1.25 | 5.4 | 2.95 |
| Butyl Carbitol ® acetate[4] | 0.21 | 0.90 | 0.49 |
| Spray viscosity[5] (sec) | 27 | 28 | 28 |
| Paint temperature (° F.) | 74 | 74 | 74 |
| 230° F. (110° C.) % Solids[6] | 66 | 63 | 63 |

[1]A flow control agent having a Mw of 6700 and a Mn of 2600 made in xylene at 60% solids available from DuPont.
[2]Dodecyl benzene sulfonic acid solution, (70% solids in isopropanol) available from Chemcentral.
[3]2-Butoxyethyl acetate solvent is commercially available from Union Carbide Corp.
[4]2-(2-Butoxyethoxy) ethyl acetate is commercially available from Union Carbide Corp.
[5]Viscosity measured in seconds with a #4 FORD efflux cup at ambient temperature.
[6]% Solids of a coating is determined by taking a specific quantity of the coating and adding it into a tarred aluminum dish and recording the coating weight. Three milliliters of xylene is added into the aluminum dish to dissolve and/or disperse the coating. The coating is then heated in an oven for sixty minutes at 230° F. (110° C.). After removal from the oven, the aluminum dish is cooled, re-weighed, and the non-volatile content (weight percent solids) is calculated using the following equation: % Solids = (F − T) ÷ (I − T) * 100. Where: F = Final weight of remaining coating and aluminum dish in grams, I = Initial weight of coating and aluminum dish in grams, T = Tare weight of the aluminum dish in grams, and 100 is the conversion factor to percentage.

TESTING

Coating Compositions 1–12 were spray applied over a pigmented basecoat to form color-plus-clear composite coatings over primed electrocoated steel panels. The panels used were cold rolled steel panels (size 4 inches×12 inches (10.16 cm by 30.48 cm)) coated with ED5100 electrocoat and PCV70100M primer, both available from PPG Industries, Inc. The test panels are available as APR30471 from ACT Laboratories, Inc. of Hillsdale, Mich.

Coating Compositions 1–5 were tested over two different basecoats, namely: HWB9517, a black pigmented water-based acrylic/melamine basecoat commercially available from PPG Industries, Inc, and a black pigmented water-based acrylic/melamine basecoat (Basecoat X), the formulation for which is given below. Coating Compositions 6–12 were evaluated over Basecoat X.

Basecoat X

| Ingredient | Parts by weight (grams) | Solid weights (grams) |
|---|---|---|
| Hexyl Cellosolve ®[1] | 20.0 | — |
| 2-Butoxyethanol | 20.0 | — |
| Phosphatized Epoxy[2] | 1.00 | 0.60 |
| TINUVIN 1130[3] | 3.00 | 3.00 |
| CYMEL 1156[4] | 25.0 | 25.0 |
| VISCOLAM 330[5] | 3.33 | 1.00 |
| Deionized Water | 100.0 | — |
| Odorless Mineral Spirits[6] | 20.0 | — |
| BYK-032[7] | 3.90 | 2.00 |
| Acrylic Latex[8] | 125.3 | 51.5 |
| SETALUX 6802 AQ-24[9] | 61.2 | 15.0 |
| Amine[10] | 3.00 | — |
| Black tint paste[11] | 47.6 | 11.5 |

[1]Ethylene glycol monohexyl ether solvent commercially available from Union Carbide Corp.
[2]Phosphatized epoxy prepared from EPON 828, a polyglycidyl ether of Bisphenol A available from Shell Oil and Chemical Co.; reacted with phosphoric acid in an 83:17 weight ratio.
[3]Substituted hydroxyphenyl benzotriazole available from Ciba Specialty Chemicals Corp.
[4]Methylated melamine formaldehyde resin available from Cytec Industries, Inc.
[5]Acrylic thickener available from Lamberti in Italy.
[6]Solvent available from Shell Chemical Co.
[7]Defoamer available from Byk Chemie.
[8]The Acrylic Latex was prepared as follows: The polyester was prepared in a four-neck round bottom flask equipped with a thermometer, mechanical stirrer, condenser, dry nitrogen sparge, and a heating mantle. The following ingredients were used:

| | |
|---|---|
| 1103.0 g | isostearic acid |
| 800.0 g | pentaerythritol |
| 470.0 g | crotonic acid |
| 688.0 g | phthalic anhydride |
| 6.1 g | dibutyltin oxide |
| 6.1 g | triphenyl phosphite |
| 1170.0 g | butyl acrylate |
| 4.0 g | Ionol (butylated hydroxytoluene) |

The first six ingredients were stirred in the flask at 210° C. until 245 ml of distillate was collected and the acid value dropped to 46. The material was cooled to 77° C. and the last two ingredients were stirred in. The final product was a viscous yellow liquid with a hydroxyl value of 54.0, a Gardner-Holdt viscosity of Z+, a weight average molecular weight of 45,600, and a non-volatile content of 70.2%. A pre-emulsion was prepared by stirring together the following ingredients:

| | |
|---|---|
| 286.0 g | polyester of example III |
| 664.0 g | butyl acrylate |
| 30.0 g | ethylene glycol dimethacrylate |
| 20.0 g | acrylic acid |
| 46.4 g | dodecylbenzenesulfonic acid (70% in isopropanol) |
| 14.3 g | dimethylethanolamine |
| 1000.0 g | water |

The reaction was carried out using the same procedure and materials as in Latex Example I. The reaction exothermed from 23° C. to 80° C.

-continued

The final pH of the latex was 6.1, the nonvolatile content was 42.4%, the particle size was 105 nm, and the Brookfield viscosity was 14 cps (spindle #1, 50 rpm).
[9] Rheology control agent available from Akzo Nobel.
[10] Dimethylethanolamine, 50% Aqueous, available from Union Carbide Corp.
[11] Black pigment available from Cabot Corp. as MONARCH BLACK 1300 dispersed in an acrylic grind vehicle (35% butyl acrylate, 30% styrene, 18% butyl methacrylate, 8.5% 2-hydroethyl acrylate, 8.5% acrylic acid) at a total pigment to binder ration (P/B) of 0.35.

Two coats of basecoat were automated spray applied to the electrocoated and primed steel panels at ambient temperature (70° F. (21° C.)). No flash was permitted between the application of the two basecoat layers. The total dry film thickness of the basecoat was 0.5 to 0.7 mils (13 to 18 micrometers). After the second basecoat application, a 1 to 10 minute air flash at ambient temperature was given before force flashing the basecoated panels. For panels basecoated with HWB9517, the force flash was ten minutes at 200° F. (93° C.). The panels basecoated with Basecoat X were forced flashed for five minutes at 200° F. (93° C.). Coating Compositions 1–12 were each automated spray applied to a basecoated panel at ambient temperature in two coats with a ninety second ambient flash between applications. The total dry film thickness of the clearcoat was 1.5 to 1.8 mils (38 to 46 micrometers). All coatings were allowed to air flash at ambient temperature for ten minutes. Panels prepared from each coating were baked for thirty minutes at 285° F. (141° C.) to fully cure the coating(s). The panels were baked in a horizontal position.

To test recoat adhesion, each panel was coated with another layer of basecoat and clearcoat or clearcoat only, as specified below. Examples 1–5 were recoated with HWB9517 or Basecoat X and Coating Compositions 1–5, depending on the respective original panel. Examples 6–12 were recoated with Basecoat X and Coating Compositions 6–12, depending on the respective original panel. For example, Coating Composition 5 over HWB9517 original (prepared above) was recoated with HWB9517 and Coating Composition 5 clearcoat. Half of an original panel from Examples 1–12 was basecoated and clearcoated and the other half of the panel was clearcoated only. To recoat the panels, the bottom halves of the original panels were covered with aluminum foil and then the respective basecoats were automated spray applied as described above. The foil was removed, resulting in an original panel with the upper half coated in basecoat and the bottom half still with only the original coating layers. The panels were force flashed as described above. The respective clearcoat was then automated spray applied to the entire panel as described above. The resulting panels were half coated in basecoat/clearcoat from the original spray application and another layer of basecoat/clearcoat from the recoat spray application (B/C//B/C). The other half of the resulting panel was coated in basecoat/clearcoat from the original spray application and another layer of clearcoat from the recoat spray application (B/C//C).

Properties for the coatings are reported below in Table 4 for Examples 1–5 over HWB9517 basecoat and Table 5 for Examples 1–12 over Basecoat X.

TABLE 4

| | | % 20° Gloss Retained after scratch testing[2] | | | | | |
|---|---|---|---|---|---|---|---|
| | Initial | | Post weathering[3] | | Knoop | Recoat Adhesion[5] | |
| Example # | 20° Gloss[1] | Initial | 286 Hours | 618 Hours | Hardness[4] | B/C//B/C | B/C//C |
| 1 | 85 | 79 | 82 | 84 | 10.3 | 0 | 0 |
| 2 | 85 | 18 | 25 | 58 | 4.0 | 0 | 0 |
| 3 | 84 | 1 | 5 | 8 | <2.0 | 0 | 4+ |
| 4 | 84 | 6 | 14 | 20 | <2.0 | 0 | 4 |
| 5 | 83 | 1 | 13 | 18 | <2.0 | 0 | 4 |

TABLE 5

| | | % 20° Gloss Retained after scratch testing[2] | | | | | |
|---|---|---|---|---|---|---|---|
| | Initial | | Post weathering[3] | | Knoop | Recoat Adhesion[5] | |
| Example # | 20° Gloss[1] | Initial | 286 Hours | 618 Hours | Hardness[4] | B/C//B/C | B/C//C |
| 1 | 87 | 91 | 84 | 71 | 12.7 | 0 | 0 |
| 2 | 87 | 78 | 80 | 64 | 9.9 | 4+ | 0 |
| 3 | 87 | 27 | 20 | 20 | 13.8 | 5 | 4+ |
| 4 | 88 | 81 | 28 | 26 | 11.5 | 4+ | 4 |
| 5 | 88 | 71 | 53 | 44 | 9.9 | 4+ | 4 |
| 6 | 87 | 91 | — | — | 10.9 | 1 | 0 |
| 7 | 86 | 67 | — | — | 7.7 | 4+ | 0 |
| 8 | 87 | 67 | — | — | 8.1 | 4+ | 0 |
| 9 | 85 | 91 | — | — | 10.4 | 4 | 0 |
| 10 | 87 | 49 | — | — | 5.8 | 4+ | 4+ |

TABLE 5-continued

| | | | % 20° Gloss Retained after scratch testing[2] | | | | |
|---|---|---|---|---|---|---|---|
| | Initial | | Post weathering[3] | | Knoop | Recoat Adhesion[5] | |
| Example # | 20° Gloss[1] | Initial | 286 Hours | 618 Hours | Hardness[4] | B/C//B/C | B/C//C |
| 11 | 85 | 67 | — | — | 6.7 | 4 | 1+ |
| 12 | 87 | 59 | — | — | 6.6 | 4+ | 3+ |

[1]20° gloss was measured with a Statistical Novo-Gloss 20° gloss meter, available from Paul N. Gardner Company, Inc.
[2]Coated panels were subjected to scratch testing by linearly scratching the coated surface with a weighted abrasive paper for ten double rubs using an Atlas AATCC Scratch Tester, Model CM-5, available from Atlas Electrical Devices Company of Chicago, Illinois. The abrasive paper used was 3M 281Q WETORDRY ™ PRODUCTION ™ 9 micron polishing paper sheets, which are commercially available from 3M Company of St. Paul, Minnesota. Panels were then rinsed with tap water and carefully patted dry with a paper towel. The 20° gloss was measured (using the same gloss meter as that used for the initial 20° gloss) on the scratched area of each test panel. Using the lowest 20° gloss reading from the scratched area, the scratch results are reported as the percent of the initial gloss retained after scratch testing using the following calculation: 100% * scratched gloss ÷ initial gloss. Higher values for percent of gloss retained are desirable.
[3]Post-weathering scratch resistance (retained scratch resistance) was measured using the scratch test method described above after the unscratched test panels were subjected to simulated weathering by exposure to UVA-340 bulbs in a QUV Accelerated Weathering Tester available through Q Panel Lab Products. Testing was as follows: a cycle of 70° C. for 8 hours exposure to UVA followed by a condensation cycle at 50° C. for 4 hours with no UVA (total test time is reported in the table). Using the lowest 20° gloss reading from the scratched area, the scratch results are reported as the percent of the initial gloss retained after post-weathering scratch testing using the following calculation: 100% * post-weathering scratched gloss ÷ initial gloss. Higher values for percent of gloss retained are desirable.
[4]Knoop hardness is a hardness measurement derived from the size of an indentation in the coating made using the Tukon Microhardness Instrument. The Tukon Microhardness Instrument makes an indentation in a cured coating by applying a 25 gram load to the surface with a diamond tip. The size of the indentation is measured using a microscope. That indentation size is then converted to the Knoop Hardness measurement. The Tukon Microhardness Instrument used was the Tukon Microhardness Tester Model 300 manufactured by Wilson Instruments, Division of Instron Corporation.
[5]Recoat adhesion tests the adhesion of the recoat layer (either basecoat/clearcoat or clearcoat only) to the original layers (steel/electrodeposition/primer/basecoat/clearcoat) to simulate repair coatings. An eleven-blade claw with 1.5 mm spaced teeth (blade and handle/blade holder are available from Paul N. Gardner Company, Inc.) was used to scribe the cured coating. Two sets of scribes were made by scribing the second set on top of and perpendicular to the first set. Detached flakes and ribbons of coating were wiped off the panel and strapping tape (3M #898 available from 3M Company) was smoothed firmly over the crosshatch marking. Within 90 seconds of application, the tape was removed in one continuous motion directed toward the tester and as parallel to the panel as possible. The scribed area was inspected and rated for removal of the recoat layer to the substrate according to the following scale:
5 = The edges of the cuts are completely smooth and none of the lattice squares is detached.
4 = Small flakes of coating are detached at intersections. Less than five percent of the area is affected.
3 = Small flakes of the coating are detached along edges and at intersections of cuts. The area affected is five to fifteen percent of the lattice.
2 = The coating has flaked along the edges and on parts of the squares. The area affected is fifteen to thirty-five percent of the lattice.
1 = The coating has flaked along the edges of cuts in large ribbons and whole squares have detached. The area affected is thirty-five to sixty-five percent of the lattice.
0 = Flaking and detachment worse than rating 1. Over sixty-five percent of the lattice is affected.

EXAMPLE 2

Silylated compounds for use in the coating compositions disclosed below were prepared as follows:

Silylated Compound C

This example illustrates the preparation of a silylated compound that is a half acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 4436.7 grams methyl hexahydrophthalic anhydride (commercially available from Milliken Chemical), 1202.9 grams trimethylolpropane (commercially available from Bayer USA), 14.4 grams of triphenyl phosphine (commercially available from Aldrich®), 12.1 grams of triisooctyl phosphite (commercially available from GE Specialty Chemicals), and 800.0 grams of n-butyl acetate (commercially available from Union Carbide Chemicals and Plastics Co., Inc.).

The reaction was heated to 115° C. and held 4 hours. 1533.4 grams of propylene oxide (commercially available from Fisher Scientific Company) was charged to the reactor over 1 hour. The reaction was held 3 to 5 hours until the acid value was less than 4.87 mg KOH/gram. Residual propylene oxide was removed by vacuum distilling at 60 to 80 mm Hg at 100 to 11 5° C. The resultant product had a total solids content of 94.8%.

This product was silylated by the following procedure: 2700.0 grams of the previously described material were charged to a reaction flask equipped with an overhead stirrer, nitrogen inlet, thermocouple, addition funnel, and condenser. The temperature was increased to 90° C. under nitrogen blanket, at which time 762.39 grams hexamethyldisilazane (commercially available from Aldrich®) were added drop-wise over a three hour period. The reaction was allowed to continue one additional hour, at which time a nitrogen sparge was introduced. The reaction was considered complete when the size of the IR peak corresponding to the hydroxyl moiety was negligible. Resin solids content was 95.8%.

Silylated Compound D

This example illustrates the preparation of a silylated compound that is a half acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 4436.7 grams methyl hexahydrophthalic anhydride, 1202.9 grams trimethylolpropane, 14.4 grams of triphenyl phosphine, 12.1 grams of triisooctyl phosphite, and 800.0 grams of n-butyl acetate. The reaction was heated to 1 15° C. and held 4 hours. 1533.4 grams of propylene oxide was charged to the reactor over 1 hour. The reaction was held 3 to 5 hours until the acid value was less than 4.87 mg KOH/gram. Residual propylene oxide was removed by vacuum distilling at 60 to 80 mm Hg at 100 to 1 15° C. The resultant product had a total solids content of 98.1%.

This product was divided into three batches and silylated by the following procedure: 1830.0 grams of the previously described material were charged to a reaction flask equipped with an overhead stirrer, nitrogen inlet, thermocouple, addition funnel, and condenser. The temperature was increased to 90° C. under nitrogen blanket, at which time 535.36 grams hexamethyldisilazane were added drop-wise over a 2.5 hour period. The reaction was allowed to continue one additional hour, at which time the temperature was increased to 110° C. The reaction was considered complete when the size of the IR peak corresponding to the hydroxyl moiety was negligible. The product was cooled to room temperature and diluted with t-butyl acetate. The three batches were blended together. Resin solids were 95%.

Silylated Compound E

This example illustrates the preparation of a silylated compound that is a half acid ester of hexahydrophthalic anhydride and trimethylolpropane with residual carboxyl groups reacted with propylene oxide.

A reaction vessel equipped with stirrer, thermocouple, temperature control, pumps and fitted with valved ports was charged with 2014.4 grams hexahydrophthalic anhydride, 595.6 grams trimethylolpropane, 7.1 grams of triphenyl phosphine, 6.0 grams of triisooctyl phosphite, and 376.8 grams of n-butyl acetate. The reaction was heated to 115° C. and held 4 hours. 758.8 grams of propylene oxide was charged over a one hour period. The reaction was held three to five hours until the acid value was less than 5.0 mg KOH/gram. Residual propylene oxide was removed by vacuum distilling at 60 to 80 mm Hg at 100 to 115° C. The resultant product had a total solids content of 89.0%.

This product was silylated by the following procedure: 400.0 grams of the previously described material were charged to a reaction flask equipped with an overhead stirrer, nitrogen inlet, thermocouple, addition funnel, and condenser. The temperature was increased to 90° C. under nitrogen blanket, at which time 111.8, grams hexamethyldisilazane were added drop-wise over a 40 minute period. After one additional hour, the temperature was increased to 110° C. and held for one hour. The reaction was considered complete when the size of the IR peak corresponding to the hydroxyl moiety was negligible. The resin solids content was 91.2% solid.

Silylated Compound F

This example illustrates the preparation of a silylated compound that is a half acid ester of methyl hexahydrophthalic anhydride and pentaerythritol with residual carboxyl groups reacted with propylene oxide.

A reaction vessel equipped with stirrer, thermocouple, temperature control, pumps and fit with valved ports was charged with 2472.4 grams methyl hexahydrophthalic anhydride, 510.6 grams pentaerythritol (commercially available from Hoechst-Celanese), 7.7 grams of triphenyl phosphine (Aldrich®), 6.5 grams of triisooctyl phosphite, and 426.3 grams of n-butyl acetate. The reaction was heated to 115° C. and held 4 hours. Then 854.1 grams of propylene oxide was charged over 1 hour. The reaction was held 3 to 5 hours until acid value was less than 8.76 mg KOH/gram. Residual propylene oxide was removed by vacuum distilling at 60 to 80 mm Hg at 100 to 115° C. The resultant product had a total solids content of 95.8%.

The product was silylated by the following procedure: 700.0 grams of the previously described material were charged to a reaction flask equipped with an overhead stirrer, nitrogen inlet, thermocouple, addition funnel, and condenser. The temperature was increased to 90° C. under blanket, at which time 207.84 grams hexamethyldisilazane were added drop-wise over a 30 minute period. The reaction was allowed to continue one additional hour. At this time the temperature was increased to 110° C. for one hour. The product was cooled to room temperature and thinned with 50 grams t-butyl acetate. The resin solids were 93.5%.

Silylated Compound G

This example illustrates the preparation of a silylated compound that is a half acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 1977.9 grams methyl hexahydrophthalic anhydride, 536.0 grams trimethylolpropane, 6.4 grams of triphenyl phosphine, 5.4 grams of triisooctyl phosphite, and 168.9 grams of t-butyl acetate. The reaction was heated to 115° C. and held 4 hours. Charged to the reactor was 683.3 grams of propylene oxide over 1 hour. The reaction was held 3 to 5 hours until the acid value reached 1.71 mg KOH/gram. Residual propylene oxide was removed by vacuum distilling at 60 to 80 mm Hg at 75° C. The resultant product had a total solids content of 94.2%.

This product was 80% silylated (80% of the hydroxyl groups were converted to silyl ether groups) by the following procedure: 500.0 grams of the previously described material were charged to a reaction flask equipped with an overhead stirrer, nitrogen inlet, thermocouple, addition funnel, and condenser. The temperature was increased to 90° C. under nitrogen blanket, at which time 112.27 grams hexamethyldisilazane were added drop-wise over a 45 minute period. The reaction was allowed to continue one additional hour, at which time the temperature was increased to 110° C. and allowed to continue for one hour. The material was thinned with 50.0 grams t-butyl acetate. Resin solids were 91%.

Compound H

This example illustrates the preparation of a compound that is a half acid ester of methyl hexahydrophthalic anhydride and trimethylolpropane with residual carboxyl groups reacted with propylene oxide.

A reaction vessel equipped with stirrer, thermocouple, temperature control, pumps and fitted with valved ports was charged with 2029.6 grams methyl hexahydrophthalic anhydride, 550.0 grams trimethylolpropane, 6.6 grams of triphenyl phosphine, 5.59 grams of triisooctyl phosphite, and 205.73 grams of t-butyl acetate. The reaction was heated to 115° C. and held 4 hours. Charged to the reactor was 769.89 grams of propylene oxide over 1 hour. The reaction was held 3 to 5 hours until the acid value was less than 5.00 mg KOH/gram. Residual propylene oxide was removed by vacuum distilling at 60 to 80 mm Hg at 70° C. The resultant product was diluted with t-butyl acetate to a total solids of 80.8%.

Silylated Compound I

This example illustrates the preparation of a silylated compound that is a half acid ester of methyl hexahydrophthalic anhydride and trimethylolpropane with the residual carboxyl groups reacted with ethylene oxide.

A reaction vessel equipped with stirrer, thermocouple, temperature control, pumps, and fit with valved ports was charged with 1977.0 grams of methyl hexahydrophthalic anhydride, 536.0 grams trimethylolpropane, 6.4 grams triphenyl phosphine, 5.4 grams triisooctyl phosphite, and 152.1 grams of t-butyl acetate. The reaction was heated to 115° C. and held for 4 hours. 518.0 grams of ethylene oxide (commercially available from Scott Specialty Gases) was added over 1 hour. The reaction was held at 115° C. for 3 to 5 hours until acid value was 12.0 mg KOH/gram. Any residual ethylene oxide was removed by vacuum distilling at 60 to 80 mm Hg at 115° C. The resulting product had a total solids content of 98.8%.

This product was silylated by the following procedure: 500.0 grams of the previously described material were charged to a reaction flask equipped with an overhead stirrer, nitrogen inlet, thermocouple, addition funnel, and condenser. The temperature was increased to 90° C. under nitrogen blanket, at which time 155.1 grams hexamethyldisilazane were added drop-wise over a 1 hour, 5 minute period. After one hour, the reaction temperature was increased to 110° C. and held for an additional hour. The reaction was considered complete when the size of the IR peak corresponding to the hydroxyl moiety was negligible. The reaction was cooled to room temperature and diluted with 50 grams t-butyl acetate. The resin solids were 91.0%.

Silylated Compound J

This example illustrates the preparation of a silylated compound that is a half acid ester of methyl hexahydrophthalic anhydride and trimethylolpropane with the residual carboxyl groups reacted with CARDURA E (glycidyl ester of a branched C10 saturated carboxylic acid, available from Shell Chemical Co.).

A triol was prepared from the following ingredients:

| Chemical | Amount in grams |
| --- | --- |
| trimethylolpropane | 268.4 |
| n-butyl acetate | 240.6 |
| triphenyl phosphite | 5.4 |
| methyl hexahydrophthalic anhydride | 987.8 |
| triphenyl phosphite | 2.7 |
| CARDURA E[1] | 1470.0 |

[1]Glycidyl ester of a branched C10 saturated carboxylic acid, available from Shell Chemical Co.

The first three ingredients were charged to a suitable reactor equipped with an stirrer, thermocouple and $N_2$ inlet and heated to 115° C. under a nitrogen blanket. Methyl hexahydrophthalic anhydride was added to the reactor over a period of 2 hours while maintaining a temperature between 115 and 120° C. After the addition was complete, the reaction mixture was held at 115° C. until the anhydride was judged to be gone by infrared spectroscopy. Triphenyl phosphite was added to the reactor; CARDURA E was then added to the reactor over 4 hours while maintaining a temperature between 115 and 120° C. The reaction mixture was held at 116° C. to a measured acid value of 6.8. The resulting resin had a viscosity (Gardner-Holt bubble tube) of Z8, a measured solids (110° C., 1 hr) of 89.8 percent, a number average molecular weight of 1195, a weight average molecular weight of 1295, and a polydispersity of 1.07 as determined by gel permeation chromatography vs. a polystyrene standard.

The triol was silylated according to the following procedure:

| Chemical | Amount in grams |
| --- | --- |
| Triol | 643.5 |
| hexamethyldisilazane (Aldrich ®) | 209.3 |
| xylene | 120.9 |

The triol was charged to a suitable reactor equipped with a stirrer, thermocouple and $N_2$ inlet and heated to 110° C. under an $N_2$ blanket. The solvent was stripped out of the reaction mixture under reduced pressure. The reaction was then cooled to 60° C. and hexamethyidisilazane was added to the reaction mixture drop-wise. A foamy reaction ensued; the reaction mixture was cooled with an ice bath to 15° C. and the addition of hexamethyidisilazane continued until complete. The reaction was held until the hydroxyl groups were judged to be gone by infrared spectroscopy. Excess hexamethyidisilazane was stripped from the reaction mixture under reduced pressure, starting initially at 18° C. and ending at a maximum temperature of 90° C. The reaction mixture was then allowed to cool to ambient temperature and thinned with xylene. The resulting resin had a viscosity (Gardner-Holt bubble tube) of G, a number average molecular weight of 1488, a weight average molecular weight of 1568, and a polydispersity of 1.05 as determined by gel permeation chromatography vs. a polystyrene standard. Resin solids were 85.0%.

Silylated Compound K

This example illustrates the preparation a silylated acrylic.

Into a reaction flask equipped with an overhead stirrer, nitrogen inlet, thermocouple, addition funnel, and condenser was placed 1407.0 grams of hydroxyl functional acrylic consisting of 40% hydroxypropyl acrylate/20% styrene/ 18.5% butyl methacrylate/19% butyl acrylate/0.5% methyl methacrylate/2% acrylic acid and having a solid equivalent weight of 325. The temperature was increased to 115° C. and as much residual solvent as possible was vacuum stripped. The temperature was then reduced to 90° C. at which time 58.0 grams hexamethyldisilazane were added drop-wise over a 20 minute period. The reaction was allowed to continue one additional hour. The reaction was considered complete when the size of the IR peak corresponding to the hydroxyl moiety was negligible. The resin solids were 90%.

Compound L

A hydroxyl functional branched polyester was prepared from the following ingredients:

| Chemical | Amount in grams |
| --- | --- |
| Trimethylolpropane | 321.6 |
| Methyl hexahydrophthalic anhydride | 1189.4 |
| ESTERDIOL 204[1] | 1473.7 |
| Butyl stannoic acid | 4.5 |
| Triphenyl phosphite | 3.0 |

[1]2,2-dimethyl-3-hydroxypropyl-2,2-dimethyl-3-hydroxypropanoate, available from Union Carbide Chemicals and Plastics Co., Inc.

Trimethylolpropane, methyl hexahydrophthalic anhydride, ESTERDIOL 204, butyl stannoic acid, and triphenyl phosphite were charged to a suitable reactor equipped with a stirrer, thermocouple and nitrogen inlet and heated to 80° C. under an $N_2$ blanket. At 80° C. the nitrogen blanket was converted to a nitrogen sparge; and the reaction mixture was held at this temperature and sparged with nitrogen for 20 minutes. The temperature of the reaction mixture was then raised to 210° C. with removal of 130 ml of $H_2O$ from the reactor and held at this temperature to a measured acid value of 4.3. The resinous product was cooled to <100° C. and reduced with n-butyl acetate. The resulting resin has a viscosity (Gardner-Holt bubble tube) of T-U, a measured solids (110° C., 1 hr) of 73.0%, a number average molecular weight of 1185, a weight average molecular weight of 2942, and a polydispersity of 2.50 as determined by gel permeation chromatography vs. a polystyrene standard.

Silylated Compound M

The hydroxyl functional branched polyester was silylated by the following procedure: 2000.0 grams of the hydroxyl functional branched polyester were charged to a reaction flask equipped with an overhead stirrer, nitrogen inlet, thermocouple, addition funnel, and condenser. The temperature was increased to 90° C. under a nitrogen blanket, at which time 282.3 grams of hexamethyldisilazane were added drop-wise over a 1 hr 15 minute period. The reaction was held an additional two hours. The reaction was considered complete when the IR peak due to the hydroxyl moiety was negligible. Resin solids were 74.1%.

Silylated Compound N

This example illustrates the preparation and silylation of an adduct of methyl hexahydrophthalic anhydride and trimethylolpropane with theoretically one hydroxyl group reacted with DESMODUR W (4,4'-methylenebis (cyclohexyl isocyanate), available from Bayer USA) with the residual carboxyl groups reacted with propylene oxide.

A low molecular weight urethane with terminal acid functionality was prepared according to the following procedure:

| Chemical | Amount in grams |
| --- | --- |
| n-butyl acetate | 1125.0 |
| trimethylolpropane | 603.1 |
| methyl hexahydrophthalic anhydride | 1512.0 |
| dibutyltin dilaurate | 1.3 |
| DESMODUR W[1] | 571.8 |

[1]4,4'-methylenebis(cyclohexyl isocyanate), available from Bayer USA.

Butyl acetate and trimethylolpropane were charged to a suitable reactor equipped with a stirrer, thermocouple and $N_2$ inlet and heated to 110° C. under an $N_2$ blanket. Methyl hexahydrophthalic anhydride was added to the reactor over a period of 2 hours while maintaining a temperature between 110 and 120° C. After the addition was complete, the reaction mixture was held at 110° C. until the anhydride was judged to be gone by infrared spectroscopy. The reaction mixture was cooled to 70° C.; dibutyltin dilaurate (commercially available from Air Products and Chemicals, Inc.) was then added to the reactor. DESMODUR W was added to the reaction mixture at a rate such that the reaction temperature was controlled between 70 and 80° C. The reaction was held at 70° C. until infrared spectroscopy showed that all the isocyanate was consumed. The product was then cooled and poured out. The resulting resin had a viscosity (Gardner-Holt bubble tube) of >Z5, a measured solids (110° C., 1 hour) of 74.6%, a number average molecular weight of 598, a weight average molecular weight of 1358, and a polydispersity of 2.30 as determined by gel permeation chromatography versus a polystyrene standard.

A reaction vessel equipped with stirrer, thermocouple, temperature control, pumps and fitted with valved ports was charged with 3000 grams of urethane with terminal acid functionality as described above, 3.0 grams of triphenyl phosphine, 3.4 grams of triisooctyl phosphite. This mixture was heated to 115° C. Charged to the reaction was 319.2 grams of propylene oxide over 1 hour. Hold 3 to 5 hour until acid value is less than 13.7 mg KOH/gram. Residual propylene oxide was removed by vacuum distilling at 60 to 80 mm Hg 10 at 85° C. The resultant product had a weight average molecular weight of 2200 Daltons, and solids of 86.2%.

This product was silylated by the following procedure: 1784.0 grams of the previously described material were charged to a reaction flask equipped with an overhead stirrer, nitrogen inlet, thermocouple, addition funnel, and condenser. The temperature was increased to 90° C. under nitrogen blanket, at which time 345.1 grams hexamethyldisilazane were added drop-wise over a one hour, 45 minute period. The reaction was allowed to continue for one hour, at which time a nitrogen sparge was introduced. After one additional hour, the temperature was increased to 110° C. After 30 minutes, the temperature was decreased to 100° C. and 30.0 g additional hexamethyidisilazane were added over a 10 minute period. The temperature was increased to 110° C. and held for two hours. The reaction was cooled and reduced with 250 grams t-butyl acetate. The product had a final hydroxyl value of 14.8 mg KOH/gram and resin solids of 78.8%.

Silylated Compound O

This example illustrates the preparation of a silylated that is a half acid ester of methyl hexahydrophthalic anhydride and 2-ethyl-1,3-hexanediol with residual carboxyl groups reacted with propylene oxide.

A reaction vessel equipped with stirrer, thermocouple, temperature control, pumps and fit with valved ports is charged with 1977.9 grams methyl hexahydrophthalic anhydride, 877.3 grams 2-ethyl-1,3-hexanediol (commercially available from Huls, Inc.), 6.4 grams of triphenyl phosphine, 5.4 grams of triisooctyl phosphite, and 394.4 grams of n-butyl acetate. Heat to 115° C. and hold 4 hours or until anhydride is infinite by IR spectroscopy. Charge 683.3 grams of propylene oxide over 1 hour. Hold 3 to 5 hours until acid value is less than 5.6 mg KOH/gram. Remove residual propylene oxide by vacuum distilling at 60 to 80 mm Hg at 100 to 115° C. The resultant product had a total solids content of 94.4% and a weight average molecular weight of 650 Daltons.

This product was silylated by the following procedure: 1500.0 grams of the previously described material were charged to a reaction flask equipped with an overhead stirrer, nitrogen inlet, thermocouple, addition funnel, and condenser, the temperature was increased to 90° C. under nitrogen blanket, at which time 381.1 grams hexamethyldisilazane were added drop-wise over a 1 hour, 25 minute period. The reaction was held at 90° C. for an additional hour. The reaction was considered complete when the size of the IR peak corresponding to the hydroxyl moiety was negligible. The resin solids were 95.4%.

Silylated Compound P

This example illustrates the preparation of a silylated that is a half acid ester of methyl hexahydrophthalic anhydride and 2-ethyl-1,3-hexanediol with residual carboxyl groups reacted with 1,4-butanediol diglycidyl ether.

A low molecular weight polyol was prepared according to the following procedure:

| Chemical | Amount in grams |
| --- | --- |
| 2-ethyl-1,3-hexanediol | 346.8 |
| methyl hexahydrophthalic anhydride | 399.0 |
| 1,4-butanediol diglycidyl ether | 240.2 |
| triphenyl phosphine | 4.9 |
| n-butyl acetate | 166.3 |

2-ethyl-1,3-hexanediol was charged to a suitable reactor equipped with a stirrer, thermocouple and nitrogen inlet and heated to 110° C. under an $N_2$ blanket. Methyl hexahydrophthalic anhydride was added to the reaction mixture over a period of 96 minutes; the reaction was then held until the anhydride was judged to be gone by infrared spectroscopy. A mixture of 1,4-butanediol diglycidyl ether and triphenyl phosphine was then added to the reaction mixture over a period of 26 minutes; the reaction was then held until the acid value stalled (34.2). A measurement of the epoxy equivalent weight at this point indicated that most of the epoxy groups had been consumed (epoxy equivalent weight of 28879). The resinous product was reduced with butyl acetate. The resulting resin has a viscosity (Gardner-Holt bubble tube) of Z1, a measured solids (110° C., 1 hr) of 78.0 percent, a number average molecular weight of 787, a weight average molecular weight of 1470, and a polydispersity of 1.90 as determined by gel permeation chromatography vs. a polystyrene standard.

The above product was silylated by the following procedure: 150.0 grams of the previously described material were charged to a reaction flask equipped with an overhead stirrer, nitrogen inlet, thermocouple, addition funnel, and condenser. The temperature was increased to 90° C. under a nitrogen blanket, at which time 27.0 grams of hexamethyldisilazane were added drop-wise over a 15 minute period. The reaction was held an additional two hours at which time a nitrogen sparge was introduced. An additional 3 grams of hexamethyldisilazane were added and the reaction was held two hours. The reaction was considered complete when the IR peak due to the hydroxyl moiety was significantly reduced. Resin solids were 80.5%.

Silylated Compound Q

A low molecular weight polyol was prepared according to the following procedure:

| Chemical | Amount in grams |
| --- | --- |
| dimethyl azelate | 260.0 |
| 1,4-butanediol | 216.0 |
| zinc acetate dihydrate | 5.7 |

The above three ingredients were charged to a reactor equipped with a mechanical stirrer, Dean-Stark trap, dry ice condenser, thermocouple, and nitrogen sparge line and heated to 130° C. under ambient atmospheric conditions. The temperature was raised in 5 degree increments to 170° C. over 3 hours. After the three hours were complete, the temperature of the system was raised to 200° C. Nitrogen gas was slowly bubbled through the sparge tube to aid removal of methanol from the flask. The reaction was held for 1 additional hour, by which point 75.5 grams methanol (77 grams theory) had been collected. The reaction mixture was then cooled and poured. The resulting material after cooling to ambient temperature was a soft, white waxy solid with a number average molecular weight of 864, a weight average molecular weight of 1251, and a polydispersity of 1.4 as determined by gel permeation chromatography vs. a polystyrene standard.

Into a round bottom flask equipped with an overhead stirrer, nitrogen inlet, nitrogen outlet with drying tube, thermocouple, addition funnel, and condenser was placed 362.1 grams of the above material. The temperature was increased to 90° C. at which time 59.0 grams of hexamethyldisilazane was added over 40 minutes 25 grams of solvent were added and the reaction temperature was increased to reflux for 2 hours. 29.5 grams of hexamethyldisilazane were added and the reaction temperature was increased to 115° C. for 2 hours. The temperature was then increased to 125° C. for 1.5 hours. The reaction was cooled to room temperature. The final hydroxyl value was 205.9 and resin solids were approximately 91%.

Composition Pre-Mixtures

The following pre-mixtures of selected components of the coating compositions discussed below were prepared by sequentially mixing each of the components with agitation.

| | Pre Mix A: | |
| --- | --- | --- |
| Ingredient | Parts by weight (grams) | Solid weights (grams) |
| SOLVESSO 100[1] | 5.0 | — |
| Butyl Cellosolve ® acetate[2] | 5.0 | — |
| Methyl n-amyl ketone | 3.0 | — |
| TINUVIN ® 928[3] | 3.0 | 3.0 |
| Polybutyl acrylate[4] | 0.7 | 0.4 |

Pre Mix A:

| Ingredient | Parts by weight (grams) | Solid weights (grams) |
|---|---|---|
| TINUVIN ® 292[5] | 0.4 | 0.4 |
| TINUVIN ® 123[6] | 0.6 | 0.6 |
| Multiflow[7] | 0.6 | 0.3 |
| DDBSA[8] | 1.4 | 1.0 |

[1]Aromatic solvent, 100 type, available from Exxon Chemicals America.
[2]2-Butoxyethyl acetate solvent is commercially available from Union Carbide Corp.
[3]2-(2H-Benzotriazol-2yl)-6-(1-methyl-1-phenylethyl)-4-(1,1,3,3-tetramethylbutyl)phenol UV absorber available from Ciba Specialty Chemicals Corp.
[4]A flow control agent having a Mw of 6700 and a Mn of 2600 made in xylene at 60% solids available from DuPont.
[5]Sterically hindered amine light stabilizer commercially available from Ciba Specialty Chemicals Corp.
[6]Bis-(1-octyloxy-2,2,6,6-tetramethyl-4-piperidinyl) sebacate hindered aminoether light stabilizer available from Ciba Specialty Chemicals Corp.
[7]50% solution of MODAFLOW ®, available from Solutia Inc., supplied in xylene. MODAFLOW ® is a polymer made of 75% by weight 2-ethyl hexyl acrylate, 25% by weight ethyl acrylate with a number average molecular weight of 7934.
[8]Dodecyl benzene sulfonic acid solution, 70% solid in isopropanol, available from Chemcentral.

Pre Mix B:

| Ingredient | Parts by weight (grams) | Solid weights (grams) |
|---|---|---|
| CYMEL ® 1130[1] | 75.0 | 75.0 |
| RESIMENE ® 741[2] | 28.4 | 25.0 |

[1]Methylated and butylated melamine-formaldehyde resin available from Cytec Industries, Inc.
[2]Methylated melamine-formaldehyde resin available from Solutia Inc.

The pre-mixtures of ingredients from Pre-Mixes A and B were used in Coating Compositions 13–32. The components for forming Coating Compositions 13–32 are listed below in Tables 6–10. The amounts listed are the total parts by weight in grams and the amount within parenthesis are percentages by weight based on weight of resin solids. Each component was mixed sequentially with agitation.

TABLE 6

| | COATING COMPOSITION NO. | | | | |
|---|---|---|---|---|---|
| Ingredient | 13 | 14 | 15 | 16 | 17 |
| Pre-mix A | 19.7 (5.7) | 19.7 (5.7) | 19.7 (5.7) | 19.7 (5.7) | 19.7 (5.7) |
| Pre-mix B | 41.2 (39.8) | 41.2 (39.8) | 41.2 (39.8) | 42.2 (40.8) | 42.0 (40.6) |
| Silylated Compound C | 62.8 (60.2) | — | 56.4 (54.1) | — | — |
| Silylated Compound D | — | 63.4 (60.2) | — | — | — |
| Silylated Compound E | — | — | — | 64.9 (59.2) | — |
| Silylated Compound F | — | — | — | — | 63.5 (59.4) |
| Black tint paste[1] | — | — | 17.5 (6.1) | — | — |
| Reduction Information: | | | | | |
| SOLVESSO 100[2] | 4.6 | 4.6 | 3.0 | 4.4 | 5.9 |
| Butyl Cellosolve ® acetate[3] | 4.6 | 4.6 | 3.0 | 4.4 | 5.9 |
| Spray viscosity[4] (sec) | 56 | 55 | 45 | 52 | 47 |
| Paint temperature (° F.) | 74 | 73 | 73 | 72 | 73 |
| 230° F. (110° C.) % Solids[5] | 70 | 61 | 65 | 68 | 67 |

[1]Black pigment available from Cabot Corp. as MONARCH BLACK 1300 dispersed in a 56.0:44.0 blend of acrylic grind vehicle (29.5% styrene, 19.7% 2-ethylhexyl acrylate, 19.2% n-butyl methacrylate, 17.7% methyl methacrylate, 9.8% hydroxyethyl acrylate, 1.9% methacrylic acid, 1.3% t-dodecyl mercaptan, 0.5% glacial acetic acid, 0.4% propylene imine) and polyester (65% trimethyl pentanediol, 35% hexahydrophthalic anhydride) at a total pigment to binder ratio (P?B) of 0.18.x
[2]Aromatic solvent, 100 type, available from Exxon Chemicals America.
[3]2-Butoxyethyl acetate solvent is commercially available from Union Carbide Corp.
[4]Viscosity measured as described in Example 1 above.
[5]% Solids of a coating is determined as described in Example 1 above.

TABLE 7

| | COATING COMPOSITION NO. | | | |
|---|---|---|---|---|
| Ingredient | 18 | 19 | 20 | 21 |
| Pre-mix A | 19.7 (5.7) | 19.7 (5.7) | 19.7 (5.7) | 19.7 (5.7) |
| Pre-mix B | 43.7 (42.3) | 43.9 (42.5) | 42.2 (40.8) | 31.7 (30.7) |
| Silylated Compound C | — | 33.5 (32.1) | — | — |
| Silylated Compound G | 63.4 (57.7) | — | — | — |
| Compound H | — | 31.8 (25.4) | — | — |
| Silylated Compound I | — | — | 65.1 (59.2) | — |
| Silylated Compound J | — | — | — | 81.5 (69.3) |

TABLE 7-continued

| | COATING COMPOSITION NO. | | | |
|---|---|---|---|---|
| Ingredient | 18 | 19 | 20 | 21 |
| Reduction Information: | | | | |
| SOLVESSO 100[1] | 4.9 | 5.8 | 4.2 | 0.0 |
| Butyl Cellosolve ® acetate[2] | 4.9 | 5.8 | 4.2 | 0.0 |
| Spray viscosity[3] (sec) | 57 | 54 | 54 | 47 |
| Paint temperature (° F.) | 73 | 73. | 74 | 73 |
| 230° F. (110° C.) % Solids[4] | 69 | 69 | 68 | 71 |

[1]See Table 6 above.
[2]See Table 6 above.
[3]See Table 6 above.
[4]See Table 6 above.

TABLE 8

| Ingredient | 22 | 23 | 24 | 25 |
|---|---|---|---|---|
| Pre-mix A | 19.7 (5.7) | 19.7 (5.7) | 19.7 (5.7) | 19.7 (5.7) |
| Pre-mix B | 39.3 (38.0) | 41.8 (40.4) | 37.0 (35.8) | 39.2 (37.9) |
| Silylated Compound C | 29.9 (28.7) | 31.9 (30.6) | 28.3 (27.1) | 29.9 (28.7) |
| Silylated Compound K | 37.0 (33.3) | — | — | — |
| Acrylic[1] | — | 41.4 (29.0) | — | — |
| Compound L | — | — | — | 45.8 (33.4) |
| Silylated Compound M | — | — | 50.1 (37.1) | — |
| Reduction Information: | | | | |
| SOLVESSO 100[2] | 6.4 | 8.4 | 2.8 | 4.0 |
| Butyl Cellosolve ® acetate[3] | 6.4 | 8.4 | 2.8 | 4.0 |
| Spray viscosity[4] (sec) | 54 | 56 | 48 | 59 |
| Paint temperature (° F.) | 74 | 73 | 73 | 73 |
| 230° F. (110° C.) % Solids[5] | 67 | 63 | 66 | 67 |

[1]Hydroxyl functional acrylic consisting of 40% hydroxypropyl acrylate / 20% styrene / 18.5% butyl methacrylate / 19% butyl acrylate / 0.5% methyl methacrylate / 2% acrylic acid and having a solid equivalent weight of 325.
[2]See Table 6 above.
[3]See Table 6 above.
[4]See Table 6 above.
[5]See Table 6 above.

TABLE 9

| Ingredient | 26 | 27 | 28 |
|---|---|---|---|
| Pre-mix A | 19.7 (5.7) | 19.7 (5.7) | 19.7 (5.7) |
| Pre-mix B | 20.6 (19.9) | — | — |
| Silylated Compound C | 69.3 (66.4) | 52.4 (50.2) | 66.6 (63.8) |
| CYLINK ® 2000[1] | 26.6 (13.7) | — | — |
| VESTANAT B1358A[2] | — | 79.0 (49.8) | — |
| DESMODUR N-3390[3] | — | — | 40.2 (36.2) |
| DBTDL[4] | — | 0.5 | 0.05 |
| Reduction Information: | | | |
| SOLVESSO 100[5] | 0.6 | 7.7 | 1.0 |
| Butyl Cellosolve ® acetate[6] | 0.6 | 7.7 | 1.0 |
| Spray viscosity[7] (sec) | 56 | 58 | 60 |
| Paint temperature (° F.) | 73 | 73 | 72 |
| 230° F. (110° C.) % Solids[8] | 67 | 58 | 75 |

[1]Tris (alkylcarbamoyl) triazine available from CYTEC Industries, Inc. The alkyl substituent was mixed methyl and butyl.
[2]Methyl ethyl ketoxime blocked isophorone diisocyanate isocyanurate available from Hüls, Inc.
[3]Isocyanurate of hexamethylene diisocyanate, available from Bayer USA.
[4]Dibutyl tin dilaurate available as METACURE ® T-12 from Air Products & Chemicals, Inc.
[5]See Table 6 above.
[6]See Table 6 above.
[7]See Table 6 above.
[8]See Table 6 above.

TABLE 10

| Ingredient | 29 | 30 | 31 | 32 |
|---|---|---|---|---|
| Pre-mix A | 19.7 (5.7) | 19.7 (5.7) | 19.7 (5.7) | 19.7 (5.7) |
| Pre-mix B | 35.7 (34.5) | 39.2 (37.9) | 32.3 (31.2) | 34.7 (33.6) |
| Silylated Compound N | 83.1 (65.5) | — | — | — |
| Silylated Compound O | — | 65.1 (62.1) | — | — |

TABLE 10-continued

| Ingredient | 29 | 30 | 31 | 32 |
|---|---|---|---|---|
| Silylated Compound P | — | — | 77.8 (62.6) | — |
| Silylated Compound Q | — | — | — | 73.0 (66.4) |
| Reduction Information: | | | | |
| SOLVESSO 100[1] | 7.5 | 2.5 | 8.3 | 0.0 |
| Butyl Cellosolve ® acetate[2] | 7.5 | 2.5 | 8.3 | 0.0 |
| Spray viscosity[3] (sec) | 60 | 56 | 60 | 35 |
| Paint temperature (° F.) | 72 | 71 | 72 | 73 |
| 230° F. (110° C.) % Solids[4] | 61 | 71 | 63 | 76 |

[1]See Table 6 above.
[2]See Table 6 above.
[3]See Table 6 above.
[4]See Table 6 above.

TESTING

Coating Compositions 13 and 16–32 were spray applied over a pigmented basecoat to form color-plus-clear composite coatings over primed electrocoated steel panels. Coating Composition 14 was spray applied to a pigmented basecoat to form a color-plus-clear composite coating over electrocoated only steel panels. Coating Composition 15 was sprayed directly over primed electrocoated steel panels to form a pigmented monocoat.

The panels used for Coating Compositions 13 and 16–17, 20–21 and 24–32 were cold rolled steel panels (4"×12" (10.16 cm×30.48 cm)) coated with ED5100 electrocoat available from PPG Industries, Inc. Test panels are and PCV70100M primer, both available from PPG Industries, Inc. The test panels are available as APR30471 from ACT Laboratories, Inc. of Hillsdale, Mich. The panels used for Coating Composition 14 were cold rolled steel panels (size 4 inches×12 inches (10.16 cm by 30.48 cm)) coated with ED5000 electrocoat, available as APR22986 from ACT Laboratories, Inc. of Hillsdale, Mich. The panels for Examples 15, 18, 19, 22, and 23 were cold rolled steel (size 4 inches×12 inches (10.16 cm by 30.48 cm)) coated with ED5250 electrocoat and FCP6744 primer, both available from PPG Industries, Inc. The ED5250 test panels are available from ACT Laboratories, Inc.

The basecoat for Examples 13, and 16–32 is available from PPG Industries, Inc. as DCT6373, a black pigmented solvent-based acrylic/melamine basecoat. The basecoat for Example 14 is DWBH9939, a black pigmented water-based acrylic/melamine basecoat, available from PPG Industries, Inc. Basecoats were spray applied in two coats to either electrocoated only steel or electrocoated and primed steel panels as specified above at ambient temperature (70° F. (21° C.)). No flash was given between the two basecoat applications. For DCT6373 basecoat (Examples 13 and 16–32) the dry film thickness was 0.6 to 0.8 mils (15 to 20 micrometers). The dry film thickness for DWBH9939 (Example 14) basecoat was 0.55 to 0.7 mils (14 to 18 micrometers). After the second basecoat application, an un-timed air flash at ambient temperature was given before force flashing the basecoated panels. For examples 13 and 16–32, the basecoated panels were forced flashed for five minutes at 200° F. (93° C.). The basecoated panels for Example 14 were force flashed ten minutes at 200° F. (93° C.).

The clear coating compositions of Examples 13,14, and 16–32 were each applied to a basecoated panel at ambient temperature in two coats with a ninety second ambient flash between applications. Dry film thickness target was 1.5 to 2.0 mils (38 to 51 micrometers). Example 15 was applied to electrocoated and primed steel panels in two coats with a ninety second ambient flash between applications. Example 15 had a 1.6 to 1.8 mils (41 to 46 micrometers) dry film thickness. All coatings, except Examples 14 and 26, were allowed to air flash at ambient temperature for ten minutes. Example 14 was allowed to air flash for seven minutes at ambient temperature. Example 26 was allowed to air flash at ambient temperature for ten minutes and then it was force flashed for ten minutes at 140° F. (60° C.). Panels prepared from each coating were baked for twenty-five minutes at 285° F. (141° C.) to fully cure the coating(s). The panels were baked in a horizontal position. Properties for the coatings are reported below in Table 11.

TABLE 11

| Example # | 20° Gloss[1] | Knoop Hardness[2] | Xylene Spot/ Pencil Hardness[3] | Crosshatch Adhesion[4] |
|---|---|---|---|---|
| 13 | 89 | 14.4 | 2B | 5 |
| 14 | 90 | 14.9 | 2B | 5 |
| 15 | 89 | 12.7 | 3B | 5 |
| 16 | 91 | 16.4 | 2B | 5 |
| 17 | 90 | 15.2 | 2B | 5 |
| 18 | 90 | 14.3 | 3B | 5 |
| 19 | 89 | 14.3 | 3B | 5 |
| 20 | 90 | 13.8 | 2B | 5 |
| 21 | 85 | <2.0 | <6B | 5 |
| 22 | 89 | 14.4 | 3B | 5 |
| 23 | 91 | 12.6 | 3B | 5 |
| 24 | 88 | 15.3 | 2B | 5 |
| 25 | 89 | 15.8 | 2B | 5 |
| 26 | 88 | 16.2 | B | 5 |
| 27 | 83 | 17.3 | B | 5 |
| 28 | 83 | 15.6 | 2B | 5 |
| 29 | 88 | 17.4 | 2B | 5 |
| 30 | 89 | 13.8 | 2B | 5 |
| 31 | 87 | 12.9 | 2B | 5 |
| 32 | 57 | <2.0 | <6B | 5 |

[1]See Example 1 above.
[2]Knoop hardness is a hardness measurement derived from the size of an indentation in the coating made using the Tukon Microhardness Instrument. The Tukon Microhardness Instrument makes an indentation in a cured coating by applying a 25 gram load to the surface with a diamond tip. The size of the indentation is measured using a microscope. That indentation size is then converted to the Knoop Hardness measurement. The Tukon Microhardness Instrument used was the Tukon Microhardness Tester Model 300 manufactured by Wilson Instruments, Division of Instron Corporation.

TABLE 11-continued

| Example # | 20° Gloss[1] | Knoop Hardness[2] | Xylene Spot/ Pencil Hardness[3] | Crosshatch Adhesion[4] |
|---|---|---|---|---|

[3]Xylene spot/pencil hardness test measures the gouge hardness of a cured coating after an organic solvent has been placed on the coating for a specified amount of time. In this test the solvent used was xylene and it was left on the panel for three minutes. After the spot of xylene was wiped off, a pencil hardness test was run to determine the gouge hardness of the coating. Gouge hardness is defined as the hardest pencil (from a range of a soft 6B to a hard 6H pencil or drawing lead) that will leave the film uncut.
[4]Crosshatch adhesion tests the adhesion of the clearcoat to the steel/ electrodeposition/ primer/ basecoat combined substrate. An eleven-blade claw with 1.5 mm spaced teeth (blade and handle/blade holder are available from Paul N. Gardner Company, Inc.) was used to scribe the cured coating. Two sets of scribes were made by scribing the second set on top of and perpendicular to the first set. Detached flakes and ribbons of coating were wiped off the panel and strapping tape (3M #898 available from Minnesota, Mining and Manufacturing Co. - 3M) was smoothed firmly over the crosshatch marking. Within 90 seconds of application, the tape was removed in one continuous motion directed toward the tester and as parallel to the panel as possible. The scribed area was inspected and rated for removal of clearcoat to the substrate according to the following scale:
  5 = The edges of the cuts are completely smooth and none of the lattice squares is detached.
  4 = Small flakes of coating are detached at intersections. Less than five percent of the area is affected.
  3 = Small flakes of the coating are detached along edges and at intersections of cuts. The area affected is five to fifteen percent of the lattice.
  2 = The coating has flaked along the edges and on parts of the squares. The area affected is fifteen to thirty-five percent of the lattice.
  1 = The coating has flaked along the edges of cuts in large ribbons and whole squares have detached. The area affected is thirty-five to sixty-five percent of the lattice.
  0 = Flaking and detachment worse than rating 1. Over sixty-five percent of the lattice is affected.

The compositions of the present invention can provide numerous advantages in coating applications, including, but not limited to, the ability to formulate high solids, low VOC coating compositions, good initial and retained mar resistance, good appearance properties such as gloss and distinctiveness of image, good recoat adhesion and physical properties such as good flexibility and weatherability.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A coating composition formed from components comprising:
   (a) at least one hydroxyl function non-vinyl material comprising at least one alcoholic hydroxyl group blocked with a hydrolyzable silyl group, wherein the at least one hydroxyl function non-vinyl material is formed from components comprising:
      (i) at least one half-ester formed from components comprising:
         (a) at least one polyol; and
         (b) at least one anhydride; and
      (ii) at least one epoxy functional material or at least one alphatic diol; and
   (b) at least one curing agent reactive with the alcoholic hydroxyl group of the at least one hydroxyl functional non-vinyl material (a).

2. A coating composition according to claim 1, wherein the hydrolyzable silyl group has the following structure (IX):

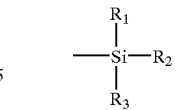
(IX)

wherein each $R_1$, $R_2$ and $R_3$, which may be identical or different, represents an alkyl group having from 1 to 18 carbon atoms, a phenyl group or an allyl group.

3. A coating composition according to claim 1, wherein compounds which can be reacted with the at least one alcoholic hydroxyl group to form the hydrolyzable silyl group are selected from hexamethyldisilazane, trimethylchlorosilane, trimethylsilyldiethylamine, t-butyl dimethylsilyl chloride, diphenyl methylsilyl chloride, hexamethyl disilylazide, trimethylsilyl triflate, hexamethyldisilyl acetamide, N,N'-bis[trimethylsilyl]-urea, hexamethyldisiloxane, ketene methyl trialkylsilyl acetals, triethylsilyl perchlorate, allylsilanes and mixtures of any of the foregoing.

4. A coating composition according to claim 3, wherein compounds which can be reacted with the at least one alcoholic hydroxyl group to form the hydrolyzable silyl group are selected from hexamethyidisilazanes.

5. A coating composition according to claim 1, wherein at least 1 mole percent of the alcoholic hydroxyl groups of the at least one hydroxyl functional non-vinyl material are blocked with hydrolyzable silyl groups.

6. A coating composition according to claim 5, wherein at least 25 mole percent of the alcoholic hydroxyl groups of the at least one hydroxyl functional non-vinyl material are blocked with hydrolyzable silyl groups.

7. A coating composition according to claim 6, wherein at least 33 mole percent of the alcoholic hydroxyl groups of the at least one hydroxyl functional non-vinyl material are blocked with hydrolyzable silyl groups.

8. A coating composition according to claim 1, wherein substantially all of the alcoholic hydroxyl groups of the at least one hydroxyl functional non-vinyl material are blocked with hydrolyzable silyl groups.

9. A coating composition according to claim 1, wherein the at least one hydroxyl functional non-vinyl material comprises less than 5 hydroxyl functional groups.

10. A coating composition according to claim 1, wherein the at least one hydroxyl functional non-vinyl material is formed from components comprising:
   (a) at least one half-ester formed from components comprising:
      (i) at least one polyol; and
      (ii) at least one anhydride; and
   (b) at least one epoxy functional material.

11. A coating composition according to claim 1, wherein the at least one polyol (a)(i) is selected from di-trimethylol propane (bis(2,2-dimethylol)dibutylether), pentaerythritol, 1,2,3,4-butanetetrol, sorbitol, trimethylolpropane, trimethylolethane, 1,2,6-hexanetriol, glycerine, trishydroxyethyl isocyanurate, dimethylol propionic acid, 1,2,4-butanetriol, TMP/epsilon-caprolactone triols, ethylene glycol, 1,2-propanediol, 1,3-propanediol, 1,4-butanediol, 1,5-pentanediol, glycol, 1,4-cyclohexanedimethanol, and 2,2,4-trimethylpentane-1,3 diol.

12. A coating composition according to claim 11, wherein the at least one polyol (a)(i) is trimethylolpropane.

13. A coating composition according to claim 1, wherein the at least one polyol (a)(i) is selected from polyester polyols and polyurethane polyols.

14. A coating composition according to claim 1, wherein the at least one anhydride (a)(ii) is selected from succinic anhydride, methylsuccinic anhydride, dodecenyl succinic anhydride, octadecenyl succinic anhydride, phthalic anhydride, tetrahydrophthalic anhydride, methyltetrahydrophthalic anhydride, hexahydrophthalic anhydride, alkyl hexahydrophthalic anhydrides, tetrachlorophthalic anhydride, endomethylene tetrahydrophthalic anhydride, chlorendic anhydride, itaconic anhydride, citraconic anhydride, and maleic anhydride.

15. A coating composition according to claim 14, wherein the alkyl exahydrophthalic anhydrides are selected from methylhexahydrophthalic anhydride.

16. A coating composition according to claim 1, wherein the equivalent ratio of acid groups of the at least one anhydride (a)(ii) to hydroxyl groups of the at least one polyol (a)(i) is at least 0.8:1.

17. A coating composition according to claim 1, wherein the at least one epoxy functional material (b) is selected from ethylene oxide, butylene oxide, propylene oxide, cyclohexene oxide, glycidyl esters, and glycidyl ethers.

18. A coating composition according to claim 1, wherein the at least one aliphatic diol (b) is selected from 1,2-propane diol, ethylene glycol, 1,2-propanediol, 1,3-propanediol, 1,4-butanediol, 1,5-pentanediol, 1,6-hexanediol, 2-ethyl-1,3-hexanediol, neopentyl glycol, diethylene glycol, dipropylene glycol, 1,4-cyclohexanedimethanol, and 2,2,4-trimethylpentane-1,3 diol.

19. A coating composition according to claim 1, wherein the ratio of epoxy groups of the at least one epoxy functional material (b) to acid groups of the at least one anhydride (a)(ii) ranges from 0.1:1 to 1.1:1.

20. A coating composition according to claim 1, wherein the ratio of epoxy groups of the at least one epoxy functional material (b) to acid groups of the at least one anhydride (a)(ii) ranges from 0.5:1 to 1:1.

21. A coating composition according to claim 1, wherein the ratio of epoxy groups of the at least one epoxy functional material (b) to acid groups of the at least one anhydride (a)(ii) ranges from 0.8:1 to 1:1.

22. A coating composition according to claim 1, wherein the at least one hydroxyl functional non-vinyl material comprises at least one compound having the following structure (X):

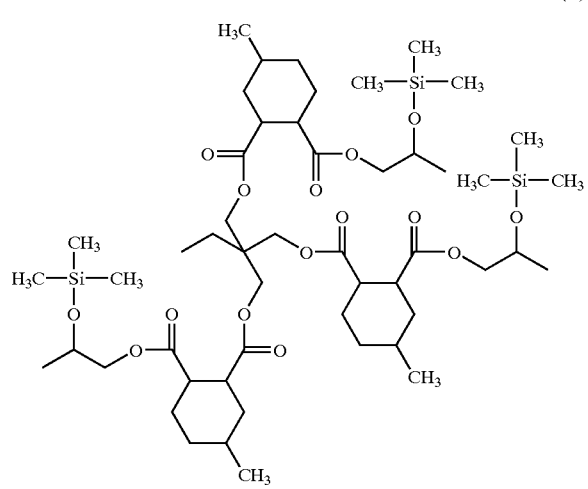

23. A coating composition according to claim 1, wherein the hydroxyl equivalent weight of the at least one hydroxyl functional non-vinyl material, prior to silylation, is at least 31 mg KOH per gram of hydroxyl functional non-vinyl material.

24. A coating composition according to claim 1, wherein the hydroxyl equivalent weight of the at least one hydroxyl functional non-vinyl material, prior to silylation, is less than 2000 mg KOH per gram of hydroxyl functional non-vinyl material.

25. A coating composition according to claim 24, wherein the hydroxyl equivalent weight of the at least one hydroxyl functional non-vinyl material, prior to silylation, is less than 1000 mg KOH per gram of hydroxyl functional non-vinyl material.

26. A coating composition according to claim 25, wherein the hydroxyl equivalent weight of the at least one hydroxyl functional non-vinyl material, prior to silylation, is less than 400 mg KOH per gram of hydroxyl functional non-vinyl material.

27. A coating composition according to claim 1, wherein the at least one hydroxyl functional non-vinyl material has a polydispersity of less than 2.

28. A coating composition according to claim 27, wherein the at least one hydroxyl functional non-vinyl material has a polydispersity of less than 1.5.

29. A coating composition according to claim 28, wherein the at least one hydroxyl functional non-vinyl material has a polydispersity of less than 1.2.

30. A coating composition according to claim 1, wherein the at least one hydroxyl non-vinyl functional material comprising at least one alcoholic hydroxyl group blocked with a hydrolyzable silyl group, when added to the other components which form the coating composition, is present in an amount of at least 1 weight percent based on total weight of the resin solids of the components from which the coating composition is formed.

31. A coating composition according to claim 1, wherein the at least one hydroxyl functional non-vinyl material comprising at least one alcoholic hydroxyl group blocked with a hydrolyzable silyl group, when added to the other components which form the coating composition, is present in an amount of less than 90 weight percent based on total weight of the resin solids of the components from which the coating composition is formed.

32. A coating composition according to claim 1, wherein the at least one hydroxyl functional non-vinyl material comprising at least one alcoholic hydroxyl group blocked with a hydrolyzable silyl group, when added to the other components that form the coating composition, is present in an amount ranging from 15 weight percent to 85 weight percent based on total weight of the resin solids of the components from which the coating composition is formed.

33. A coating composition according to claim 1, wherein the at least one curing agent is selected from aminoplast resins, polyisocyanates, blocked polyisocyanates, triazine derivatives of isocyanates, anhydrides, and polyepoxides.

34. A coating composition according to claim 1, wherein the at least one curing agent, when added to other components which form the coating composition, is present in the coating composition in an amount ranging from 5 to 95 weight percent based on total weight of the resin solids of the components from which the coating composition is formed.

35. A coating composition according to claim 1, wherein the at least one curing agent, when added to other components which form the coating composition, is present in the coating composition in an amount ranging from 15 to 50 weight percent based on total weight of the resin solids of the components from which the coating composition is formed.

36. A coating composition according to claim 1, wherein the at least one curing agent, when added to other components which form the coating composition, is present in the coating composition in an amount of at least 15 weight percent on a basis of total resin solids of the components from which the coating composition is formed.

37. A coating composition according to claim 1, wherein the components from which the coating composition is formed comprise at least one film-forming material different from component (a).

38. A coating composition according to claim 37, wherein the at least one film-forming material is selected from polyesters, polyurethanes, acrylic polymers, polyamides, and polyethers.

39. A coating composition according to claim 37, wherein the at least one film-forming material when added to the other components which form the coating composition, is present in an amount ranging from 1 weight percent to 90 weight percent based on total weight of the resin solids of the components from which the coating composition is formed.

40. A coating composition according to claim 1, wherein the components from which the coating composition is formed comprise at least one polysiloxane different from component (a).

41. A coating composition according to claim 40, wherein the at least polysiloxane different from component (a) comprises at least one of the following structural units (I):

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$.

42. A coating composition according to claim 41, wherein each $R^2$, which may be identical or different, represents a group comprising at least one reactive functional group selected from a hydroxyl group, a carboxyl group, an isocyanate group, a blocked polyisocyanate group, a primary amine group, a secondary amine group, an amide group, a carbamate group, a urea group, a urethane group, a vinyl group, an unsaturated ester group, a maleimide, group, a fumarate group, an anhydride group, a hydroxy alkylamide group, and an epoxy group.

43. A composition according to claim 40, wherein the at least one polysiloxane different from component (a) has the following structure (II) or (III):

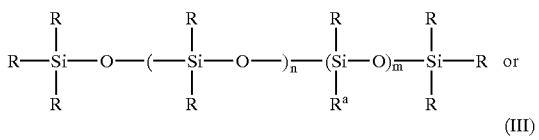

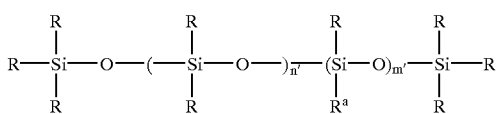

wherein:
m has a value of at least 1;
m' ranges from 0 to 75;
n ranges from 0 to 75;
n' ranges from 0 to 75;
each R, which may be identical or different, is selected from H, OH, monovalent hydrocarbon groups, monovalent siloxane groups, and mixtures of any of the foregoing; and $R^a$ comprises the following structure (IV):

wherein $R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an isocyanate group, a blocked polyisocyahate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

44. A coating composition according to claim 40, wherein the at least one polysiloxane different from component (a) is present in an amount of 1 to 90 weight percent on a basis of total resin solids of the components from which the coating composition is formed.

45. A coating composition according to claim 1, wherein the components from which the coating composition is formed comprise a plurality of particles, wherein each component is different.

46. A coating composition according to claim 45, wherein the particles are selected from inorganic particles, composite particles, and mixtures of the foregoing.

47. A coating composition according to claim 46, wherein the particles are selected from fumed silica, amorphous silica, colloidal silica, alumina, colloidal alumina, titanium dioxide, cesium oxide, yttrium oxide, colloidal yttria, zirconia, colloidal zirconia, and mixtures of any of the foregoing.

48. A coating composition according to claim 47, wherein the particles include colloidal silica.

49. A coating composition according to claim 45, wherein the particles are surface treated.

50. A coating composition according to claim 45, wherein the particles have an average particle size of less than 100 microns prior to incorporation into the composition.

51. A coating composition according to claim 50, wherein the particles have an average particle size of less than 50 microns prior to incorporation into the composition.

52. A coating composition according to claim 51, wherein the particles have an average particle size ranging from 1 to less than 1000 nanometers prior to incorporation into the composition.

53. A coating composition according to claim 52, wherein the particles have an average particle size ranging from 1 to 100 nanometers prior to incorporation into the composition.

54. A coating composition according to claim 53, wherein the particles have an average particle size ranging from 5 to 50 nanometers prior to incorporation into the composition.

55. A coating composition according to claim 45, wherein the particles, when added to the other components which form the composition, are present in the composition in an amount ranging from 0.01 to 75 weight percent based on total weight of the resin solids of the components from which the coating composition is formed.

56. A coating composition according to claim 1, wherein the components from which the coating composition is formed comprise at least one catalyst.

57. A coating composition according to claim 1, wherein the components from which the coating composition is formed comprise at least one surface active agent.

58. A coating composition according to claim 1, wherein the composition when cured has an initial scratch resistance value such that after scratch testing greater than 40 percent of the initial 20° gloss is retained.

59. A coating composition according to claim 1, wherein the composition when cured has a retained scratch resistance value such that after scratch testing greater than 30 percent of the initial 20° is retained.

60. A cured coating formed from the composition of claim 1.

61. A coating composition formed from components comprising:
- (a) at least one amide functional non-vinyl material comprising at least one amide group blocked with a hydrolyzable silyl group; and
- (b) at least one curing agent reactive with the at least one amide group of (a).

62. A coating composition formed from components comprising:
- (a) at least one hydroxyl functional non-vinyl material comprising at least one alcoholic hydroxyl group blocked with a hydrolyzable silyl group, wherein the at least one hydroxyl functional non-vinyl material is formed from components comprising:
  - (i) at least one half-ester formed from components comprising:
    - (a) at least one polyol; and
    - (b) at least one anhydride; and
  - (ii) at least one epoxy functional material or at least one aliphatic diol; and
- (b) at least one curing agent reactive with the alcoholic hydroxyl group of the at least one hydroxyl functional non-vinyl material (a),
- (c) at least one polysiloxane comprising at least one of the following structural units (I):

$$\text{(I) } R^1{}_n R^2{}_m SiO_{(4-n-m)/2} \tag{I}$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$, and
- (d) a plurality of colloidal silica particles.

\* \* \* \* \*

UNITED STATES PATENT AND TRADEMARK OFFICE
CERTIFICATE OF CORRECTION

PATENT NO. : 6,635,341 B1
DATED : October 21, 2003
INVENTOR(S) : Steven V. Barancyk et al.

It is certified that error appears in the above-identified patent and that said Letters Patent is hereby corrected as shown below:

Title page, Item [54] and Column 1, line 2,
Title, "COATING," should read -- COATINGS, --.

Title page,
Item [57], ABSTRACT,
Line 16, "composition, formed" should read -- composition formed --.

Column 69,
Line 54, "function" should read -- functional --.
Line 61, "alphatic" should read -- aliphatic --.

Column 70,
Line 24, "hexamethyidisilazanes." should read -- hexamethyldisilazanes. --.
Line 57, after "1,5-pentanediol,", insert -- 1,6-hexanediol, 2-ethyl-1,3-hexanediol, neopentyl glycol, diethylene glycol, dipropylene --.

Column 71,
Line 6, exahydrophthalic" should read -- hexahydrophthalic --.

Column 73,
Structure (III) between lines 54-58,

"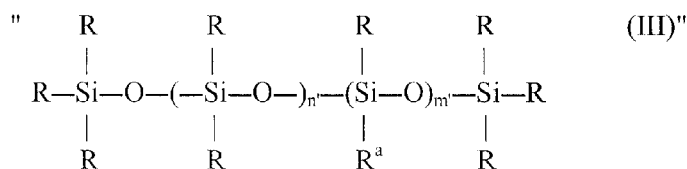"

should read

-- 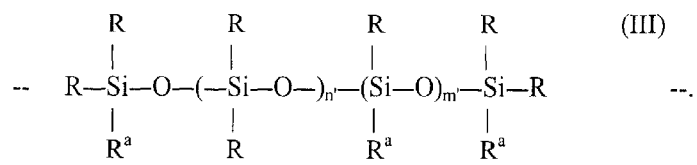 --.

UNITED STATES PATENT AND TRADEMARK OFFICE
CERTIFICATE OF CORRECTION

PATENT NO. : 6,635,341 B1
DATED : October 21, 2003
INVENTOR(S) : Steven V. Barancyk et al.

It is certified that error appears in the above-identified patent and that said Letters Patent is hereby corrected as shown below:

<u>Column 74,</u>
Line 13, "polyisocyahate" should read -- polyisocyanate --.

<u>Column 75,</u>
Line 8, after "initial 20º", insert -- gloss --.

Signed and Sealed this

Thirtieth Day of March, 2004

JON W. DUDAS
*Acting Director of the United States Patent and Trademark Office*